(12) United States Patent
Kim et al.

(10) Patent No.: US 11,910,256 B2
(45) Date of Patent: Feb. 20, 2024

(54) METHOD AND DEVICE FOR EFFECTIVELY PERFORMING STANDBY MODE OPERATION IN NEXT GENERATION MOBILE COMMUNICATION SYSTEM

(71) Applicant: Samsung Electronics Co., Ltd., Suwon-si (KR)

(72) Inventors: Soenghun Kim, Suwon-si (KR); Jaehyuk Jang, Suwon-si (KR); Donggun Kim, Seoul (KR); Sangbum Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 17/646,644

(22) Filed: Dec. 30, 2021

(65) Prior Publication Data

US 2022/0124575 A1    Apr. 21, 2022

Related U.S. Application Data

(63) Continuation of application No. 16/493,691, filed as application No. PCT/KR2018/003161 on Mar. 19, 2018, now Pat. No. 11,228,954.

(30) Foreign Application Priority Data

Mar. 20, 2017 (KR) .................... 10-2017-0034905

(51) Int. Cl.
*H04W 36/00* (2009.01)

(52) U.S. Cl.
CPC ... *H04W 36/0094* (2013.01); *H04W 36/0058* (2018.08); *H04W 36/0061* (2013.01)

(58) Field of Classification Search
CPC . H04W 36/30; H04W 24/10; H04W 36/0061; H04W 36/0094; H04W 36/0058;
(Continued)

(56) References Cited

U.S. PATENT DOCUMENTS

| 11,228,954 B2 * | 1/2022 | Kim ..................... H04W 24/10 |
| 2012/0039189 A1 | 2/2012 | Suzuki et al. |

(Continued)

FOREIGN PATENT DOCUMENTS

| KR | 20150121003 A | 10/2015 |
| KR | 20160015821 A | 2/2016 |

(Continued)

OTHER PUBLICATIONS

Nokia, Alcatel-Lucent Shanghai Bell, "R2-167706 Data transmission in Inactive," Nov. 4, 2016 https://www.3gpp.org/ftp/tsg_ran/WG2_RL2/TSGR2_96/Docs (Year: 2016).*

(Continued)

*Primary Examiner* — Maharishi V Khirodhar
*Assistant Examiner* — Kenneth P Hunt

(57) ABSTRACT

The present disclosure relates to a communication technique for combining, with IoT technology, a 5G communication system for supporting a data transmission rate higher than that of a 4G system, and to a system therefor. The present disclosure may be applied to an intelligent service (e.g., a smart home, a smart building, a smart city, a smart car or connected car, healthcare, digital education, retail business, security and safety-related service, etc.), based on a 5G communication technology and an IoT-related technology. A method for making a report, including beam measurement information, at the time of measurement reporting of a user equipment, and a device therefor; a method for performing measurement reporting by way of layer 1/layer 2 signaling, and a device therefor; and a method for changing between (Continued)

RRC modes including an RRC inactive mode, and a device therefor.

16 Claims, 39 Drawing Sheets

(58) Field of Classification Search
CPC ............. H04W 74/0833; H04W 36/00; H04W 36/0085; H04W 36/0088; H04W 74/002; H04W 76/27; H04W 72/23; Y02D 30/70
See application file for complete search history.

(56) References Cited

U.S. PATENT DOCUMENTS

| | | | |
|---|---|---|---|
| 2012/0120893 | A1 | 5/2012 | Baligh et al. |
| 2014/0247741 | A1 | 9/2014 | Yamada |
| 2015/0381252 | A1 | 12/2015 | Kang et al. |
| 2016/0119850 | A1 | 4/2016 | Kimura et al. |
| 2017/0026938 | A1 | 1/2017 | Onggosanusi et al. |
| 2017/0208494 | A1 | 7/2017 | Moon et al. |
| 2017/0214444 | A1 | 7/2017 | Nigam et al. |
| 2018/0020487 | A1 | 1/2018 | Tsai et al. |
| 2018/0035420 | A1* | 2/2018 | Centonza .............. H04W 76/27 |
| 2018/0041936 | A1 | 2/2018 | Kim et al. |
| 2018/0220486 | A1* | 8/2018 | Tseng ................. H04W 36/305 |
| 2018/0262313 | A1 | 9/2018 | Nam et al. |
| 2018/0279145 | A1 | 9/2018 | Jung et al. |
| 2018/0279151 | A1 | 9/2018 | Tseng et al. |
| 2019/0319686 | A1 | 10/2019 | Chen, IV et al. |
| 2019/0327629 | A1 | 10/2019 | Zhang et al. |
| 2019/0357069 | A1 | 11/2019 | Harada et al. |
| 2020/0014474 | A1 | 1/2020 | Khirallah et al. |
| 2020/0029229 | A1 | 1/2020 | Harada et al. |
| 2020/0037210 | A1* | 1/2020 | Rugeland .............. H04W 12/08 |
| 2020/0128412 | A1 | 4/2020 | Kazmi et al. |
| 2020/0229053 | A1 | 7/2020 | Pakniat et al. |
| 2020/0374727 | A1 | 11/2020 | Da Silva et al. |
| 2023/0088082 | A1* | 3/2023 | Lin ....................... H04W 76/30 370/329 |

FOREIGN PATENT DOCUMENTS

| | | |
|---|---|---|
| KR | 20180015589 A | 2/2018 |
| WO | 2017014572 A1 | 1/2017 |

OTHER PUBLICATIONS

European Patent Office, "European Search Report" dated Jan. 10, 2022, in connection with European Patent Application No. 21196246.9, 13 pages.
Huawei et al, "Data transmission in inactive state, option A vs. option B", R2-1702058, 3GPP TSG-RAN WG2 #97, Athens, Greece, Feb. 13-17, 2017, 5 pages.
ISA/KR, International Search Report and Written Opinion of the International Searching Authority, International Application No. PCT/KR2018-003161, dated Jun. 26, 2018, 13 pages.
ASUTeK, "Consideration on measurement reporting for NR mobility", 3GPP TSG-RAN WG2 Meeting #97, Feb. 13-17, 2017, R2-1701446 (resubmission of R2-1700361), 4 pages.
NTT Docomo, Inc., "Discussion on mobility procedure for NR", 3GPP TSG RAN WG1 Meeting #88, Feb. 13-17, 2017, R1-1702833, 6 pages.
Nokia et al., "On RRM Measurement Reporting in NR", 3GPP TSG-RAN WG2 NR #97, Feb. 13-17, 2017, R2-1701573 (revision of R2-1700125), 3 pages.
CMCC, "Beam Related Measurement Report and Inter-cell HO in NR", 3GPP TSG-RAN WG2 Meeting #97, Feb. 13-17, 2017, R2-1701921, Revision of R2-1700532, 7 pages.
Supplementary European Search Report dated Jan. 21, 2020 in connection with European Patent Application No. 18 77 0853, 14 pages.
Korean Intellectual Property Office, "Office Action" dated Oct. 18, 2021, in connection with Korean Patent Application No. 10-2021-0130667, 10 pages.
Samsung, "Data transfer in inactive state based on 4-step RACH procedures" 3GPP TSG-RAN WG2 #97, R2-1701529 (resubmission of R2-1700366), Athens, Greece, Feb. 13-17, 2017, 7 pages.
Nokia et al., "Data transmission in Inactive", 3GPP TSG-RAN WG2 Meeting #96, R2-167706, Reno, USA, Nov. 14-18, 2016, 7 pages.
RAN WG2, "LS to SA3 on Small Data Transmission", 3GPP TSG-RAN WG2 NR Adhoc Meeting, R2-1700656, Spokane, USA, Jan. 17-19, 2017, 2 pages.

* cited by examiner

METHOD AND DEVICE FOR EFFECTIVELY PERFORMING STANDBY MODE OPERATION IN NEXT GENERATION MOBILE COMMUNICATION SYSTEM

CROSS-REFERENCE TO RELATED APPLICATIONS

This application is a continuation of application Ser. No. 16/493,691, filed on Sep. 12, 2019, now U.S. Pat. No. 11,228,954, which is a 371 National Stage of International Application No. PCT/KR2018/003161, filed Mar. 19, 2018, which claims priority to Korean Patent Application No. 10-2017-0034905, filed Mar. 20, 2017, the disclosures of which are herein incorporated by reference in their entirety.

BACKGROUND

1. Field

The disclosure relates to a mobile communication system and, more particularly, to operations of a terminal and a base station in a mobile communication system.

2. Description of Related Art

To meet the demand for wireless data traffic, which has increased since the commercialization of 4G communication systems, efforts have been made to develop an improved 5G communication system or a pre-5G communication system. Therefore, the 5G communication system or the pre-5G communication system is called a "beyond-4G-network communication system" or a "post-LTE system". Consideration is being given to implementation of the 5G communication system in super-high-frequency (mmWave) bands (e.g., a 60 GHz band) so as to accomplish higher data rates. In order to reduce pathloss of radio waves and increase the propagation distance of radio waves in super-high-frequency bands, techniques, such as beamforming, massive multiple-input multiple-output (MIMO), full-dimensional MIMO (FD-MIMO) array antennas, analog beamforming, and large-scale antennas, are being discussed in 5G communication systems. In addition, development is under-way for system network improvement in 5G communication systems based on evolved small cells, advanced small cells, cloud radio access networks (cloud RANs), ultra-dense networks, device-to-device (D2D) communication, wireless backhaul, moving networks, cooperative communication, coordinated multi-point (CoMP), reception-end interference cancellation, and the like. Furthermore, in the 5G system, hybrid FSK and QAM modulation (FQAM) and sliding window superposition coding (SWSC), as advanced coding modulation (ACM), and filter bank multi-carrier (FBMC), non-orthogonal multiple access (NOMA), and sparse code multiple access (SCMA), as advanced access technologies, are being developed.

Meanwhile, the Internet, which to date has been a human-centered connectivity network in which humans generate and consume information, is now evolving to the Internet of things (IoT), where distributed entities, or "things", exchange and process information. The Internet of everything (IoE), which is a combination of IoT technology and big-data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine-type communication (MTC), and the like, have been recently researched. An IoT environment may provide intelligent Internet technology (IT) services that create new value in people's lives by collecting and analyzing data generated from connected things. The IoT may be applied to a variety of fields, such as those of smart homes, smart buildings, smart cities, smart cars or connected cars, smart grids, healthcare, smart appliances, and advanced medical services, through convergence and combination between existing information technology (IT) and various industries.

In line with this, various attempts have been made to apply 5G communication systems to IoT networks. For example, technologies, such as a sensor network, machine-to-machine (M2M) communication, machine-type communication (MTC), and the like, are being implemented using 5G communication techniques, such as beamforming, MIMO, array antennas, and the like. The application of a cloud radio access network (cloud RAN) as the above-described big-data processing technology may also be considered as an example of convergence between the 5G technology and the IoT technology.

In general, mobile communication systems have been developed for the purpose of providing communication while securing the mobility of a user. Thanks to the remarkable development of technology, the mobile communication systems have advanced to the stage of providing high-speed data communication services, as well as voice communication. In addition, 5th generation mobile communication systems are being studied following 4th generation mobile communication systems, and 5th generation mobile communication systems may include various improved functions, compared with the previous mobile communication systems.

SUMMARY

It is an aspect of the disclosure to provide a method and a device for efficiently performing a standby mode operation in a next-generation mobile communication. In addition, another aspect of the disclosure is to provide a method and a device for reporting a result so that a base station is able to correctly determine handover when measuring a cell including a plurality of beams and reporting a result thereof in a wireless communication system.

In addition, another aspect of the disclosure is to provide a method and a device, which provide a beam management procedure according to mobility in a next-generation mobile communication system employing beams, thereby performing requesting and reporting a measurement value with respect to movement and connection of a terminal in a cell without involvement of radio resource control (RRC).

Further, another aspect of the disclosure is to provide a method of switching a terminal between an RRC connected mode, an RRC inactive mode, and an RRC idle mode in a next-generation mobile communication system, and a method and a procedure for transmitting an RRC message, which are necessary when the terminal in the RRC inactive mode transmits and receives an RRC message in various cases.

In order to solve the problems above, a method for performing a measurement report of a terminal may include: receiving measurement configuration information from a base station; performing measurement and determining whether or not report conditions are satisfied based on the measurement configuration information; producing a measurement report message if the report conditions are satisfied; and transmitting the measurement report message to the base station, wherein the producing the measurement report message further includes determining whether or not to include a beam measurement result in the measurement report message, and wherein if it is determined that the beam measurement result is to be included in the measurement report message, the measurement report message includes a cell-level measurement result and a beam measurement result of a serving cell.

In addition, the beam measurement result may include a beam measurement value in the case where a measurement value of each beam exceeds a threshold value, and the threshold value may be included in the measurement configuration information. The measurement report message may further include a measurement result of a neighboring cell within a maximum reportable range. Further, information indicating the maximum reportable range may be included in the measurement configuration information.

In addition, a method for receiving a measurement report of a base station may include: transmitting measurement configuration information to a terminal; and receiving a measurement report message generated based on the measurement configuration information, wherein if it is determined that the beam measurement result is to be included in the measurement report, message, the measurement report message may include a cell-level measurement result and a beam measurement result of a serving cell.

In addition, a terminal for performing a measurement report may include: a transceiver; and a controller configured to perform control so as to receive measurement configuration information from a base station, perform measurement and determine whether or not report conditions are satisfied based on the measurement configuration information, generate a measurement report message if the report conditions are satisfied, and transmit the measurement report message to the base station, wherein the controller further performs control so as to determine whether or not to include a beam measurement result in the measurement report message, and wherein if it is determined that the beam measurement result is to be included in the measurement report message, the measurement report message may include a cell-level measurement result and a beam measurement result of a serving cell.

In addition, a base station for receiving a measurement report may include: a transceiver; and a controller configured to perform control so as to transmit measurement configuration information to a terminal and so as to receive a measurement report message generated based on the measurement configuration information, wherein if it is determined that the beam measurement result is to be included in the measurement report, message, the measurement report message may include a cell-level measurement result and a beam measurement result of a serving cell.

According to an embodiment of the disclosure, the terminal can more efficiently manage an idle mode thereof by reselecting a cell according to the priority of a cell and the type of beam.

According to another embodiment of the disclosure, the terminal may report a measurement result to the base station such that the base station can correctly execute a handover command and the like.

According to another embodiment of the disclosure, it is possible to support the movement and connection of a terminal in the cell using simpler layer 1/layer 2 signaling through a new channel measuring and reporting method of a next-generate mobile system, instead of performing a handover operation involving RRC in the conventional LTE system.

In addition, according to another embodiment of the disclosure, it is possible to reduce signaling overhead and power consumption of the terminal by switching the terminal between an RRC connected mode, an RRC inactive mode (or a lighted connected mode), and an RRC idle mode in the next-generation mobile communication system.

BRIEF DESCRIPTION OF THE DRAWINGS

FIG. 2.2 is a block diagram illustrating the internal structure of a terminal capable of implementing the disclosure.

DETAILED DESCRIPTION

Figure 1:
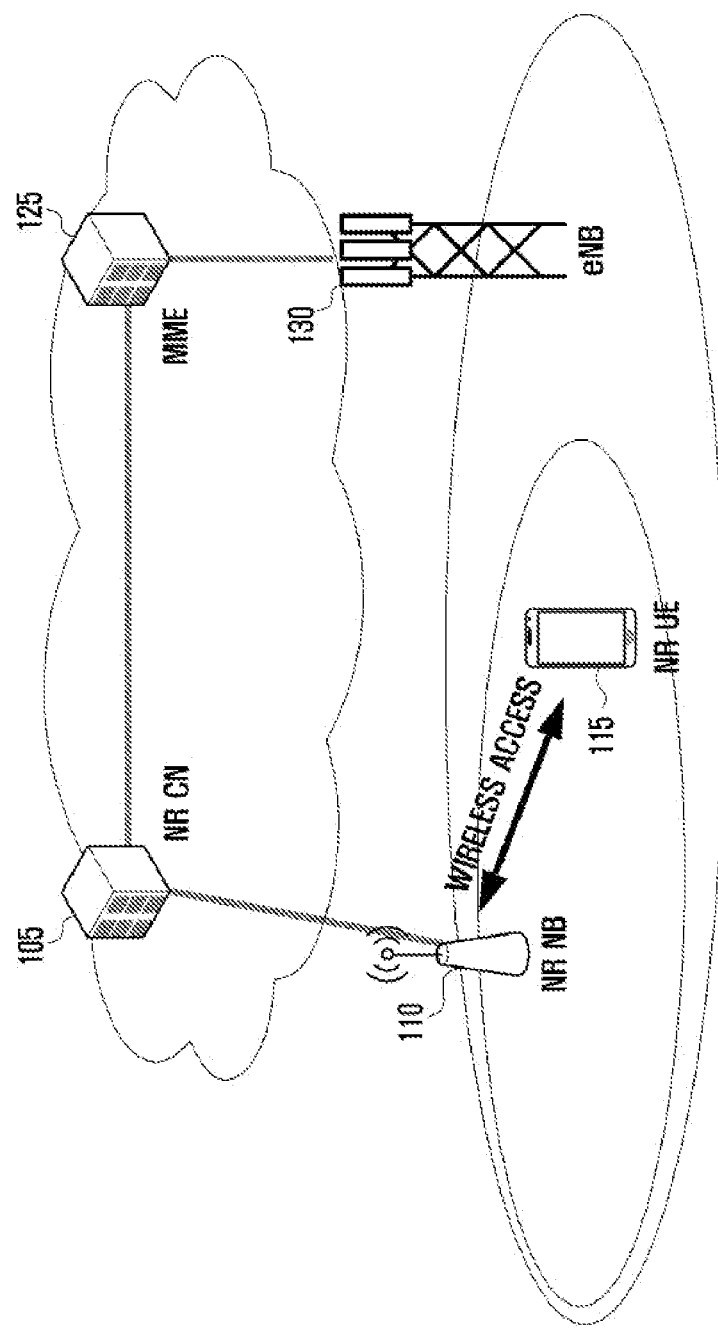
FIG. 1 is a diagram illustrating the structure of a next-generation mobile communication system.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

Further, in the detailed description of embodiments of the disclosure, an Advanced E-UTRA (or referred to also as LTE-A) system supporting a cooperative communication (CoMP) is mainly discussed. However, the main idea of the disclosure is applicable to other communication systems having similar technical backgrounds or channel types through a small modification without departing from the scope of the disclosure, which can be made by one skilled in the art. For example, the subject matter of the disclosure can be applied to multi carrier HSPA supporting carrier combining.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to generate a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory generate an article of manufacture including instruction means that implement the function specified in the flowchart block or blocks. The computer program instructions may also be loaded onto a computer or other programmable data processing apparatus to cause a series of operational steps to be performed on the computer or other programmable apparatus to generate a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to regenerate one or more CPUs within a device or a security multimedia card.

First Embodiment

FIG. 1 is a diagram illustrating the structure of a next-generation mobile communication system.

Referring to FIG. 1, a wireless access network of a next-generation mobile communication system includes a new radio node B (hereinafter, referred to as "NR NB") 110 and a new radio core network (NR CN) 105. New radio user equipment (hereinafter, referred to as "NR UE" or a "terminal") 115 accesses an external network through the NR NB 110 and the NR CN 105.

In FIG. 1, the NR NB 110 corresponds to an evolved node B (eNB) of an existing LTE system. The NR NB may be connected to the NR UE 115 through a wireless channel, and may provide services superior to those of the existing node B. In the next-generation mobile communication system, since all user traffic is served through a shared channel, a device for collecting status information, such as buffer status, available transmission power status, and channel status of UEs, and performing scheduling is required. The NR NB 110 serves as such a device. One NR NB typically controls multiple cells. In order to realize super-high data rates compared to the existing LTE system, the NR NB 110 may have a bandwidth equal to or greater than the maximum bandwidth of the existing system, may employ, as wireless access technology, orthogonal frequency division multiplexing (hereinafter, referred to as "OFDM"), and may further employ a beamforming technique. In addition, an adaptive modulation and coding (hereinafter, referred to as "AMC") scheme is applied to determine a modulation scheme and a channel coding rate in accordance with the channel status of a terminal, The NR CN 105 performs functions such as mobility support, bearer configuration, and QoS configuration. The NR CN is a device that performs various control functions, as well as a mobility management function for a terminal, and is connected to a plurality of base stations. In addition, the next-generation mobile communication system may interwork with the existing LTE system, and the NR CN is connected to an MME 125 through a network interface. The MME is connected to the eNB 130, which is an existing base station.

Figure 2:
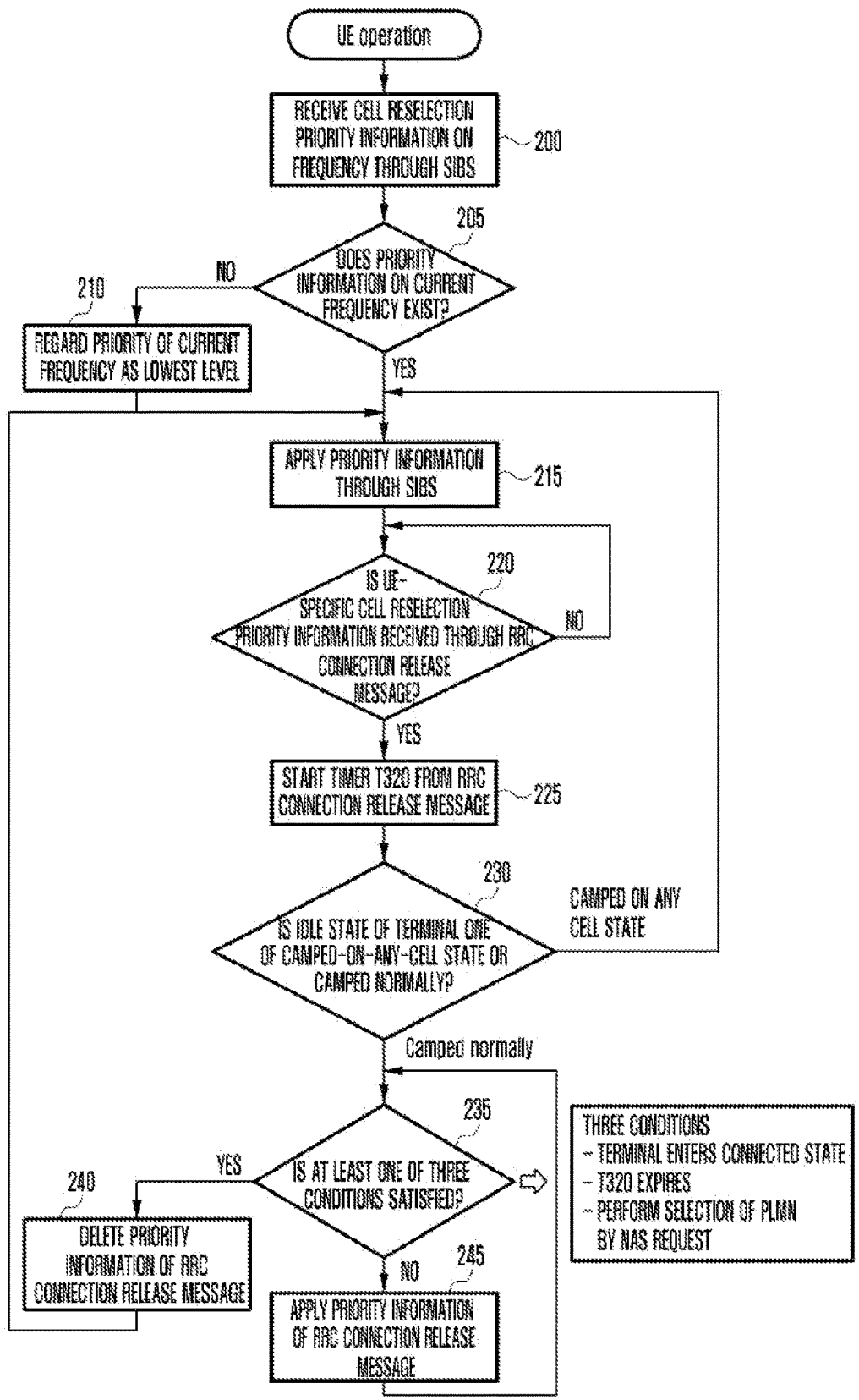
FIG. 2 is a diagram illustrating a procedure in which frequency-based priority information for cell reselection is applied to a terminal.
Figure 3:
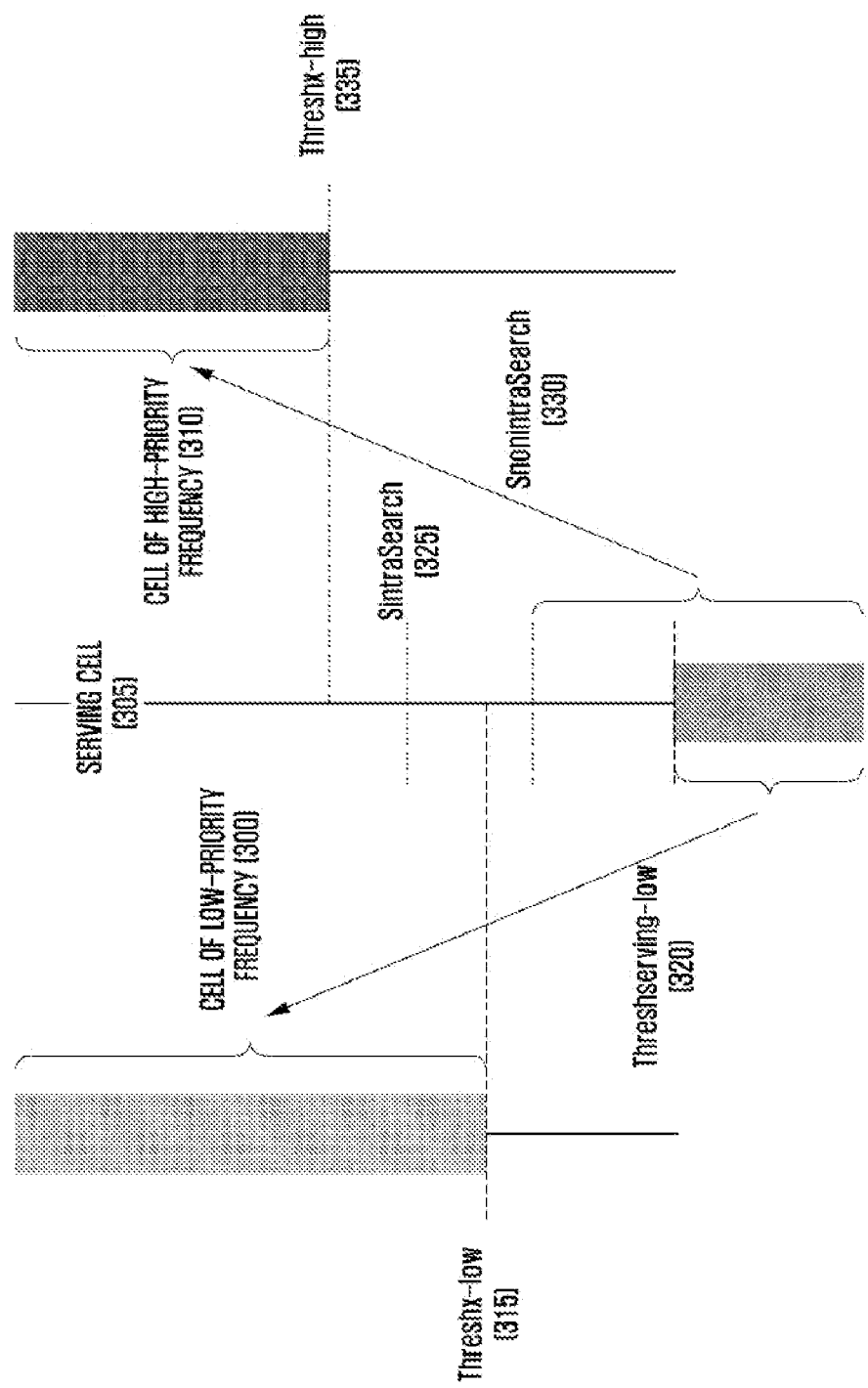
FIG. 3 is a diagram for explaining a method in which a terminal performs cell reselection according to signal strength.

FIG. 2 is a diagram for explaining a procedure in which priority information for each frequency for cell reselection is broadcast through a system information block (SIB), or in which priority information for each frequency for reselection of a cell is applied to a specific terminal through an RRC connection release message, which is dedicated RRC signaling.

Cell reselection refers to a procedure in which a moving terminal reselects a serving cell in order to connect to a cell in the best channel state. A network assigns priority for each frequency and controls the cell reselection of the terminals in a standby mode. For example, if a terminal receives priority information on two frequencies f1 and f2, and if f1 has a higher priority than f2, the terminal is more likely to be stay at f1. In addition, even in the case where the terminal stays at f2, if the channel state of f2 is not good, the terminal will try to switch to f1.

Priority information on the frequency is provided to a specific terminal by broadcasting the same through an SIB or by transmitting the same through an RRC connection release message, which is dedicated RRC signaling. Even if the terminal has already received priority information on frequencies through the SIBs, if LTE-specific priority information is received through RRC signaling, the priority information of the SIBs is ignored. The priority information of each frequency is transmitted through the "cellReselectionPriority" information element (IE), and one of eight priority levels is given. The frequencies between RATs cannot be given the same priority. If the terminal is in an idle state (this may be interchangeably used with a standby mode) corresponding to "camped-on-any-cell state", the frequency priority information received through the SIB is applied, whereas the priority information received through RRC signaling is not used but is only stored. The "cellReselectionPriority" IE, which is an optional IE, may not be provided. In this case, the priority information on the corresponding frequency is not given. In addition, the terminal regards the priority of the corresponding frequency as the lowest level.

In step 200, the terminal receives priority information on frequencies used in other RATs, as well as EUTRA, through the SIB. However, priority information is not necessarily provided to all frequencies. The priority information on the frequency of a serving cell on which the terminal is camping may not be provided either. The terminal identifies whether priority information on the current frequency exists in step 205. If the priority information on the frequency of the current serving cell has not been provided, the terminal regards the priority of the frequency as the lowest level (210). The terminal applies the priority information of respective frequencies received through the SIBs in step 215.

Upon receiving an RRC connection release message from the base station, the terminal switches from the connected mode to the standby mode (idle mode). The RRC message may include priority information on the frequency. This is UE-specific information and, in general, is applied in preference to the frequency priority information provided through the SIB. Therefore, in step 220, the terminal identifies whether or not there is frequency priority information in the RRC message. If there is frequency priority information in the RRC message, the terminal drives a timer by applying a value T320 included in the information in step 225. The terminal determines whether or not the current standby mode corresponds to "camped-on-any-cell state" or "normally-camped state" in step 230. The "normally-camped state" refers to the state in which the terminal is camping on a suitable cell. The suitable cell denotes a cell capable of providing normal services to the terminal and satisfies the detailed conditions as follows.

A cell corresponding to a selected PLMN, a registered PLMN, or a PLMN in an equivalent PLMN list A cell that is not barred A cell satisfying a cell selection criterion in the case of a cell of a closed subscriber group (CSG), a cell of which the CSG ID is in the whitelist of the terminal "camped-on-any-cell state" denotes the state in which the terminal is camping on an acceptable cell because the terminal is unable to camp on a suitable cell. In the acceptable cell, normal services are not available, and the terminal may attempt only an emergency call. The acceptable cell satisfies the following conditions.

A cell that is not barred

A cell satisfying a cell selection criterion

If the terminal is in the standby state corresponding to "camped-on-any-cell state", the terminal returns to step 215 and applies the frequency priority information provided from the SIB, instead of applying the priority information provided from the RRC connection release message. If the terminal is in the standby state corresponding to "camped normally", the terminal determines whether or not at least one of the following three conditions is satisfied in step 235. The three conditions are as follows.

The terminal switched to the connected mode.

The timer T320 expired.

PLMN selection process was performed according to NAS request.

If any one of the above conditions is satisfied, the priority information provided from the RRC connection release message is discarded in step 240, and the terminal returns to step 215 and applies the frequency priority information provided from the SIB. Otherwise, if none of the conditions is satisfied, the terminal applies the priority information provided from the RRC connection release message in step 245.

The frequency priority information affects the measurement of a specific frequency by the terminal. The terminal always performs measurement of a frequency of higher priority than the current serving cell. On the other hand, the terminal does not always perform measurement of a frequency, which is the same as that of a serving cell (intra-frequency), or other frequency of priority equal to or lower than the same, thereby reducing power consumption of the terminal. The measurement is performed in the case where the channel QoS of a serving cell is less than or equal to a specific threshold value. The cell reselection is performed in order for the terminal to move to a cell in a good channel state. If the channel QoS of the current serving cell is good, the terminal does not need to move to the frequency of the same or lower priority. Thus, the terminal determines whether or not to perform measurement, based on a specific threshold value, in order to reduce power of the terminal, which is consumed for unnecessary channel measurement. In the case of the same frequency (intra-frequency), if the QoS of a serving cell is equal to or lower than a specific threshold value "Sintrasearch", the terminal performs channel measurement for other cells of the same frequency. For other frequencies of the same or lower priority, if the QoS of the serving cell is equal to or lower than a specific threshold value "Snonintrasearch", the terminal performs channel measurement of the cells of the corresponding frequency. In general, as the channel QoS, reference signal received power (RSRP) and reference signal received quality (RSRQ) are taken into consideration.

If the channel QoS of a cell of a high-priority frequency is higher than a specific threshold value "ThreshX-high" as a result of the measurement described above, the terminal reselects the cell of a high-priority frequency as a serving cell. If the channel QoS of a cell of a low-priority frequency is higher than a specific threshold value "ThreshX-low", and if the QoS of a serving cell is lower than a threshold value "ThreshServing-low", the terminal reselects the cell of a low-priority frequency as a serving cell.

FIG. 2 is a diagram illustrating a method in which a terminal performs cell reselection according to signal strength. The terminal always performs inter-frequency or inter-RAT measurement for high-priority frequencies or RATs, regardless of the measured signal strength of a serving cell. If the measured signal strength of a serving cell is lower than "SintraSearch" 325, the terminal performs intra-frequency measurement. If the measured signal strength of a serving cell is lower than "SnonintraSearch" 330, the terminal performs inter-frequency or inter-RAT measurement with respect to the frequency of priority equal to or lower than that of the frequency of the current serving cell. The terminal measurement triggered step by step as described above is intended to reduce power consumption of the terminal due to measurement of neighboring cells. If the channel QoS of a cell 310 of a high-priority frequency is higher than a specific threshold value "ThreshX-high" 335, the terminal reselects the cell 310 of a high-priority frequency as a serving cell. If the channel QoS of a cell 300 of a low-priority frequency is higher than a specific threshold value "ThreshX-low" 315, and if the QoS of a serving cell is lower than "ThreshServing-low" 320, the terminal reselects the cell 300 of a low-priority frequency as a serving cell.

RSRP or RSRQ may be taken into consideration when reselecting the cell. In the case of using RSRQ, the base station separately provides the terminal with "Threshserving-lowQ", "ThreshX-lowQ", and "ThreshX-highQ" through broadcast. In the case of using RSRP, "Threshserving-lowP", "ThreshX-lowP", and "ThreshX-highP" are used in the disclosure in order to distinguish them from the above variables.

The next-generation mobile communication system may be applied both to a low frequency band and to a high frequency band. A cell with a low frequency of 6 GHz or less typically forms a service area using an omnidirectional antenna or a sector antenna. In the disclosure, the cell with such a beam configuration will be referred to as a "single-beam cell". On the other hand, since a cell with a high frequency of 6 GHz or more has a large pathloss rate, a service area is guaranteed by applying a beam antenna that concentrates the antenna gain on a very narrow angle. In the disclosure, the cell with such a beam configuration will be referred to as a "multi-beam cell". The terminal may reselect a cell with another beam configuration. The disclosure proposes a method for performing inter-frequency cell reselection between a single beam and a multi-beam.

Figure 4:
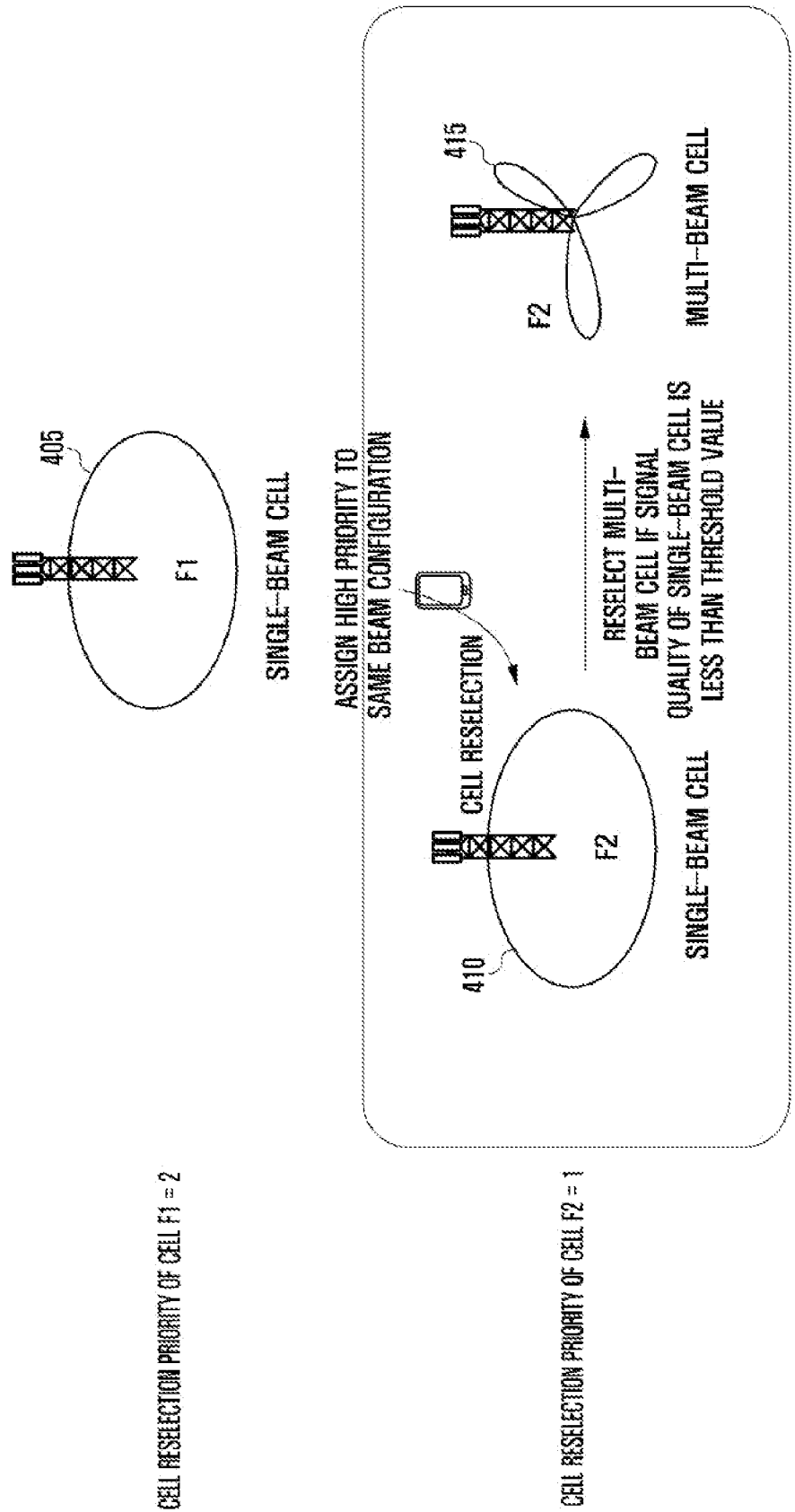
FIG. 4 is a diagram illustrating a method of performing cell reselection with priority given to a cell having the same beam configuration.

FIG. 4 is a diagram illustrating an example of a method of performing cell reselection with priority given to a cell having the same configuration.

It may be cumbersome for the terminal to change existing beam configuration applied thereto. Thus, when reselecting a cell, the terminal may prefer to reselect the cell providing the same beam configuration. Alternatively, the network may prefer to allow the terminal to maintain the same beam configuration when reselecting a cell. Therefore, the disclosure proposes a method for performing a cell reselection procedure with priority of the cell having the same beam configuration as an existing cell 405 in the case where both a single-beam cell 410 and a multi-beam cell 415 exist in the same frequency.

It is assumed that priority is also assigned to each frequency in cell reselection in the next-generation mobile communication system. Therefore, if predetermined signal strength is satisfied, the terminal preferably performs reselection with respect to a cell with a high-priority frequency. In the case where a single-beam cell and a multi-beam cell exist in the same frequency, if a cell having the same beam configuration as that of an existing cell has the signal strength greater than a predetermined signal value, the terminal preferentially attempts to reselect the corresponding cell. For example, a terminal is currently camping on a single-beam cell at frequency F1. In the cell, the terminal is provided with priority information of periphery frequencies for inter-frequency cell reselection and information on predetermined threshold values necessary for cell reselection through specific system information. In this embodiment, it is assumed that only priority information on the frequency is provided in the cell. In addition, the cell reselection threshold values may be provided separately according to a single beam or a multi-beam.

The terminal finds a cell of frequency F2 with higher priority than that of frequency F1 around the terminal. If the signal strength of a specific cell of frequency F2 is greater than a predetermined threshold value, the terminal must attempt reselection of the cell of frequency F2. In this case, if there is only one cell of frequency F2, the terminal reselects the cell, regardless of the beam configuration supported by the cell. However, if there is a plurality of cells with frequency F2, and if the respective cells support different beam configurations from each other, the terminal determines whether or not the cells having the same beam configuration as that of the current cell satisfy the signal strength required for cell reselection. Thereafter, the terminal reselects a cell providing the largest signal strength from among the cells satisfying; the above condition. If there is a plurality of cells at frequency F2, but if all the cells support different beam configurations, or if the cells with the same beam configuration do not satisfy the signal strength required for cell reselection, the terminal reselects a cell that provides the best signal strength satisfying the signal strength required for cell reselection from among the cells supporting the different beam configurations.

Figure 5:
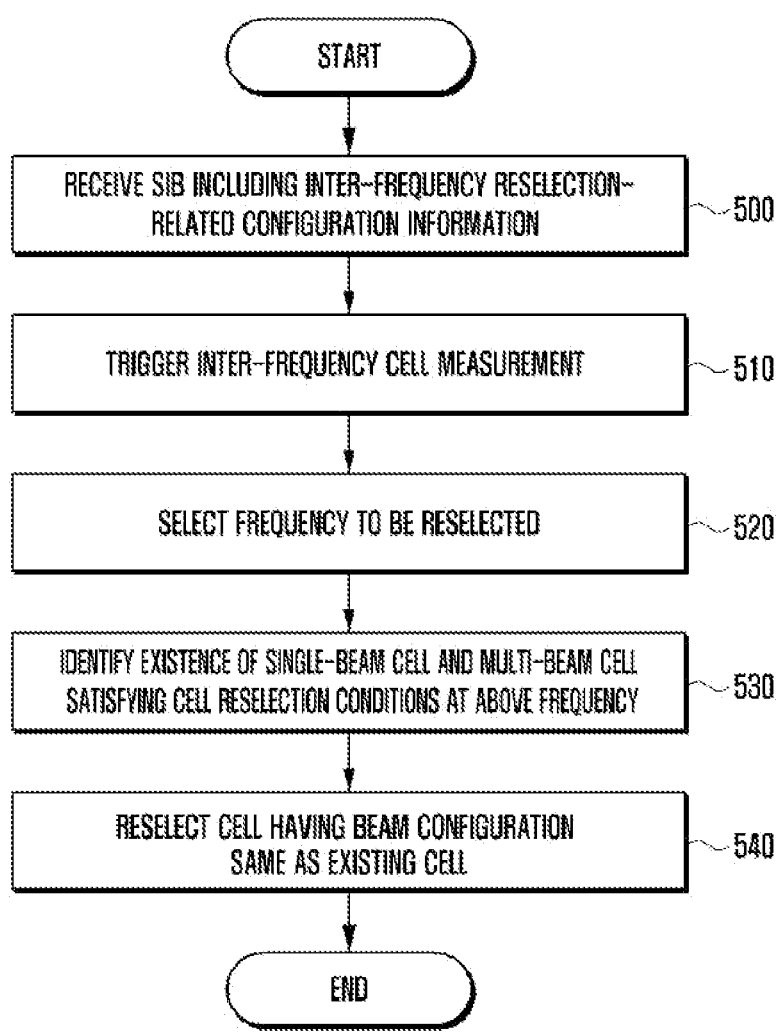
FIG. 5 is a diagram illustrating the operation of a terminal for performing cell reselection with priority given to a cell having the same beam configuration in the disclosure.

FIG. 5 is a diagram illustrating the operation of a terminal for performing cell reselection with priority given to a cell of the same beam configuration in the disclosure.

In step 500, the terminal receives system information including inter-frequency reselection-related configuration information. In step 510, the terminal performs inter-frequency cell measurement. Since neighboring cells are single-beam cells or multi-beam cells, the terminal must perform cell measurement in consideration of two types of beam configurations. Configuration information related to the cell measurement is also provided to the terminal through system information broadcast by the base station. In step 520, the terminal selects a frequency to be reselected, based on the priority information provided through the system information. In step 530, the terminal identifies whether or not there is a single-beam cell or a multi-beam cell satisfying the cell reselection conditions (the signal strength thereof exceeds a predetermined threshold value) at the frequency. If there is a cell having the same beam configuration as that of the existing cell, and if the cell satisfies the cell reselection conditions, the terminal preferentially performs reselection of the cell in step 540.

Figure 6:
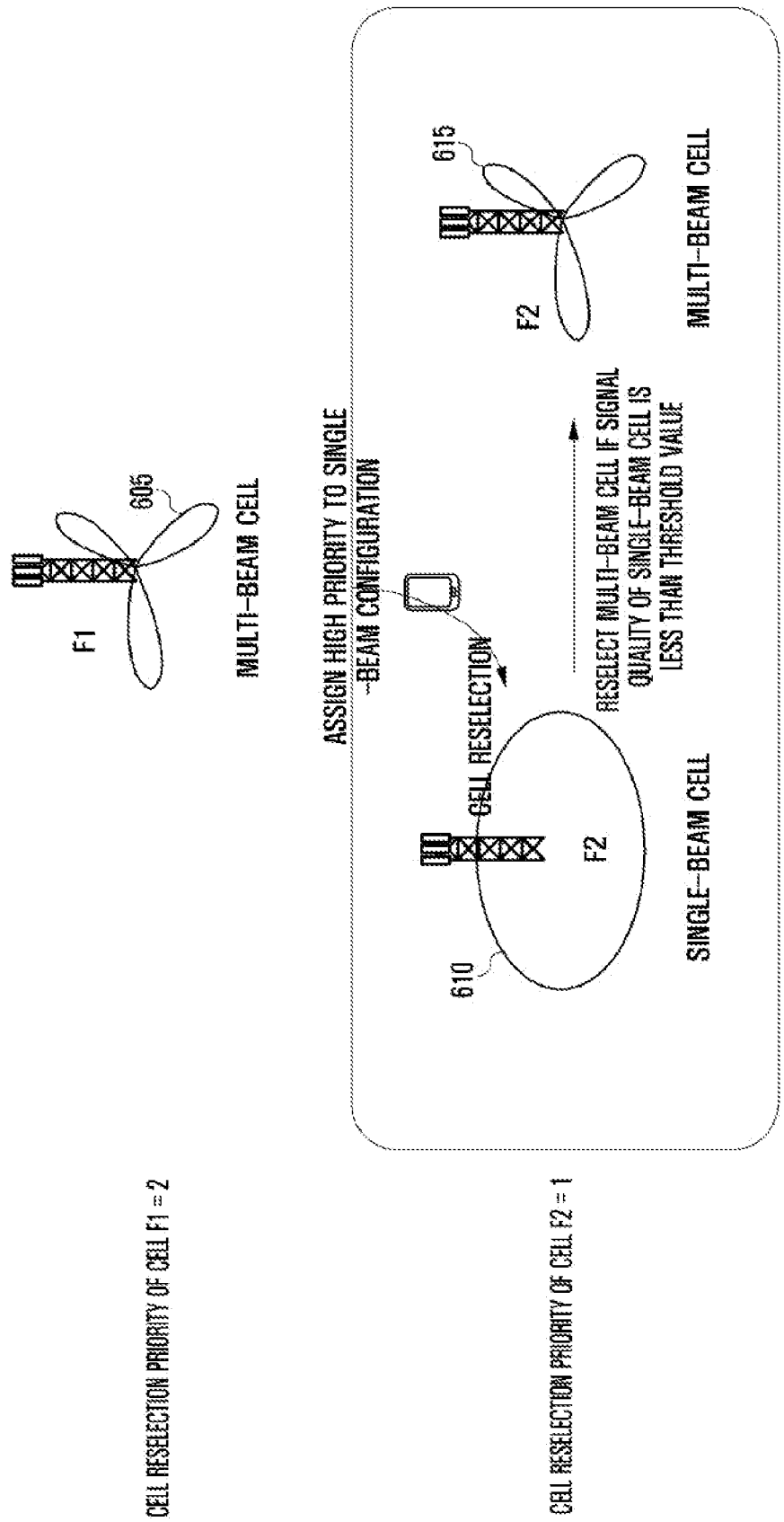
FIG. 6 is a diagram illustrating a method of performing cell reselection with priority given to a cell having a single-beam configuration in the disclosure.

FIG. 6 is a diagram illustrating an example of a method for performing cell reselection with priority given to a cell of a single-beam configuration in the disclosure.

Single-beam systems have lower terminal complexity and simpler operation than multi-beam systems. Thus, when reselecting a cell, the terminal may prefer to reselect a single-beam cell. Alternatively, the network may prefer to allow the terminal to reselect the single-beam cell when reselecting a cell. Therefore, the disclosure proposes a method for performing a cell reselection procedure with priority given to a single-beam cell, regardless of beam configuration of the existing cell 605, in the case where both a single-beam cell 610 and a multi-beam cell 615 exist in the same frequency.

It is assumed that priority is also assigned to each frequency in cell reselection in the next-generation mobile communication system. Therefore, if predetermined signal strength is satisfied, the terminal preferably performs reselection of a cell with a high-priority frequency. In the case where a single-beam cell and a multi-beam cell exist in the same frequency, if the signal strength of the single-beam cell is greater than a predetermined value, the terminal preferentially attempts to reselect the corresponding cell. For example, a terminal is currently camping on a multi-beam cell at frequency F1. In the above cell, the terminal is provided with priority information of periphery frequencies for inter-frequency cell reselection and information on predetermined threshold values necessary for cell reselection through specific system information. In this embodiment, it is assumed that only priority information on the frequency is provided in the cell. In addition, the cell reselection threshold values may be provided separately according to a single beam or a multi-beam.

The terminal finds a cell of frequency F2 having higher priority than that of frequency around the terminal. If the signal strength of a specific cell of frequency F2 is greater than a predetermined threshold value, the terminal must attempt reselection of a cell of frequency F2. In this case, if there is only one cell of frequency F2, the terminal reselects the cell, regardless of the beam configuration supported by the cell. However, if there is a plurality of cells at frequency F2, and if the respective cells support different beam configurations from each other, the terminal determines whether or not the single-beam cells satisfy the signal strength required for cell reselection. Thereafter, the terminal reselects a cell providing the largest signal strength from among the cells satisfying the above conditions. If there is a plurality of cells at frequency F2, but if all the cells support a multi-beam configuration, or if all the cells having a single-beam configuration do not satisfy the signal strength required for cell reselection, the terminal reselects a cell that provides the best signal strength satisfying the signal strength required for cell reselection from among the cells supporting a multi-beam configuration.

Figure 7:
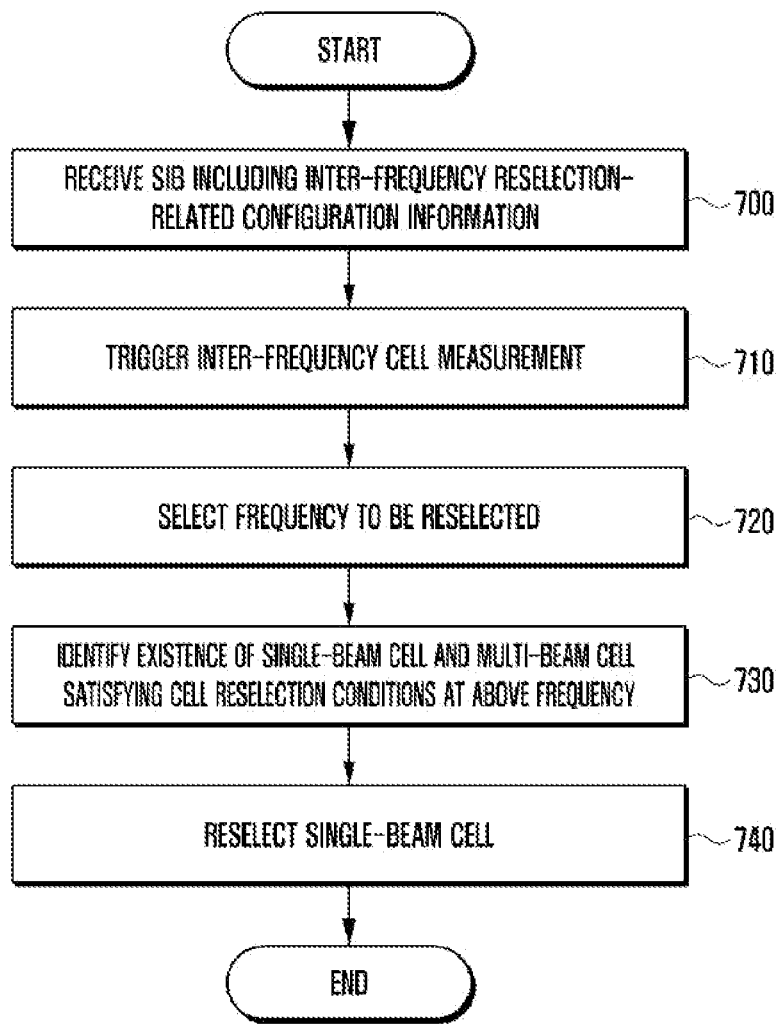
FIG. 7 is a diagram illustrating the operation of a terminal for performing cell reselection with priority given to a cell having a single-beam configuration in the disclosure.

FIG. 7 is a diagram illustrating the operation of a terminal for performing cell reselection with priority given to a cell having a single-beam configuration in the disclosure.

In step 700, the terminal receives system information including inter-frequency reselection-related configuration information. In step 710, the terminal performs inter-frequency cell measurement. Since neighboring cells are single-beam cells or multi-beam cells, the terminal must perform cell measurement in consideration of two types of beam configurations. Configuration information related to the cell measurement is also provided to the terminal through system information broadcast by the base station. In step 720, the terminal selects a frequency to be reselected, based on the priority information provided through the system information. In step 730, the terminal identifies whether or not there is a single-beam cell or a multi-beam cell satisfying the cell reselection conditions (the signal strength thereof exceeds a predetermined threshold value) at the frequency. If there is a single-beam cell satisfying the above cell reselection conditions, the terminal preferentially performs reselection of the cell in step 740.

In addition to the above-mentioned method, cell reselection priority information may be provided as system information in consideration of beam configuration. For example, the priority information may be subdivided according to the frequency and the beam configuration in such a manner that the priority of a single-beam cell at frequency F1 is 1, the priority of a multi-beam cell at frequency F1 is 3, the priority of a single-beam cell at frequency F2 is 2, the priority of a multi-beam cell at frequency F2 is 4, and the like, and may be provided to the terminal.

Figure 8:
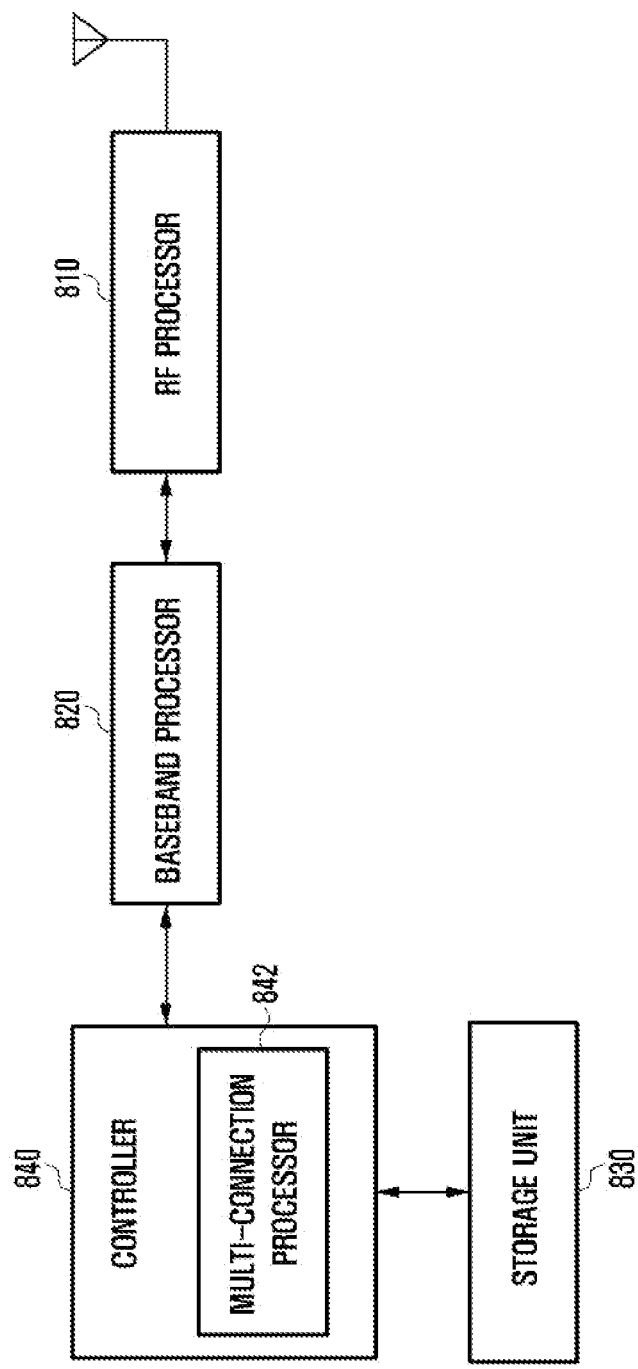
FIG. 8 is a block diagram illustrating the internal structure of a terminal to which the disclosure is applied.

FIG. 8 is a diagram illustrating the structure of a terminal capable of implementing an embodiment of the disclosure.

Referring to the drawing, the terminal includes a radio frequency (RF) processor 810, a baseband processor 820, a storage unit 830, and a controller 840.

The RF processor 810 performs a function of transmitting and receiving a signal through a wireless channel, such as band conversion and amplification of a signal. That is, the RE processor 810 up-converts a baseband signal provided from the baseband processor 820 to an RF band signal to thus transmit the same through an antenna and down-converts an RF band signal received through the antenna to a baseband signal. For example, the RF processor 810 may include a transmission filter, a reception filter, an amplifier, a mixer, an oscillator, a digital-to-analog converter (DAC), an analog-to-digital converter (ADC), and the like. Although only one antenna is illustrated in the drawing, the terminal may have a plurality of antennas. In addition, the RF processor 810 may include a plurality of RF chains. Further, the RF processor 810 may perform beamforming. To perform beamforming, the RF processor 810 may adjust the phases and magnitudes of signals transmitted and received through a plurality of antennas or antenna elements. In addition, the RF processor may perform MIMO, and may receive a plurality of layers when performing the MIMO operation.

The baseband processor 820 performs a function of conversion between a baseband signal and a bit string according to the physical layer specification of the system. For example, in the case of data transmission, the baseband processor 820 encodes and modulates transmission bit strings, thereby generating complex symbols. In addition, upon receiving data, the baseband processor 820 demodulates and decodes a baseband signal provided from the RF processor 810 to thus recover reception bit strings. For example, in the case where an orthogonal frequency division multiplexing (OFDM) scheme is applied, when transmitting data, the baseband processor 820 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 820 divides the baseband signal provided from the RF processor 810 into OFDM symbol units, restores the signals mapped to the subcarriers through a fast Fourier transform (EFT) operation, and then restores reception bit strings through demodulation and decoding.

The baseband processor 820 and the RE processor 810 transmit and receive signals as described above. Accordingly, the baseband processor 820 and the RF processor 810 may be referred to as a "transmitter", a "receiver", a "transceiver", or a "communication unit". In addition, at least one of the baseband processor 820 and the RF processor 810 may include a plurality of communication modules to support a plurality of different radio access technologies. Further, at least one of the baseband processor 820 and the RF processor 810 may include different communication modules to process signals of different frequency bands. For example, the different radio access technologies may include wireless LANs (e.g., IEEE 802.11), cellular networks (e.g., LTE), and the like. In addition, the different frequency bands may include super-high frequency (SHE) (e.g., 2·NRHz or NRhz) bands and millimeter wave (e.g., 60 GHz) bands.

The storage unit 830 stores data such as basic programs, application programs, and configuration information for the operation of the terminal. In particular, the storage unit 830 may store information related to a second access node for performing wireless communication using a second radio access technique. In addition, the storage unit 830 provides the stored data according to a request by the controller 840.

The controller 840 controls the overall operation of the terminal. For example, the controller 840 transmits and receives signals through the baseband processor 820 and the RF processor 810. In addition, the controller 840 records and reads data in and from the storage unit 840. To this end, the controller 840 may include at least one processor. For example, the controller 840 may include a communication processor (CP) for controlling communication and an application processor (AP) for controlling upper layers such as application programs.

Figure 9:
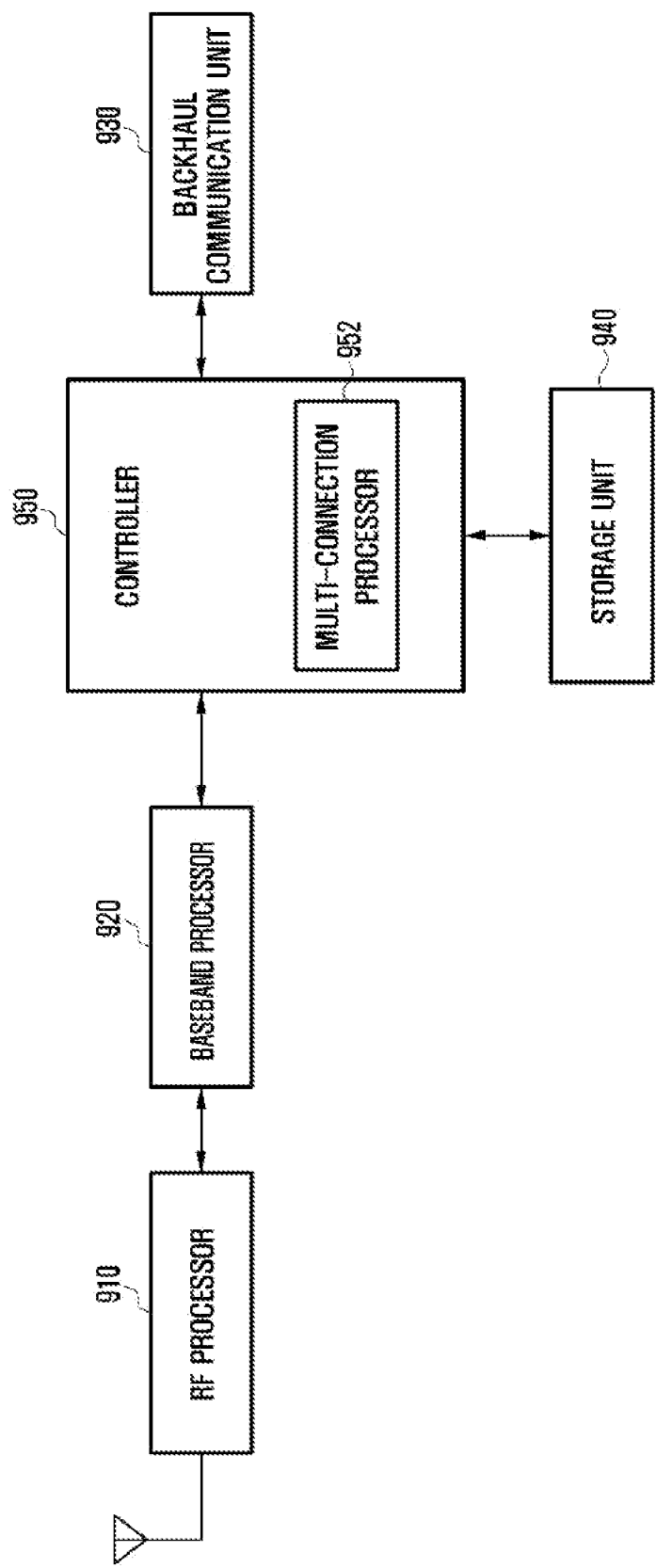
FIG. 9 is a block diagram illustrating the configuration of a base station according to the disclosure.

FIG. 9 is a diagram illustrating the structure of a base station capable of implementing an embodiment of the disclosure.

As shown in the drawing above, the base station includes an RF processor 910, a baseband processor 920, a backhaul communication unit 930, a storage unit 940, and a controller 950.

The RF processor 910 performs a function of transmitting and receiving signals through a wireless channel, such as band conversion and amplification of a signal. That is, the RE processor 910 up-converts a baseband signal provided from the baseband processor 920 to an RF band signal, to thus transmit the same through an antenna, and down-converts an RF band signal received through the antenna to a baseband signal. For example, the RF processor 910 may include a transmission filter, a reception filter, an amplifier, a mixer, an oscillator, a DAC, an ADC, and the like. Although only one antenna is shown in the drawing, the first access node may have a plurality of antennas. In addition, the RF processor 910 may include a plurality of RF chains. Further, the RF processor 910 may perform beamforming. To perform beamforming, the RF processor 910 may adjust the phases and magnitudes of signals transmitted and received through a plurality of antennas or antenna elements. The RF processor may perform a downlink MIMO operation by transmitting one or more layers.

The baseband processor 920 performs a function of conversion between a baseband signal and a bit string according to a physical layer specification of a first radio access technique. For example, in the case of data transmission, the baseband processor 920 encodes and modulates transmission hit strings, thereby generating complex symbols. In addition, upon receiving data, the baseband processor 920 demodulates and decodes a baseband signal provided from the RF processor 910 to thus recover reception bit strings. For example, in the case where an OFDM scheme is applied, when transmitting data, the baseband processor 920 generates complex symbols by encoding and modulating transmission bit strings, maps the complex symbols to subcarriers, and then configures OFDM symbols through the IFFT operation and CP insertion. In addition, when receiving data, the baseband processor 920 divides the baseband signal provided from the RF processor 910 into OFDM symbol units, restores the signals mapped to the subcarriers through the FFT operation, and then restores reception bit strings through demodulation and decoding. The baseband processor 920 and the RF processor 910 transmit and receive signals as described above. Accordingly, the baseband processor 920 and the RF processor 910 may be referred to as a "transmitter", a "receiver", a "transceiver", a "communication unit", or a "wireless communication unit".

The backhaul communication unit 930 provides an interface for performing communication with other nodes in the network. That is, the backhaul communication unit 930 converts a bit string, transmitted from the base station to another node, such as a secondary base station, a core network, etc., into a physical signal, and converts physical signals received from other nodes into bit strings.

The storage unit 940 stores data such as basic programs, application programs, and configuration information for the operation of the base station. In particular, the storage unit 940 may store information about bearers allocated to a connected terminal, a measurement result reported from a connected terminal, and the like. In addition, the storage unit 940 may store information that is a criterion for determining whether multiple connections are provided to the terminal or are released. In addition, the storage unit 940 provides the stored data in response to a request from the controller 950.

The controller 950 controls the overall operation of the base station. For example, the controller 950 transmits and receives signals through the baseband processor 920 and the RF processor 910 or the backhaul communication unit 930. In addition, the controller 950 records and reads data in and from the storage unit 940. To this end, the controller 950 may include at least one processor.

Second Embodiment

Hereinafter, terms for identifying connection nodes, terms referring to network entities, terms referring to messages, terms referring to interfaces between network entities, terms referring to a variety of identification information, and the like will be used as examples for the convenience of explanation. Therefore, the disclosure is not limited to the terms used herein, and other terms referring to objects having equivalent technical meanings may be used.

For the convenience of explanation, in the disclosure, terms and names defined in the 3rd generation partnership project long-term evolution (3GPP LTE) standard, among existing communication standards, will be used. However, the disclosure is not limited to the above-mentioned terms and names, and the disclosure may be equally applied to systems conforming to other standards. In particular, the disclosure is applicable to 3GPP New Radio (NR) (or 5th generation mobile communication standard).

Figure 10:
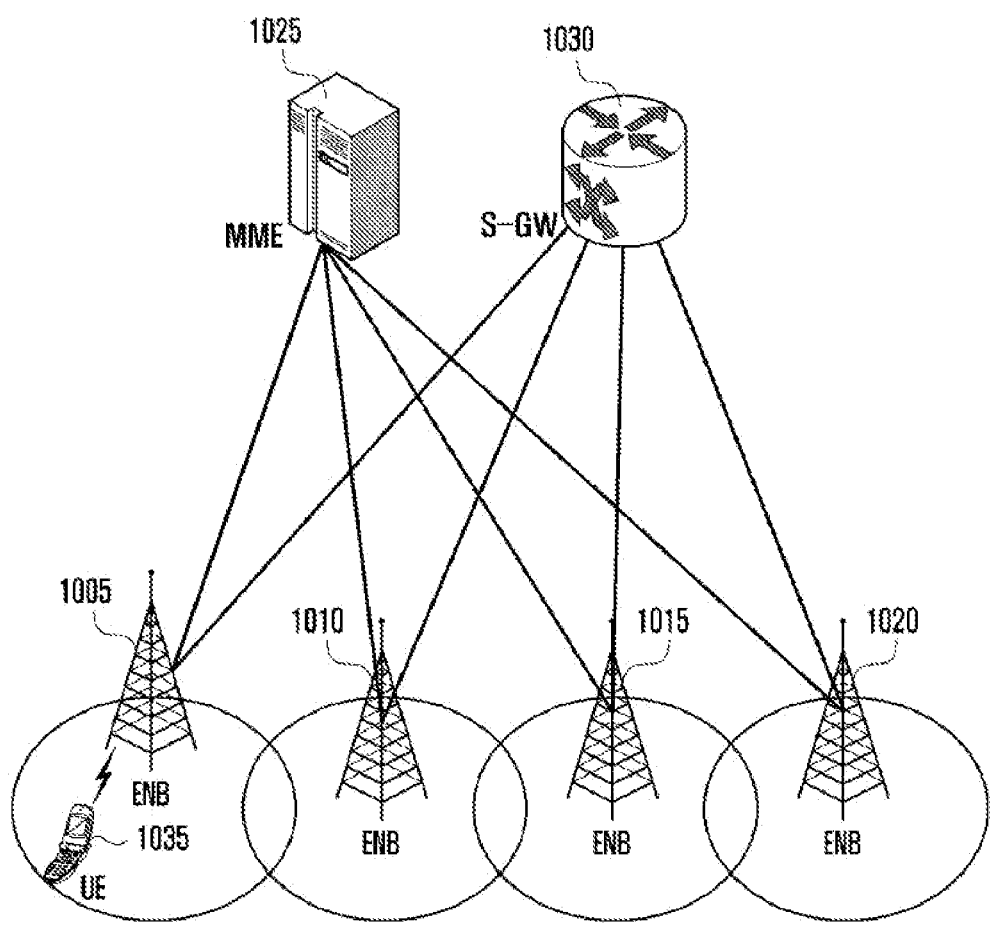
FIG. 10 is a diagram illustrating the structure of an LTE system.

FIG. 10 is a diagram illustrating the structure of an LTE system.

Referring to FIG. 10, the wireless communication system includes a plurality of base stations 1005, 1010, 1015, and 1020, a mobility management entity (MME) 1025, and a serving gateway (S-GW) 1030. User equipment (hereinafter, referred to as "LTE" or a "terminal") 1035 accesses an external network through the base stations 1005, 1010, 1015, and 1020 and the S-GW 1030.

The base stations 1005, 1010, 1015, and 1020 provide wireless access to terminals accessing the network as access nodes of a cellular network. That is, in order to serve traffic of users, the base stations 1005, 1010, 1015, and 1020 collect status information, such as buffer status, available transmission power status, channel status, and the like of terminals, and perform scheduling, thereby supporting connection between the terminals and a core network (CN). The MME 1025 performs various control functions, as well as a mobility management function for a terminal, and is connected to a plurality of base stations. The S-GW 1030 provides data bearers. In addition, the MME 1025 and the S-GW 1030 may further perform authentication and bearer management for the terminal accessing the network, and may process packets received from the base stations 1005, 1010, 1015, and 1020 or packets to be transmitted to the base stations 1005, 1010, 1015, and 1020.

Figure 11:
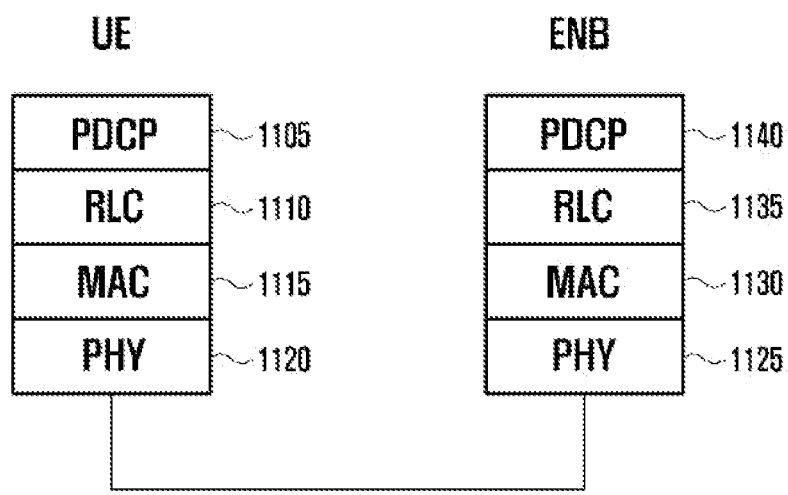
FIG. 11 is a diagram illustrating a wireless protocol structure of an LTE system.

FIG. 11 is a diagram illustrating a wireless protocol structure of an LTE system. The wireless protocol structure in the drawing may be different, in part, from that of NR, which will be defined later, but will be described for the convenience of explanation of the disclosure.

Referring to FIG. 11, the wireless protocol of the LTE system includes a packet data convergence protocol (PDCP) 1105 or 1140, a radio link control (RLC) 1110 or 1135, and a medium access control (MAC) 1115 or 1130 in a terminal and an ENB, respectively. The PDCP 1105 or 1140 performs operations, such as IP header compression/decompression and the like, and the RLC 1110 or 1135 reconfigures a PDCP PDL (packet data unit) to an appropriate size. The MAC 1115 or 1130 is connected to a plurality of RLC entities configured in a single terminal, multiplexes RLC into MAC PDUs, and demultiplexes RLC PDUs from MAC PDUs. The physical layer 1120 or 1125 channel-codes and modulates upper layer data, and converts the same into OFDM symbols to then be transmitted through a wireless channel, or demodulates OFDM symbols received through a wireless channel and channel-decodes the same to then be transmitted to upper layers. In addition, hybrid ARQ (HARQ) is also used for additional error correction in the physical layer, and a receiving end transmits 1 bit of information indicating whether or not a packet transmitted from a transmitting end has been received. This is called HARQ acknowledgement (ACK)/negative acknowledgement (NACK) information. Downlink HARQ ACK/NACK information with respect to uplink transmission may be transmitted through a physical hybrid-ARQ indicator channel (PHICH), and uplink HARQ ACK/NACK information with respect to downlink transmission may be transmitted through a physical uplink control channel (PIJCCH) or a physical uplink shared channel (PUSCH).

Although not shown in the drawing, a radio resource control (hereinafter, referred to as "RRC") layer exists in the upper layer of the PDCP layer of the terminal and the base station, respectively. The RRC layer may transmit and receive access/measurement-related configuration control messages for radio resource control. For example, it is possible to instruct the terminal to perform measurement using an RRC layer message, and the terminal may report a measurement result to the base station using an RRC layer message.

Figure 12:
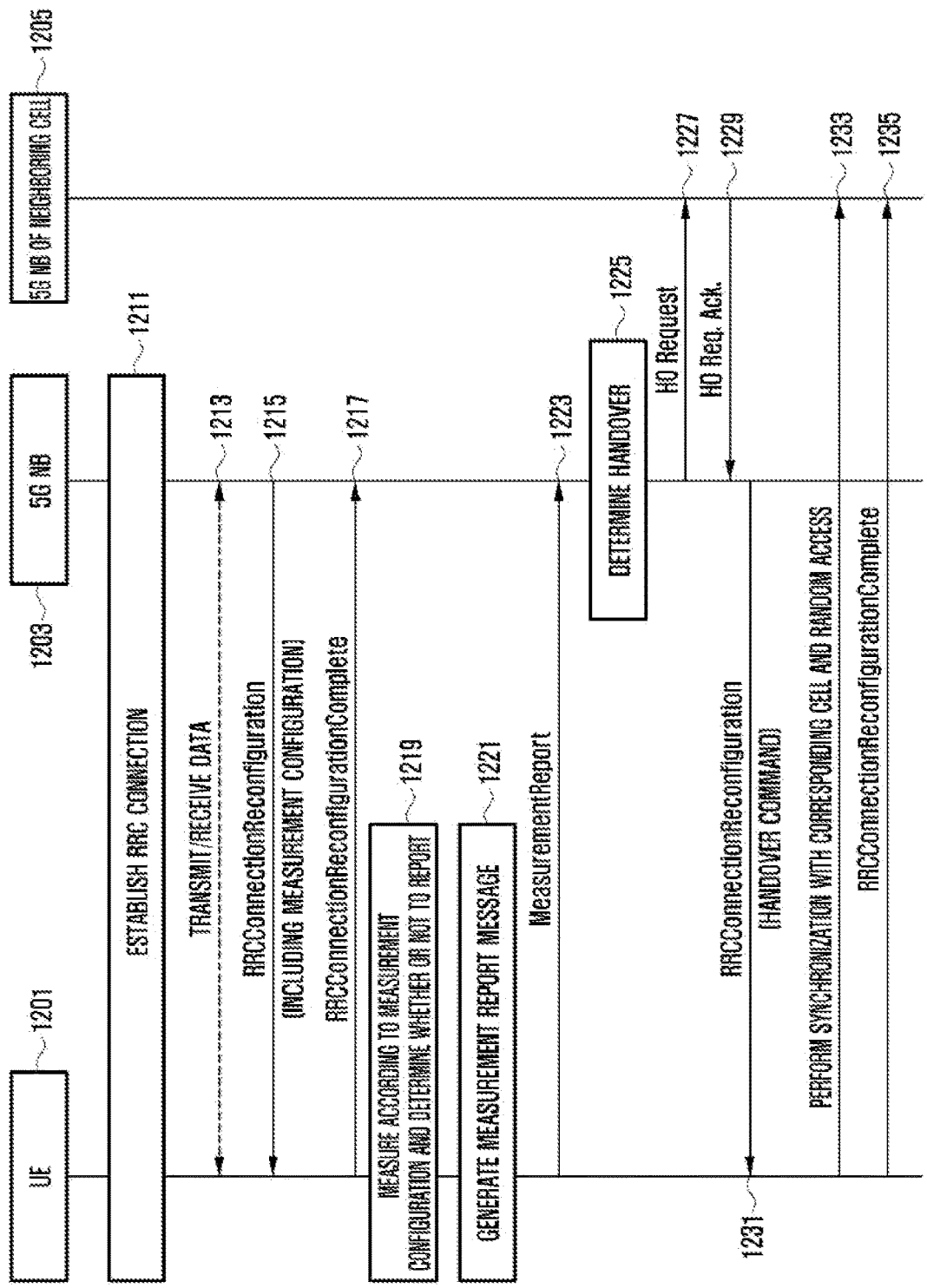
FIG. 12 is a diagram illustrating an example of a message flow between a terminal and a base station when using a method of reporting measurement results proposed in the disclosure.

FIG. 12 is a diagram illustrating message flow between a terminal and a base station when using a method of reporting a measurement result, which is proposed in the disclosure.

In FIG. 12, the terminal 1201 in an idle mode (RRC_IDLE) accesses a base station 1203 upon generation of data to be transmitted or the like (1211). Data cannot be transmitted in the idle mode because the terminal is disconnected from a network to save power or the like. Thus, switching to a connected mode (RRC_CONNECTED) is required in order to transmit data. If the terminal is successfully connected to the base station 1203, the terminal switches to a connected mode (RRC_CONNECTED), then the terminal and the base station, which are in the connected mode, are able to transmit and receive data (1213).

Thereafter, the base station configures the terminal so as to perform cell measurement around the terminal (1215). The measurement configuration may include measurement objects and report conditions.

The measurement objects may include information on which frequency to be measured, and the information may include information indicating whether there is a single beam or multiple beams in the cells at the corresponding frequency and, in the case of the multiple beams, detailed configuration information of the beams (e.g. the number of beams, an identifier of each beam, the measurement period thereof, and the like). In addition, the information may instruct the terminal to perform measurement only for specific beam identifiers.

In addition, the report conditions may include configuration such as periodical reporting of a measurement result to the base station or reporting of a measurement result to the base station if the following conditions are satisfied:

Event A1 (the case where a measurement result of a serving cell is better than a threshold value)

Event A2 (the case where a measurement result of a serving cell is worse than a threshold value)

Event A3 (the case where a measurement result of a neighboring cell is better than a measurement result of a primary cell (PCell) (the representative cell in the case where the terminal uses a plurality of serving cells) by an offset or more)

Event A4 (the case where a measurement result of a neighboring cell is better than a threshold value)

Event A5 (the case where a measurement result of a primary cell (PCell) is worse than threshold value 1 and where a measurement result of a neighboring cell is better than threshold value Event A6 (the case where a measurement result of a neighboring cell is better than a measurement result of a secondary cell (SCell) (the remaining cells, excluding the PCell, in the case where the terminal uses a plurality of serving cells) by an offset or more)

Meanwhile, in an NR system, a cell may include one or more beams, and thus, "a measurement result of a cell" may be a value calculated using measurement result values of beams of the cell. The base station may specifically indicate how to obtain the measurement results through the measurement configuration. For example, the base station may make a configuration such that each cell considers only N beams with the best measurement result, among a plurality of beams measured from respective cells. In addition, the base station may instruct to calculate the measurement result of a "cell" using a method, such as summation or averaging of the N beam results. The measurement configuration may be transmitted using an "RRCConnectionReconfiguration" message of the RRC layer. Thereafter, the terminal transmits an acknowledgment message in response to the configuration instruction (1217), and an "RRCConnectionReconfigurationComplete" message of the RRC layer may be used therefor.

The terminal having received the instruction of the measurement configuration determines whether or not to perform measurement on a beam basis according to the received configuration, thereby performing the measurement, and determines whether or not a measurement result corresponds to the report conditions configured by the base station (1219). If the measurement result corresponds to the report conditions {for example, if one of the above events is satisfied, if the corresponding condition is satisfied for a predetermined time ("TimeToTrigger" or TTT)} as a result of the determination, the terminal generates a message to report the measurement result to the base station (1221). In this case, the terminal determines for each cell whether or not to include, in the message, a measurement result of each cell and a measurement result of each beam in the cell. For example, the terminal may include the following information in the message according to the type of each cell.

Measurement result of PCell: including a cell-level measurement result and including each beam measurement result (satisfying predetermined conditions)

Measurement result of SCell: including a cell-level measurement result and including each beam measurement result (satisfying predetermined conditions)

Measurement result of neighboring-cell (the cell in the best M, the cell within the maximum reportable range): including a cell-level measurement result and including each beans measurement result (satisfying predetermined conditions)

Measurement result of neighboring-cell (the cell out of the best M, the cell within the maximum reportable range): including a cell-level measurement result Measurement result of neighboring-cell (the cell out of the best M, the cell out of the maximum reportable range): not including a measurement result The conditions in the expression "satisfying predetermined conditions" above may be indicated by the base station through the measurement configuration. For example, the base station configures whether or not to use a plurality of beams for each measurement object and a predetermined threshold value for each beam. If a measurement value of each beam for the cell using a plurality of beams is greater than the threshold value, the terminal determines that the predetermined conditions are satisfied and the result of the corresponding beam is included. The PCell and the SCell, which perform current communication, require information of each beam in order to determine whether or not to maintain the current communication. In addition, the neighboring cells may be ranked according to the measurement result values of the cell. If the base station configures a predetermined value M in the measurement configuration, the terminal may generate a measurement result of each beam of the cells that are ranked Mth or less, among the neighboring cells, as well as cell-level measurement results. In addition, the terminal generates a cell-level measurement result for the cell that is not included in the M ranking but belongs to the maximum reportable range, and does not generate a measurement result of the cell that is out of the maximum reportable range. Thereafter, the terminal transmits the generated measurement results to the base station (1223).

Accordingly, the base station determines whether or not to hand over the corresponding terminal (i.e., whether or not to move the terminal to another cell) (1225). If the base station determines to hand over the terminal, in order to prepare handover to a corresponding neighboring cell 1205 according to the information of the cells contained in the measurement results, the current base station 1203 transmits a handover request message to the corresponding base station 1205 (1227). The handover request message may include detailed information about the terminal to be handed over and information about an encryption key to be used in the corresponding base station by the terminal or the like. Accordingly, the base station receives a handover request acknowledge message from the corresponding base station to identify whether or not the handover is permitted (1229). The handover request acknowledgment message may include an identifier to be used by the terminal in the corresponding cell, random access resource information, and the like.

Accordingly, the source base station 1203 transmits a handover command to the terminal 1201 (1233). To this end, an "RRCConnectionReconfiguration" message may be used. Upon receiving the message, the terminal performs synchronization for a downlink signal with the indicated cell, performs a random access process to the corresponding cell in order to match uplink synchronization and uplink transmission power strength with respect thereto (1233), and transmits a handover completion message (this may be an "RRCConnectionReconfigurationComplete" message) to the corresponding cell, thereby completing the handover procedure (1235).

Figure 13:
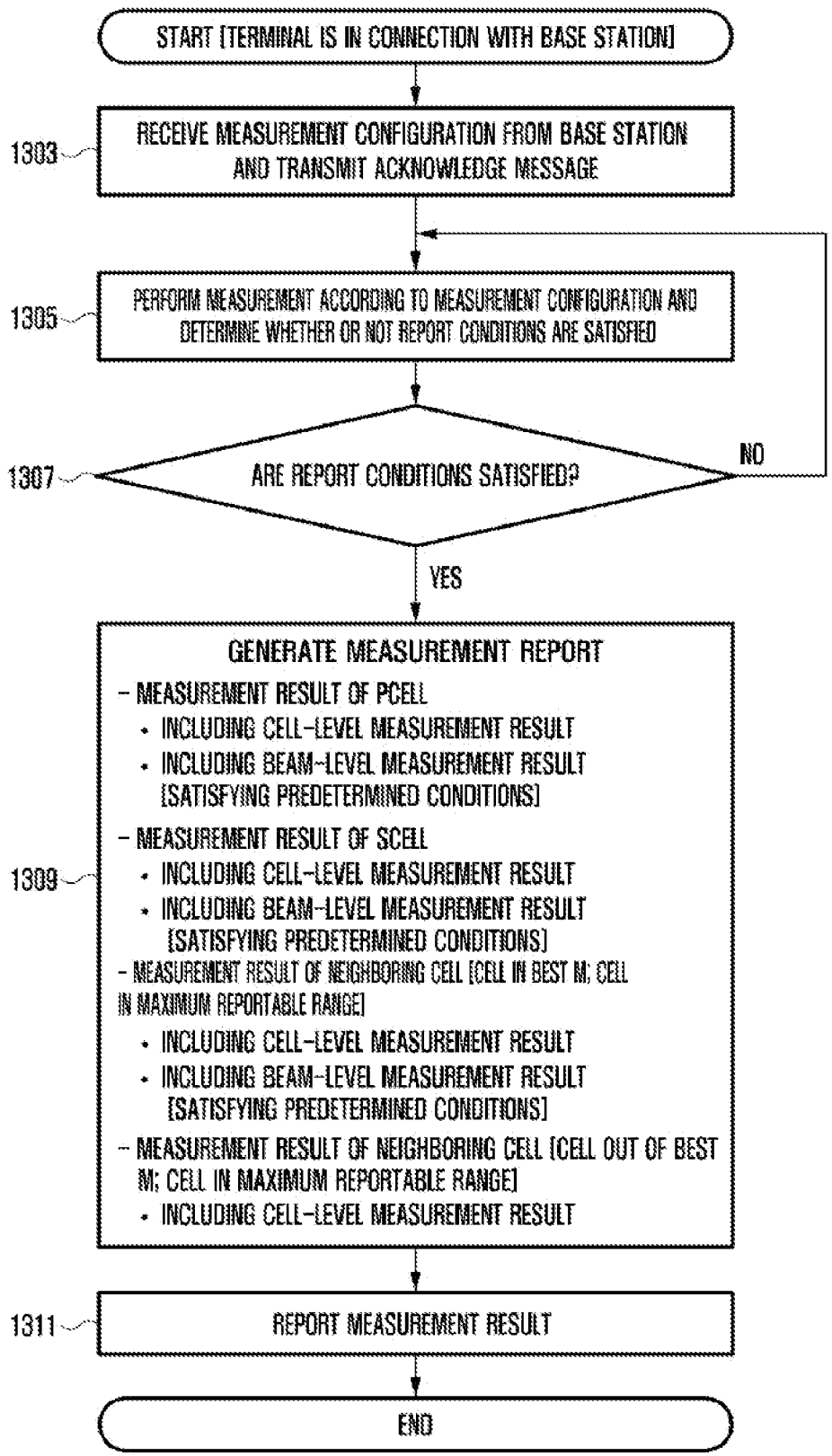
FIG. 13 is a diagram illustrating an example of the operation sequence of a terminal according to the disclosure.

FIG. 13 is a diagram illustrating an example of the operation sequence of a terminal in the case of applying the disclosure.

In FIG. 13, it is assumed that the terminal is in a connected mode (RRC_CONNECTED), and the terminal may transmit/receive data to/from the base station in the connected state (1301).

Thereafter, the base station configures the terminal so as to perform cell measurement around the terminal (1303). The measurement configuration may include measurement objects and report conditions.

The measurement objects may indicate information on the frequency to be measured, and the information may include information indicating whether there is a single beam or multiple beams in the cells at the corresponding frequency and, in the case of the multiple beams, detailed configuration information of the beams (e.g. the number of beams, an identifier of each beam, the measurement period thereof, and the like). In addition, the information may instruct the terminal to perform measurement only for specific beam identifiers.

In addition, the report conditions may include configuration such as periodical reporting of a measurement result to the base station or reporting of a measurement result to the base station if the following conditions are satisfied:

Event A1 (the case where a measurement result of a serving cell is better than a threshold value)
Event A2 (the case where a measurement result of a serving cell is worse than a threshold value)
Event A3 (the case where a measurement result of a neighboring cell is better than a measurement result of a primary cell (PCell)
Event A4 (the case where a measurement result of a neighboring cell is better than a threshold value)
Event A5 (the case where a measurement result of a primary cell (PCell) is worse than threshold value 1 and where a measurement result of a neighboring cell is better than threshold value 2)
Event A6 (the case where a measurement result of a neighboring cell is better than a measurement result of a secondary cell (SCell)

Meanwhile, in an NR system, a cell may include one or more beams, and thus, "a measurement result of a cell" may be a value calculated using measurement result values of beams of a cell. The base station may specifically indicate how to obtain the measurement results through the measurement configuration. For example, the base station may make a configuration such that each cell considers only N beams with the best measurement result, among the plurality of beams measured from respective cells. In addition, the base station may instruct to calculate the measurement result of a "cell" using a method, such as summation or averaging of the N beam results. The measurement configuration may be transmitted using an "RRCConnectionReconfiguration" message of the RRC layer. Thereafter, the terminal transmits an acknowledgment message in response to the configuration instruction, and an "RRCConnectionReconfigurationComplete" message of the RRC layer may be used therefor.

The terminal having received the instruction of the measurement configuration determines whether or not to perform measurement on a beam basis according to the received configuration, thereby performing the measurement, and determines whether or not a measurement result corresponds to the report conditions configured by the base station (1305). If the measurement result corresponds to the report conditions {for example, if one of the above events is satisfied or if the corresponding condition is satisfied for a predetermined time ("TimeToTrigger" or TTT)} as a result of the determination (1307), the terminal generates a message to report the measurement result to the base station (1309). In this case, the terminal determines whether or not to include, in the message, a measurement result of each cell and a measurement result of each beam in the cell. For example, the terminal may include the following information according to the type of each cell in the message.

Measurement result of PCell: including a cell-level measurement result and including each beam measurement result (satisfying predetermined conditions)
Measurement result of SCell: including a cell-level measurement result and including each beam measurement result (satisfying predetermined conditions)
Measurement result of neighboring-cell (the cell in the best M or the cell within the maximum reportable range): including a cell-level measurement result and including each beam measurement result (satisfying predetermined conditions)
Measurement result of neighboring-cell (the cell in the best M or the cell within the maximum reportable range): including a cell-level measurement result
Measurement result of neighboring-cell (the cell in the best M or the cell within the maximum reportable range): not including a cell-level measurement result The conditions in the expression "satisfying predetermined conditions" above may be indicated by the base station through the measurement configuration. For example, the base station configures whether or not to use a plurality of beams for each measurement object and a predetermined threshold value for each beam. If a measurement value of each beam for the cell using a plurality of beams is greater than the threshold value, the terminal determines that the predetermined conditions are satisfied and the result of the corresponding beam is included. The PCell and the SCell, which perform current communication, require information of each beam in order to determine whether or not to maintain the current communication. In addition, the neighboring cells may be ranked according to the measurement result values of the cell. If the base station configures a predetermined value M in the measurement configuration, the terminal may generate a measurement result of each beam of the cells that are ranked Mth or less, among the neighboring cells, as well as cell-level measurement results. In addition, the terminal generates a cell-level measurement result for the cell that is not included in the M ranking but belongs to the maximum reportable range, and does not generate a measurement result of the cell that is out of the maximum reportable range. Thereafter, the terminal transmits the generated measurement results to the base station (1311).

Although not shown in the drawing, the base station may determine whether or not to hand over the corresponding terminal (i.e., whether or not to move the terminal to another cell), and, if a handover command is received from the base station, the terminal performs handover to the corresponding cell.

Figure 14:
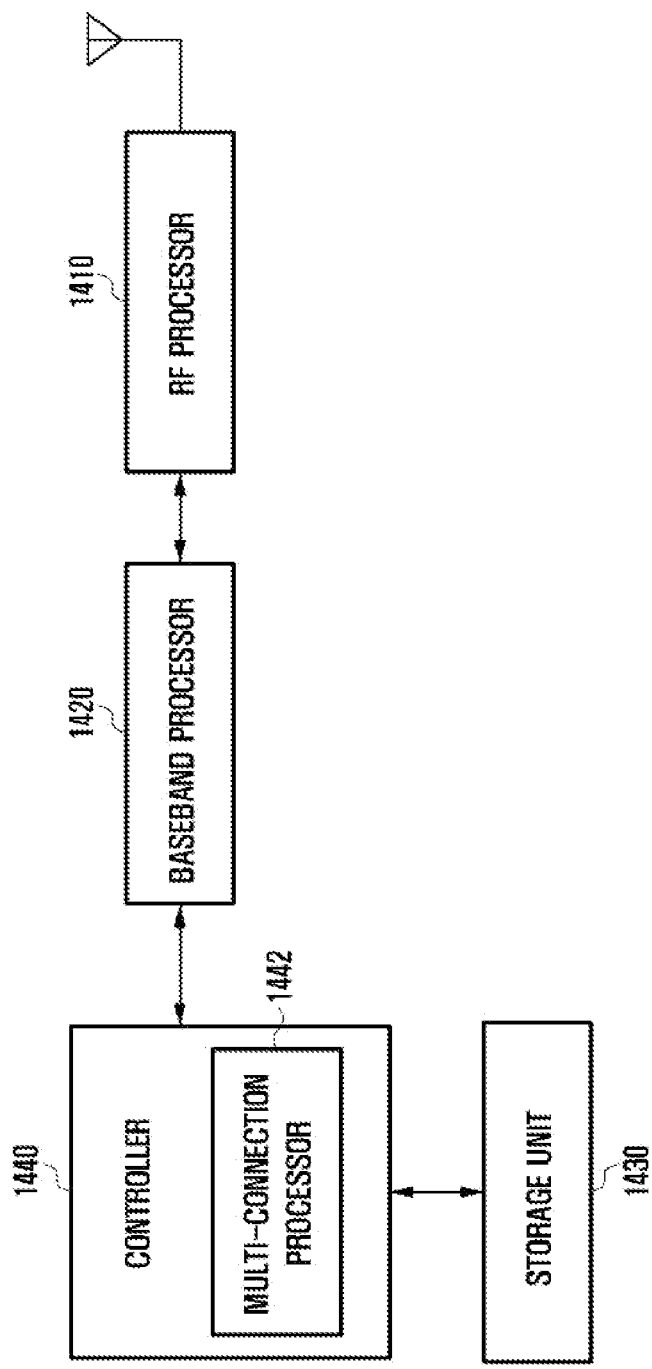
FIG. 14 is a block diagram illustrating a terminal according to an embodiment of the disclosure.

FIG. 14 is a block diagram illustrating a terminal according to an embodiment of the disclosure.

Referring to FIG. 14, the terminal includes a radio frequency (RF) processor 1410, a baseband processor 1420, a storage unit 1430, and a controller 1440.

The RF processor 1410 performs a function of transmitting and receiving a signal through a wireless channel, such as band conversion and amplification of a signal. That is, the RE processor 1410 up-converts a baseband signal provided from the baseband processor 1420 to an RI band signal to thus transmit the same through an antenna and down-converts an RF band signal received through the antenna to a baseband signal. For example, the RF processor 1410 may include a transmission filter, a reception filter, an amplifier, a mixer, an oscillator, a digital-to-analog converter (DAC), an analog-to-digital converter (ADC), and the like. Although only one antenna is illustrated in FIG. 14, the terminal may have a plurality of antennas. In addition, the RF processor 1410 may include a plurality of RF chains. Further, the RF processor 1410 may perform beamforming. To perform beamforming, the RF processor 1410 may adjust the phases and magnitudes of signals transmitted and received through a plurality of antennas or antenna elements.

The baseband processor 1420 performs a function of conversion between a baseband signal and a bit string according to the physical layer specification of the system. For example, in the case of data transmission, the baseband processor 1420 encodes and modulates transmission bit strings, thereby generating complex symbols. In addition, upon receiving data, the baseband processor 1420 demodulates and decodes a baseband signal provided from the RF processor 1410 to thus recover reception bit strings. For example, in the case where an orthogonal frequency division multiplexing (OFDM) scheme is applied, when transmitting data, the baseband processor 1420 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 1420 divides the baseband signal provided from the RF processor 1410 into OFDM symbol units, restores the signals mapped to the subcarriers through a fast Fourier transform (FFT) operation, and then restores reception bit strings through demodulation and decoding.

The baseband processor 1420 and the RF processor 1410 transmit and receive signals as described above. Accordingly, the baseband processor 1420 and the RF processor 1410 may be referred to as a "transmitter", a "receiver", a "transceiver", or a "communication unit". In addition, at least one of the baseband processor 1420 and the RF processor 1410 may include different communication modules to process signals of different frequency bands. The different frequency bands may include super-high frequency (SHF) (e.g., 2.5 GHz or 5 Ghz) bands and millimeter wave (e.g., 60 GHz) bands.

The storage unit 1430 stores data such as basic programs, application programs, and configuration information for the operation of the terminal.

The controller 1440 controls the overall operation of the terminal. For example, the controller 1440 transmits and receives signals through the baseband processor 1420 and the RF processor 1410. In addition, the controller 1440 records and reads data in and from the storage unit 1440. To this end, the controller 1440 may include at least one processor. For example, the controller 1440 may include a communication processor (CP) for controlling communication and an application processor (AP) for controlling upper layers such as application programs. According to embodiment an of the disclosure, the controller 1440 may include a multi-connection processor 1442 for performing a process for operation in a multi-connected mode. For example, the controller 1440 may perform control such that the terminal performs the operations illustrated in FIG. 14.

According to an embodiment of the disclosure, the terminal receives a message instructing measurement from the base station. The controller having received the message performs measurement according to a measurement event, conditions, and a handover command, which are configured by the base station, generates a measurement result report message according to the type of cell and configuration information, and transmits the measurement result report message to the base station.

Methods according to the claims of the disclosure or the embodiments described in the specification may be implemented in hardware, software, or a combination thereof.

When the methods are implemented in software, a computer-readable storage medium storing one or more programs (software modules) may be provided. One or more programs stored in a computer-readable storage medium are configured to be executed by one or more processors in an electronic device. One or more programs include instructions that allow the electronic device to execute the methods according to the claims of the disclosure or the embodiments described in the specification.

These programs (software modules or software) may be stored in random access memory, non-volatile memory including flash memory, ROM (read-only memory), EEPROM (electrically erasable programmable read-only memory), magnetic disc storage devices, CD-ROM (compact disk-ROM), DVDs (digital versatile discs), other types of optical storage devices, or magnetic cassettes. Alternatively, the programs may be stored in the memory configured as a combination of some or all of the same. In addition, a plurality of memories may be included.

In addition, the above programs may be stored in an attachable storage device that is accessible through a communication network, such as the Internet, an intranet, a LAN (local area network), a WLAN (wide LAN), or a SAN (storage area network), or a communication network configured as a combination thereof. Such a storage device may be connected to the device for performing the embodiments of the disclosure via an external port. Further, a separate storage device in the communication network may be connected to the device for performing the embodiments of the disclosure.

In the detailed embodiments of the disclosure described above, the elements included in the disclosure are expressed in a singular or plural form according to specific embodiments provided. However, the singular or plural forms have been appropriately selected according to the situations provided for the convenience of explanation, and the disclosure is not limited to the singular or plural elements. Thus, a single element may be provided even if the element is expressed in a plural form, and a plurality of elements may be provided even if the element is expressed in a singular form.

While the disclosure has been described in connection with the detailed embodiments herein, it should be understood that various modifications may be provided without departing from the scope of the disclosure. Therefore, the scope of the disclosure should not be limited by the illustrated embodiments, but should be determined by the scope of the appended claims and equivalents thereof.

Third Embodiment

Hereinafter, the operational principle of the disclosure will be described in detail with reference to the accompanying drawings. Hereinafter, a detailed description of known functions and configurations incorporated herein will be omitted if the description obscures the subject matter of the disclosure. In addition, the terms used herein are defined in consideration of the functions of the disclosure, and may be changed according to the intention or practices of the user or the operator, or the like. Therefore, the definition thereof should be based on the content throughout this specification. Hereinafter, terms for identifying connection nodes, terms refuting to network entities, terms referring to messages, terms referring to interfaces between network entities, terms referring to a variety of identification information, and the like will be used only as examples for the convenience of explanation. Therefore, the disclosure is not limited to the terms used herein, and other terms referring to objects having equivalent technical meanings may be used.

For the convenience of explanation, in the disclosure, terms and names defined in the 3rd generation partnership project long-term evolution (3GPP LTE) standard, or modified terms and names based on the same will be used. However, the disclosure is not limited to the above-mentioned terms and names, and the disclosure may be equally applied to systems conforming to other standards.

Figure 15:
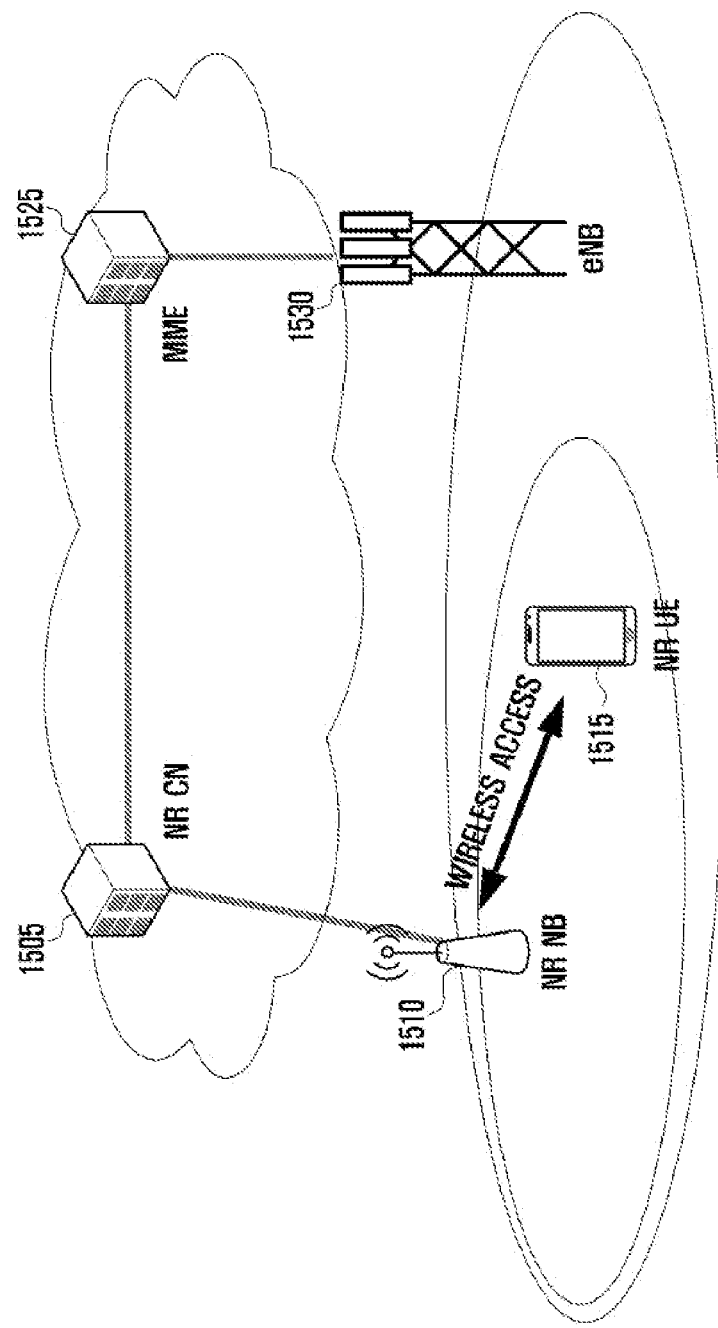
FIG. 15 is a diagram illustrating the structure of a next-generation mobile communication system.

FIG. 15 is a diagram illustrating the structure of a next-generation mobile communication system to which the disclosure is applied.

Referring to FIG. 15, a wireless access network of a next-generation mobile communication system includes a new radio node B (hereinafter, referred to as "NR gNB" or an "NR base station") 1510 and a new radio core network (NR CN) 1505 as shown in the drawing. New radio user equipment (hereinafter, referred to as "NR UE" or a "terminal") 1515 accesses an external network through the NR gNB 1510 and the NR CN 1505.

In FIG. 15, the NR gNB 1510 corresponds to an evolved node B (eNB) of an existing LTE system. The NR gNB 1510 is connected to the NR UE 1515 through a wireless channel, and may provide services superior to those of an existing node B. In the next-generation mobile communication system, since all user traffic is served through a shared channel, a device for collecting status information, such as buffer status, available transmission power status, and channel status of UEs, and performing scheduling is required. The NR gNB 1510 serves as such a device. One NR gNB 1510 typically controls multiple cells. In order to realize super-high data rates compared to the existing LTE system, the NR gNB 1510 may have a bandwidth equal to or greater than the maximum bandwidth of the existing system, may employ, as a wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal.

The NR CN 1505 performs functions such as mobility support, bearer configuration, and QoS configuration. The NR CN is a device that performs various control functions, as well as a mobility management function for the terminal, and is connected to a plurality of base stations. In addition, the next-generation mobile communication system may interwork with the existing LTE system, and the NR CN is connected to an MME 1525 through a network interface. The MME is connected to the eNB 1530, which is an existing base station, FIG. 16 is a diagram illustrating the structure of another next-generation mobile communication system to which the disclosure may be applied.

Figure 16:
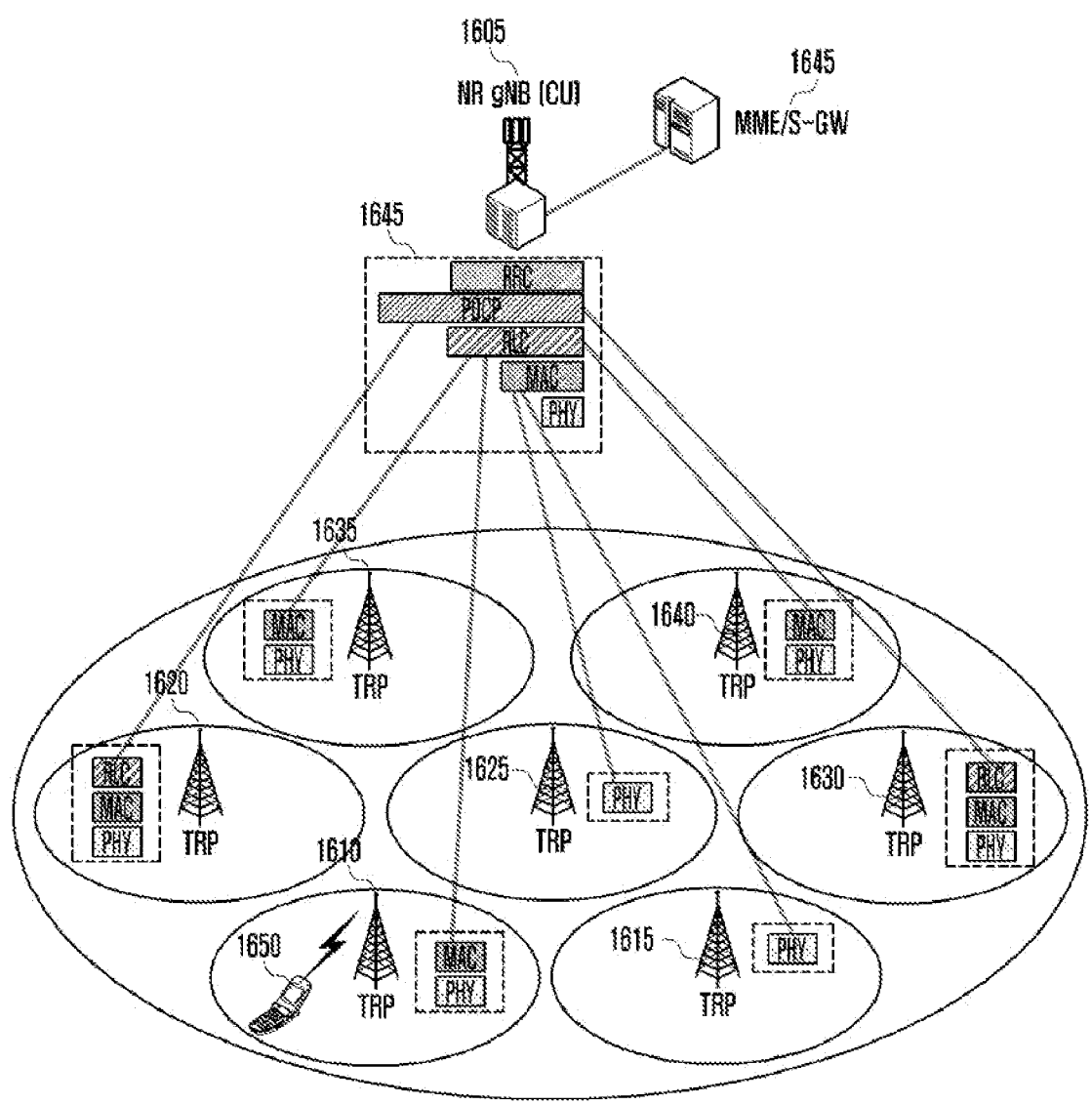
FIG. 16 is a diagram illustrating the structure of another next-generation mobile communication system.

Referring to FIG. 16, a cell served by a beam-based NR gNB 1605 may include a plurality of transmission reception points (TRPs) 1610, 1615, 1620, 1625, 1630, 1635, and 1640. The TRPs 1610, 1615, 1620, 1625, 1630, 1635, and 1640 are blocks in which some functions for transmitting and receiving physical signals are separated in the existing base station (eNB), and include a plurality of antennas. The NR gNB 1605 may be expressed as a central unit (CU), and the TRP may be expressed as a distributed unit (DU). The functions of the NR gNB 1605 and the TRP may be configured by separating layers such as PDCP, RLC, MAC, and PHY layers, as denoted by 1645. That is, a specific TRP may have only the PHY layer, thereby performing the function of the corresponding layer (1615 and 1625), a specific TRP may have only the PHY layer and the MAC layer, thereby performing the functions of the corresponding layers (1610, 1635, and 1640), and a specific TRP may have only the PRY layer, the MAC layer, and the RLC layer, thereby performing the functions of the corresponding layers (1620 and 1630).

In particular, specific TRPs 1610, 1615, 1620, 1625, 1630, 1635, and 1640 may use a beamforming technique of generating narrow beams in various directions using a plurality of transmission/reception antennas to transmit and receive data. The user equipment 1650 accesses the NR gNB 1605 and an external network through the TRPs 1610, 1615, 1620, 1625, 1630, 1635, and 1640. In order to provide services to users, the NR gNB 1605 collects status information, such as buffer status, available transmission power status, and channel status of the terminals, and performs scheduling, thereby supporting connections between the terminals and the core network (CN).

Figure 17:
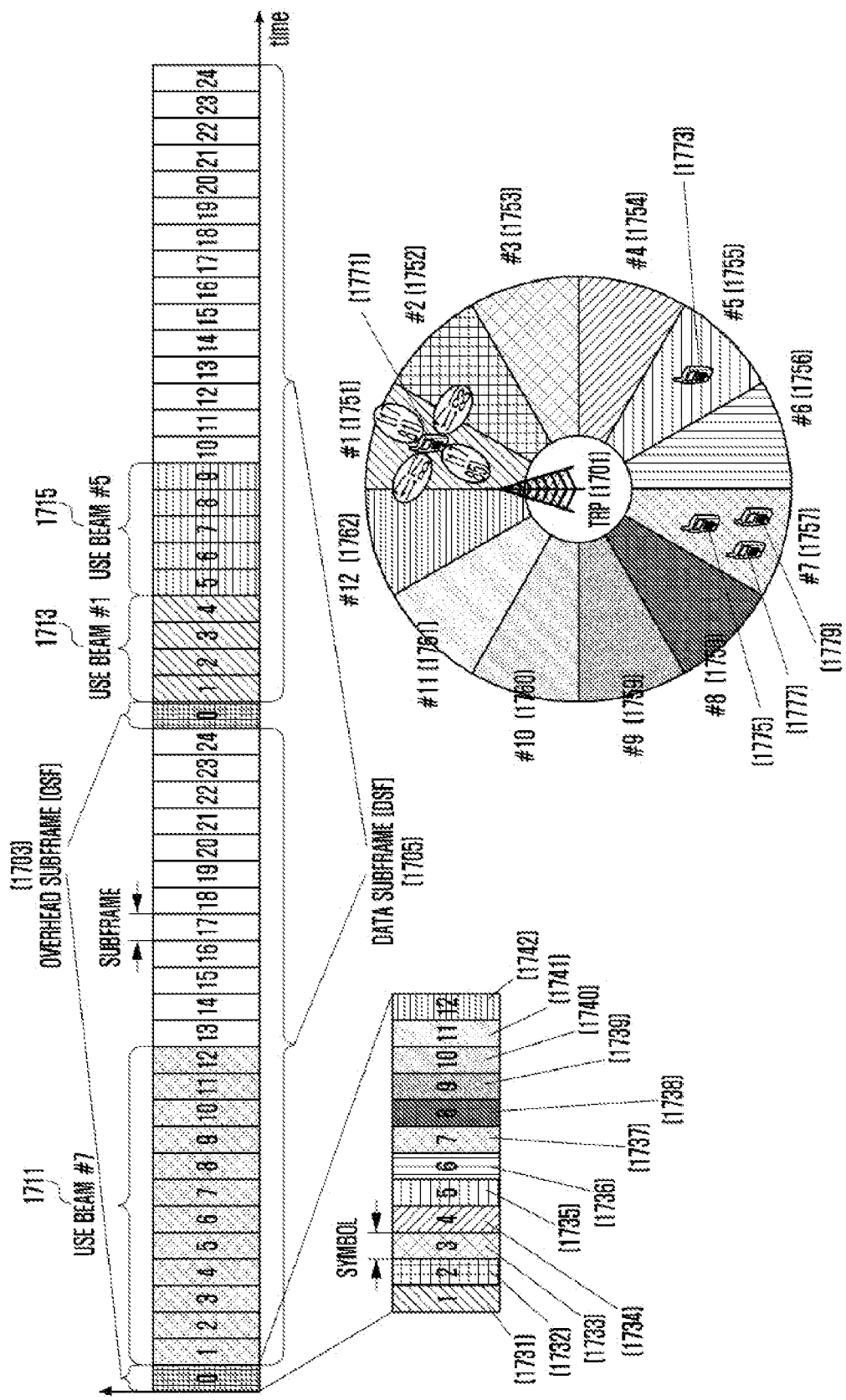
FIG. 17 is a diagram illustrating an example of a frame structure used by an NR system to which the disclosure is applied.

FIG. 17 is a diagram illustrating an example of a frame structure used by an NR system to which the disclosure is applied.

The NR system aims at a higher transmission rate than LTE and under consideration therefor is a scenario of operating at high frequencies to ensure wide frequency bandwidths. In particular, the NR system may consider a scenario in which data is transmitted to the terminal at a high data rate by generating directional beams at a high frequency.

Accordingly, it is possible to consider a scenario in which a base station or a transmission reception point (hereinafter, referred to as a "TRP") 1701 communicates with terminals 1771, 1773, 1775, 1777, and 1779 in the cell using different beams from each other. That is, in the illustrated example, a scenario in which terminal 1 (1771) performs communication using beam #1 (1751), terminal 2 (1773) performs communication using beam #5 (1755), and terminals 3, 4, and 5 (1775, 1777, and 1779) performs communication through beam #7 (1757) is assumed.

In order to measure the beam the terminal uses to communicate with the TRP, an overhead subframe (hereinafter, referred to as "OSF") 1703 in which a common overhead signal is transmitted exist in time. The OSF includes a primary synchronization signal (PSS) for obtaining timing of an orthogonal frequency division multiplexing (OFDM) symbol, a secondary synchronization signal (SSS) for detecting a cell ID, an extended synchronization signal (ESS) for obtaining timing of a subframe, and a beam reference signal (BRS) for identifying a beam. In addition, a physical broadcast channel (PBCH) including system information, a master information block (MIB), or information essential for a terminal to access the system (e.g., a bandwidth of a downlink beam, a system frame number, and the like, which are stored) may be transmitted.

In addition, in the OSF, the base station transmits a reference signal using different beams between symbols (or over several symbols). A beam index value for distinguishing between respective beams may be derived from the reference signal. In the illustrated example, it is assumed that there are twelve beams from beam #1 (1751) to beam #12 (1762), which are transmitted by the base station, and different beams are swept and transmitted for the respective symbols in the OSF. That is, different beams are transmitted for the respective symbols {for example, beam #1 (1751) is transmitted in a first symbol (1731)} in the OSF, and the terminal measures the signal in the OSF, thereby determining the beam having the largest signal strength, among the beams transmitted in the OSF.

In the illustrated example, it is assumed that the corresponding OSF is repeated every 25 subframes, and that the remaining 24 subframes are data subframes (hereinafter, referred to as "DSFs") 1705 in which general data is transmitted and received. Accordingly, a scenario in which terminals 3, 4, and 5 (1775, 1777, and 1779) perform communication using beam #7 in common (1711), terminal 1 (1771) performs communication using beam #1 (1713), and terminal 2 (1773) performs communication using beam #5 (1715) according to scheduling of the base station is assumed.

Although the exemplary drawing illustrates mostly transmission beams of the base station from beam #1 (1751) to beam #12 (1762), it is possible to further consider reception beams of the terminal {e.g., 1781, 1783, 1785, and 1787 of terminal 1 (1771)} for receiving the transmission beams of the base station. In the illustrated example, terminal 1 has four beams 1781, 1783, 1785, and 1787 and performs beam sweeping in order to determine the beam having the best reception performance. In this case, if a plurality of beams cannot be used at the same time, the terminal may receive a number of OSFs equal to the number of reception beams using a single reception beam for each OSF, thereby finding the optimal transmission beam of the base station and the optimal reception beam of the terminal.

Figure 18:
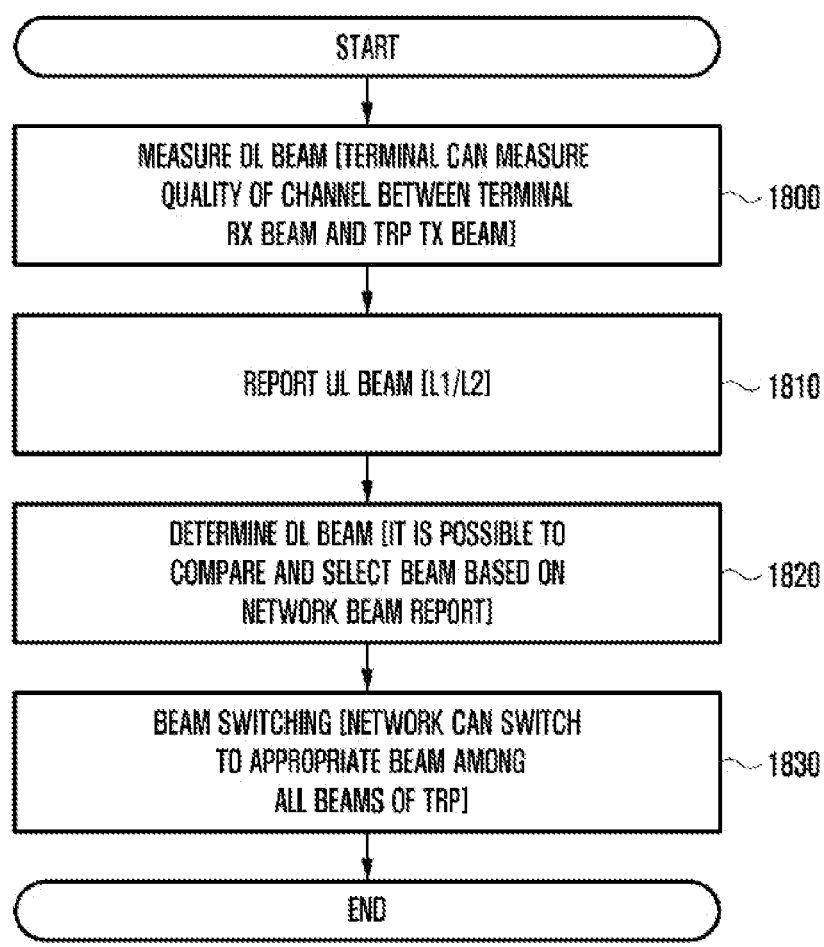
FIG. 18 is a diagram illustrating a beam management procedure in a next-generation mobile communication system to which the disclosure is applied.

FIG. 18 is a diagram illustrating a beam management procedure in a next-generation mobile communication system to which the disclosure is applied.

A mobility and connection method controlled by the network in the NR system is split into two categories. The first is RRC-based mobility management on a cell basis, as in the LTE system, and the second is a mobility management method that does not involve PAC, which may be referred to as "beam management". The RRC-based mobility management is applicable to inter-cell handover, and the mobility management that does not involve RRC is performed as a method for determining and selecting an optimal transmission and reception beam between NR UE and NR. TRPs. The beam management procedure will be described step by step below.

First, in step 1800, the NR UE may measure the strength of a downlink transmission beam from adjacent TRPs. The TRP transmission beams may be measured for each reception beam of the NR UE in the above step, and a beam sweeping method is used therein. That is, the NR UE changes the reception beam for every OSF using respective reception beams, and performs measurement of the transmission beams from the TRP swept every symbol in the corresponding OSF. Herein, downlink transmission beams transmitted from various TRPS may be transmitted through different codes or frequency resources, so that the NR UE may distinguish between the downlink transmission beams. In step 1810, the terminal reports one or more downlink beam measurement values to the NR gNB. The report may include a list of downlink transmission beams that the NR UE can receive as a current reception beam and beam strength, or may include a list of downlink transmission beams that the NR UE can receive as total reception beams and beam strength. In step 1820, the NR gNB performs a downlink beam determination step. In this step, the MR gNB compares a measurement value report result received from the NR UE and selects the beam to be used in the actual downlink transmission. In step 1830, the NR gNB switches to the most suitable beam (the beam determined in the above step), among the beams in all the TRPS, and transmits a signal to the NR UE through the corresponding beam.

The disclosure proposes a new method for measuring the strength of a downlink transmission beam on demand by the terminal. That is, a method in which the NR base station allocates a dedicated measurement reference signal (hereinafter, referred to as a "MRS") to the terminal, and the terminal measures allocated resources and reports a measurement result is provided. It is more effective to perform the measurement request and report through signaling in layer 1 and/or layer 2 for faster delivery of a message.

Figure 19:
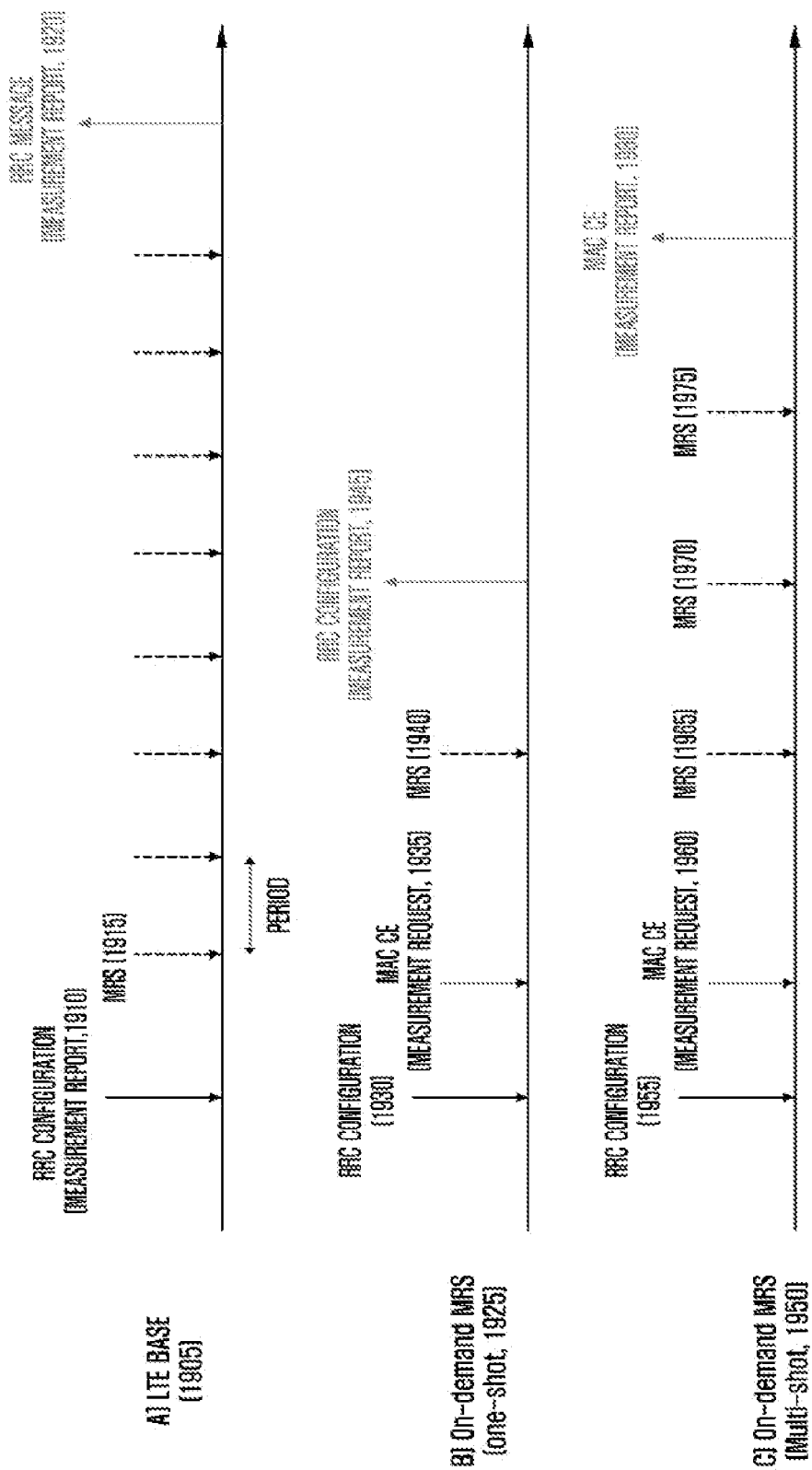
FIG. 19 is a diagram illustrating an example of a method of measuring and reporting a channel on demand by a terminal taken into consideration in the disclosure.

FIG. 19 is a diagram illustrating an example of a method of measuring and reporting a channel on demand by a terminal, which is taken into consideration in the disclosure.

The disclosure is a necessary operation according to the need for beam management depending on the mobility in the NR system using a beam, unlike the L3 measurement in the conventional LTE system. As the terminal in the connected mode moves in or out of the cell, it may be necessary to instruct the terminal to transmit and receive data to and from another beam, cell, or base station. To this end, the base station may be configured to instruct the terminal to measure a periphery beam in the same TRP of a serving beam or the same cell, another transmission and reception point (inter-TRP) of the same cell, or a periphery beam of another cell. The measurement instruction may include conditions in which the terminal must report transmission resource information and a result of a measurement reference signal to be measured from the base station, and parameters thereof. In the embodiment, the mobility and connection management method in the same cell (a serving cell), among the mobility and connection management schemes listed above, will be described. In particular, this will be referred to as a "beam management method" that does not involve RRC in the NR system.

The next-generation communication system may use a measurement reference signal (hereinafter, referred to as an "MRS") for cell-level and beam-level mobility. That is, the MRS may be beamformed and transmitted to a single or multiple terminals in a serving cell, and each terminal may have different mobility features. The measurement configuration and the measurement method used in the existing LTE system are shown as denoted by reference numeral 1905. The base station may configure information related to the measurement through an RRC control message so that the terminal may measure the MRS (1910). The corresponding information includes frequency information of measurement objects, the MRS transmission period 1915, and parameters related to the related measurement report. The parameters include measurement report conditions (event triggering or periodic reporting). If the measurement report conditions are satisfied through the MRS measurement, the measurement report may be performed through an RRC message. However, the beam measurement through the RRC configuration is not suitable for the NR beam management procedure in a serving cell that requires immediate measurement.

A first embodiment of a measurement request and a measurement report using a MAC control element (CE) proposed by the disclosure is shown in 1925. The base station may include a configuration signal for L3 measurement in the RRC control message 1930, and configures also frequency information of a one-shot MRS 1940 that is transmitted through a measurement request MAC CE 1935 on new demand by the terminal and time/resource information. The terminal transmits a measurement report 1945 after performing measurement of the reference signal 1940. The measurement report 1945 may be transmitted by event-triggering or obligatorily, and the measurement report may be included in the RRC control message or the measurement request MAC CE. The measurement report 1945 is also transmitted through a new MAC CE.

A second embodiment of a measurement request and a measurement report using a MAC GE proposed by the disclosure is shown in 1950. The base station may include a configuration signal for L3 measurement in the RRC control message 1955, and configures also the number of multi-shot MRSs 1965, 1970, and 1975 transmitted through the measurement request MAC GE 1960 on new demand by the terminal, frequency information, and time/resource information. The number of transmissions of the MRS 1965, 1970, and 1975, a period of the transmission, an initial transmission frequency, and time/resource information may be transmitted as the information. The terminal transmits a measurement report 1980 after performing measurement of the corresponding reference signals 1965, 1970, and 1975. The measurement report 1980 may be transmitted by event-triggering or obligatorily, and the measurement report may be included in the RRC control message or the measurement request MAC CE. The measurement report 1980 is also transmitted through a new MAC CE.

Figure 20:
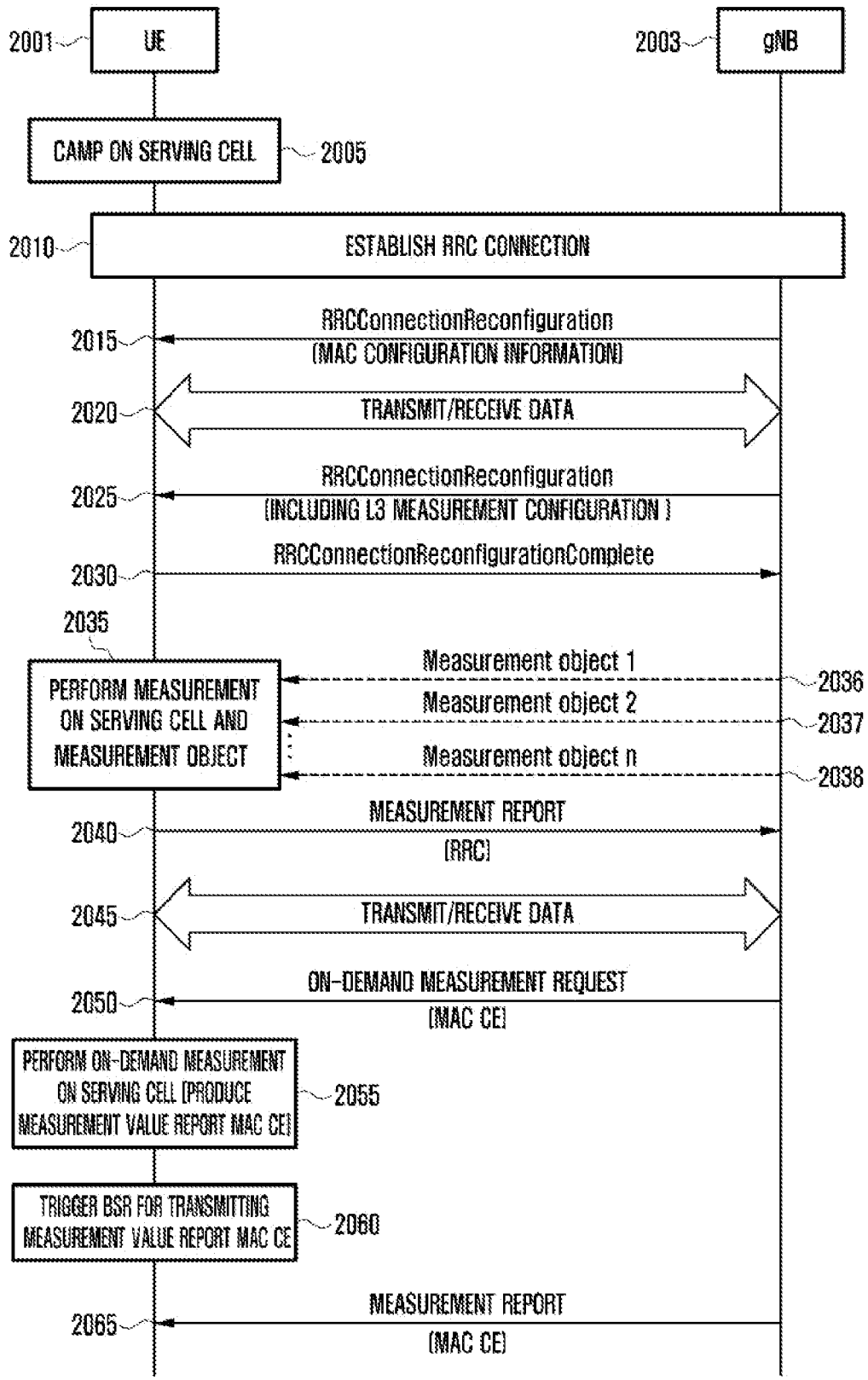
FIG. 20 is a diagram illustrating a procedure of measuring and reporting a channel on demand by a terminal using a MAC CE according to an embodiment of the disclosure.

FIG. 20 is a diagram illustrating a procedure of measuring and reporting a channel on demand by a terminal using a MAC CE according to an embodiment of the disclosure.

A terminal 2001 in the idle mode (RRC_IDLE) finds a suitable cell, camps on the corresponding base station 2003 (2005), and performs access to the base station 2003 through establishment of an RRC connection due to generation of data to be transmitted (2010). Data cannot be transmitted in the idle mode because the terminal is disconnected from a network to save power or the like. Thus, switching to a connected mode (RRC_CONNECTED) is required for data transmission. In addition, "camping on" means that the terminal is staying in the corresponding cell and is monitoring a paging message in order to determine whether or not data is transmitted in the downlink. If the terminal is successfully connected to the base station 2003, the terminal may switch to a connected mode (RRC_CONNECTED), and the terminal in the connection mode may transmit/receive data to/from the base station.

The terminal 2001 in the connected mode may receive MAC configuration information from the base station 2003 through an "RRCConnectionReconfiguration" message (2015). The RRC control message includes mapping information between logical channels (LCs) and logical channel groups (LCGs) and mapping information between the measurement result MAC CEs and the LCGs. The MAC configuration information is mapping information in the case where the measurement result MAC CE triggers a buffer status report (BSR), and, unlike the BSR in the existing LTE system, a new BSR in the NR system must include the amount of MAC CE data, as well as the amount of data for each LCCA. Alternatively, it is possible to specify a logical channel group to which specific MAC CEs belong through an RRC control message. Thereafter, the terminal 2001 and the base station 2003 may perform data transmission and reception.

As the terminal in the connected mode moves in or out of the cell, it may be necessary to instruct the terminal to transmit and receive data to and from another beam, cell, or base station. To this end, the base station 2003 may be configured to instruct the terminal to measure a periphery beam of another cell (L3 measurement) through an RRC message (2025). The measurement instruction may include conditions in which the terminal 2001 must report a measurement result to the base station 2003 and parameters thereof. The terminal 2001 having received the configuration information described above transmits, to the base station 2003, an acknowledgement message indicating that the configuration information has been successfully received (2030). To this end, an "RRCConnectionReconfiguration-Complete" message may be used in the same manner as the LTE system.

In step 2035, the terminal 2001 measures the strength of downlink transmission beams {i.e., measurement objects 1 (2026), 2 (2027), . . . , n (2028)} from the TRPs included in the NR base station 2003 or another cell. In the above step, the terminal 2001 obtains cell-level measurement results and determines the report conditions received from the base station 2003. The terminal 2001 reports the measurement results to the base station 2003 through an RRC message according to the configured measurement value report conditions (2040), and resumes data transmission and reception (2045).

In step 2050, the base station 2003 transmits, to the terminal, a measurement request MAC CE on demand by the terminal, thereby providing time/resource information on the MRS to be measured by the terminal. If the base station operates according to the first embodiment illustrated in connection with FIG. 1 in the above step, the measurement request MAC CE includes an indicator indicating that the MRS is a one-shot MRS and time/frequency information of the MRS resource. If the base station operates according to the second embodiment illustrated in connection with FIG. 19, the measurement request MAC CE includes an indicator indicating that the MRS is a multi-shot MRS and information on the time/frequency for transmission of the corresponding MRSs. The information may include a list of respective pieces of resource information, the number of MRS-transmissions and the period thereof, and time/frequency information of an initial transmission MRS.

The Terminal 2001 having received the measurement request MAC CE performs on-demand measurement configured for the serving cell, and generates an MAC CE for measurement report (2055). The measurement value report may be generated according to triggering conditions configured by the base station (event-triggering, mandatory report, or periodic report). In addition, the terminal may trigger the BSR for transmission of the measurement value report MAC CE (2060). The new BSR must include the amount of MAC CE data, as well as the amount of data for each LCG. To this end, logical channel priority is required to be allocated for the MAC CE. Alternatively, the MAC CE may be included in a data packet and then transmitted in the case where the terminal in a connected state exchanges data. Thereafter, in step 2065, the terminal 2001 transmits the generated measurement report MAC CE to the base station 2003.

Figure 21:
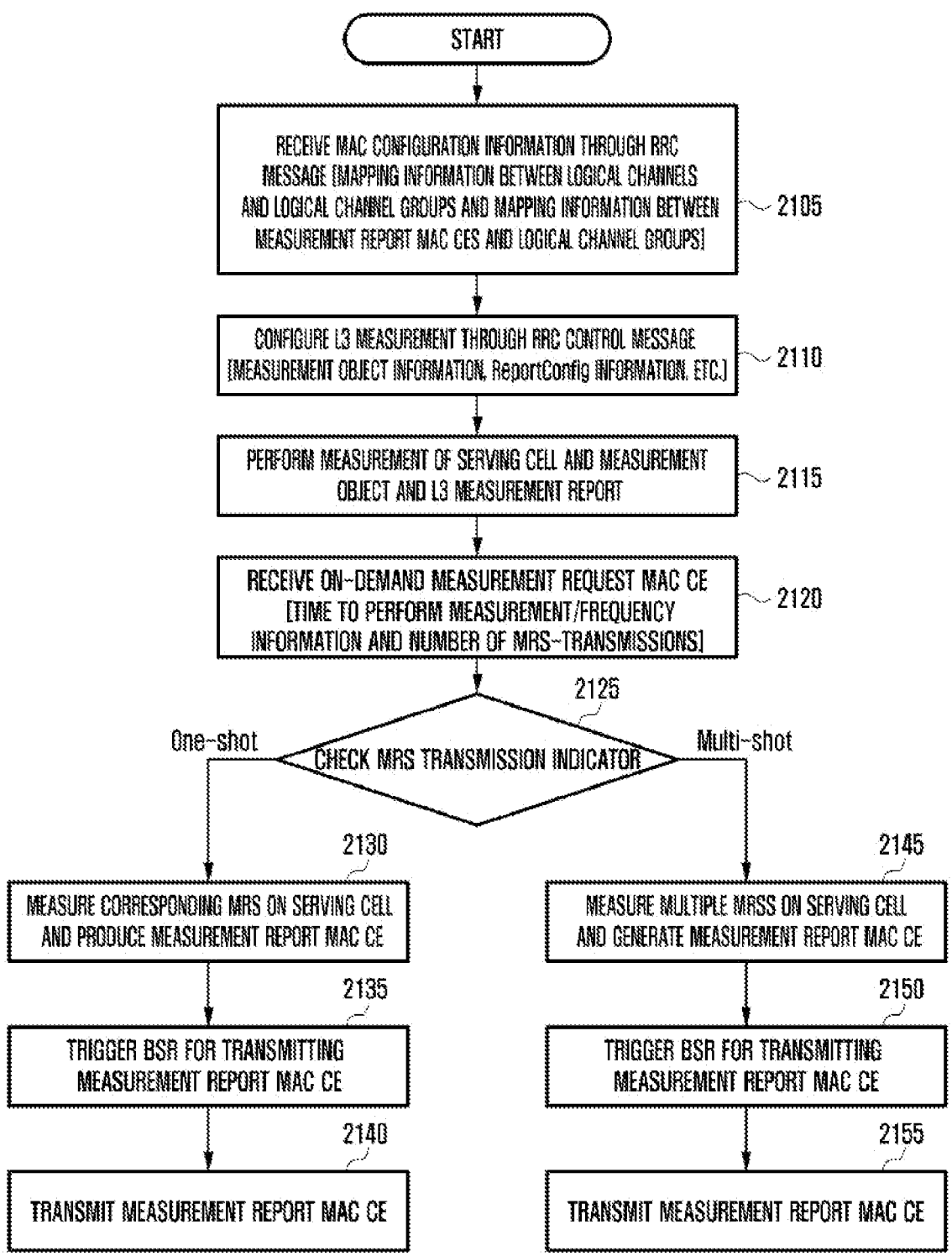
FIG. 21 is a diagram illustrating the operation of a terminal according to an embodiment of the disclosure.

FIG. 21 is a diagram illustrating the operation of a terminal according to an embodiment of the disclosure.

The terminal in the connection mode may receive MAC configuration information from the base station through an RRC control message (2105). The RRC control message includes mapping information between logical channels (LCs) and logical channel groups (LCGs), and mapping information between the measurement result MAC CEs and the LCGs. The MAC configuration information is mapping information in the case where the measurement result MAC CE triggers a BSR, and, unlike the BSR in the existing LTE system, a new BSR in the NR system must include the amount of MAC CE data, as well as the amount of data for each LCG. Alternatively, it is possible to specify a logical channel group to which specific MAC CEs belong through an RRC control message. Thereafter, the terminal may transmit/receive data to/from the base station.

As the terminal in the connected mode moves in or out of the cell, it may be necessary to instruct the terminal to transmit and receive data to and from another beam, cell, or base station. To this end, the terminal receives configuration information on the measurement of a periphery beam of another cell (L3 measurement) through the RRC message (2110). The measurement configuration may include conditions in which the terminal must report a measurement result to the base station and parameters thereof. That is, the measurement configuration includes information on the measurement objects and "ReportConfig" information.

The terminal performs measurement according to the conditions configured for the serving cell and the measurement objects, and performs L3 measurement report of the serving cell according to the measurement report condition (2115). Thereafter, the terminal receives, from the base station, an on-demand measurement request MAC CE for the mobility in the serving cell, i.e., for beam management (2120). The message includes an indicator indicating that the MRS is a one-shot MRS or a multi-shot MRS, and time/frequency information for transmission of the MRS resource. If the message includes an indicator indicating the multi-shot MRS, the message may include time/frequency information about transmission of the corresponding MRSs, or may include the number of MRS-transmissions and a period thereof and time/frequency information of an initial transmission MRS.

The terminal having received the MAC CE may perform different operations (2125) after identifying the indicator of the corresponding MRS transmission. If the indicator included in the MAC CE indicates transmission of a one-shot MRS, the terminal measures the corresponding MRS of the serving cell and generates a measurement report MAC CE in step 2130. The measurement value report may be generated according to triggering conditions (event-triggering, mandatory report, or periodic report) configured by the base station. Thereafter, the terminal may trigger a BSR for transmission of a measurement value report MAC GE (2135). The new BSR must include the amount of MAC CE data, as well as the amount of data for each LCG. To this end, logical channel priority is required to be allocated for the MAC CE. Alternatively, the MAC CE may be included in a data packet and may then be transmitted in the case where the terminal in a connected state exchanges data, and in this case, step 2135 may be omitted. Thereafter, in step 2140, the terminal transmits the generated measurement report MAC CE to the base station.

If the indicator included in the MAC CE indicates transmission of a multi-shot MRS in step 2125, the terminal measures a plurality of corresponding MRSs of the serving cell and generates a measurement report MAC CE in step 2145. The measurement value report may be generated according to triggering conditions (event-triggering, mandatory report, or periodic report) configured by the base station. That is, the report may be triggered by measuring one of the plurality of MRSs, or may be triggered after measuring all the MRSs, Thereafter, the terminal may trigger a BSR for transmission of a measurement value report MAC CE (2150). The new BSR must include the amount of MAC CE data, as well as the amount of data for each LCG. To this end, logical channel priority is required to be allocated for the MAC CE. Alternatively, the MAC CE may be included in a data packet to then be transmitted in the case where the terminal in a connected state exchanges data, and in this case, step 2150 may be omitted. Thereafter, in step 2155, the terminal transmits the generated measurement report MAC CE to the base station.

Figure 22:
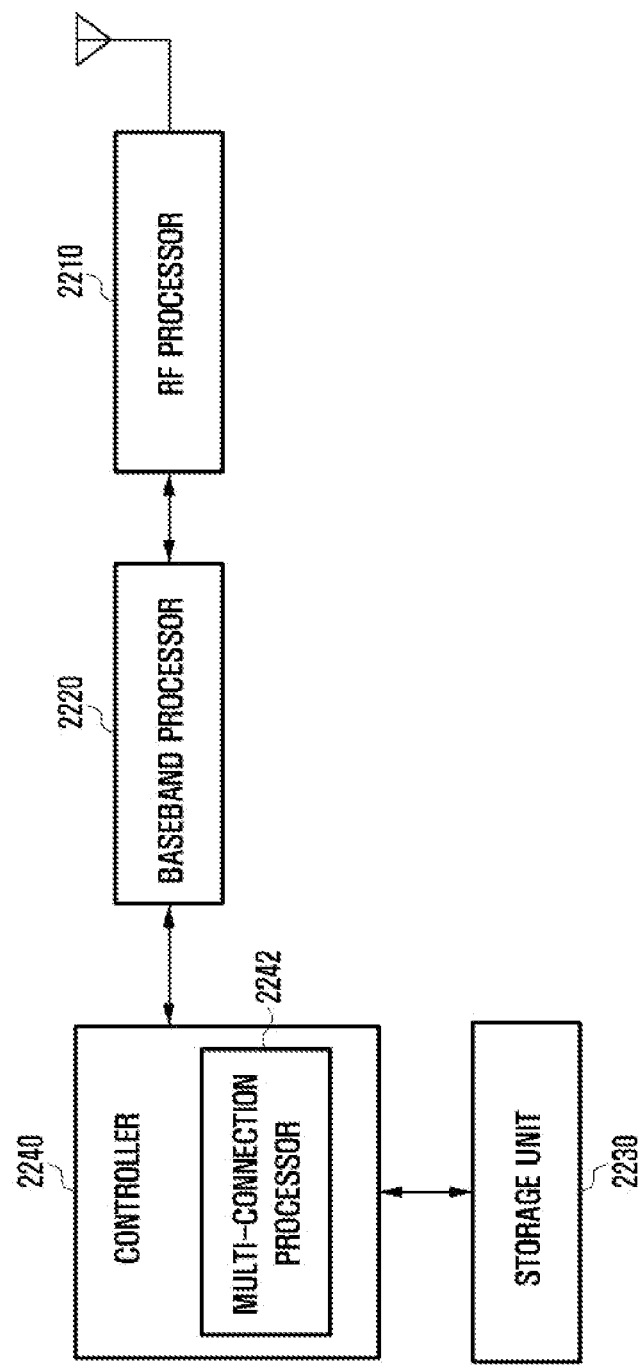

FIG. 22 is a block diagram illustrating the internal structure of a terminal capable of implementing the disclosure.

Referring to the drawing, the terminal includes a radio frequency (RE) processor 2210, a baseband processor 2220, a storage unit 2230, and a controller 2240.

The RF processor 2210 performs a function of transmitting and receiving a signal through a wireless channel, such as band conversion and amplification of a signal. That is, the RE processor 2210 up-converts a baseband signal provided from the baseband processor 2220 to an RE band signal to thus transmit the same through an antenna and down-converts an RE band signal received through the antenna to a baseband signal. For example, the RF processor 2210 may include a transmission filter, a reception filter, an amplifier, a mixer, an oscillator, a digital-to-analog converter (DAC), an analog-to-digital converter (ADC), and the like. Although only one antenna is illustrated in the drawing, the terminal may have a plurality of antennas. In addition, the RF processor 2210 may include a plurality of RF chains. Further, the RF processor 2210 may perform beamforming. To perform beamforming, the RF processor 2210 may adjust the phases and magnitudes of signals transmitted and received through a plurality of antennas or antenna elements. In addition, the RF processor may perform MIMO, and may receive a plurality of layers when performing the MIMO operation.

The baseband processor 2220 performs a function of conversion between a baseband signal and a bit string according to the physical layer specification of the system. For example, in the case of data transmission, the baseband processor 2220 encodes and modulates transmission bit strings, thereby generating complex symbols. In addition, upon receiving data, the baseband processor 2220 demodulates and decodes a baseband signal provided from the RF processor 2210 to thus recover reception bit strings. For example, in the case where an orthogonal frequency division multiplexing (OFDM) scheme is applied, when transmitting data, the baseband processor 2220 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 2220 divides the baseband signal provided from the RF processor 2210 into OFDM symbol units, restores the signals mapped to the subcarriers through a fast Fourier transform (FFT) operation, and then restores reception bit strings through demodulation and decoding.

The baseband processor 2220 and the RF processor 2210 transmit and receive signals as described above. Accordingly, the baseband processor 2220 and the RF processor 2210 may be referred to as a "transmitter", a "receiver", a "transceiver", or a "communication unit". In addition, at least one of the baseband processor 2220 and the RF processor 2210 may include a plurality of communication modules to support a plurality of different wireless access technologies. Further, at least one of the baseband processor 2220 and the RF processor 2210 may include different communication modules to process signals of different frequency bands. For example, the different radio access technologies may include wireless LANs (e.g., IEEE 802.11), cellular networks (e.g., LTE), and the like. In addition, the different frequency bands may include super-high frequency (SHF) (e.g., 2·NRHz or NRhz) bands and millimeter wave (e.g., 60 GHz) bands.

The storage unit 2230 stores data such as basic programs, application programs, and configuration information for the operation of the terminal. In particular, the storage unit 2230 may store information related to a second access node for performing wireless communication using a second radio access technique. In addition, the storage unit 2230 provides the stored data according to a request by the controller 2240.

The controller 2240 controls the overall operation of the terminal. For example, the controller 2240 transmits and receives signals through the baseband processor 2220 and the RF processor 2210. In addition, the controller 2240 records and reads data in and from the storage unit 2240. To this end, the controller 2240 may include at least one processor. For example, the controller 2240 may include a communication processor (CP) for controlling communication and an application processor (AP) for controlling upper layers such as application programs.

Figure 23:
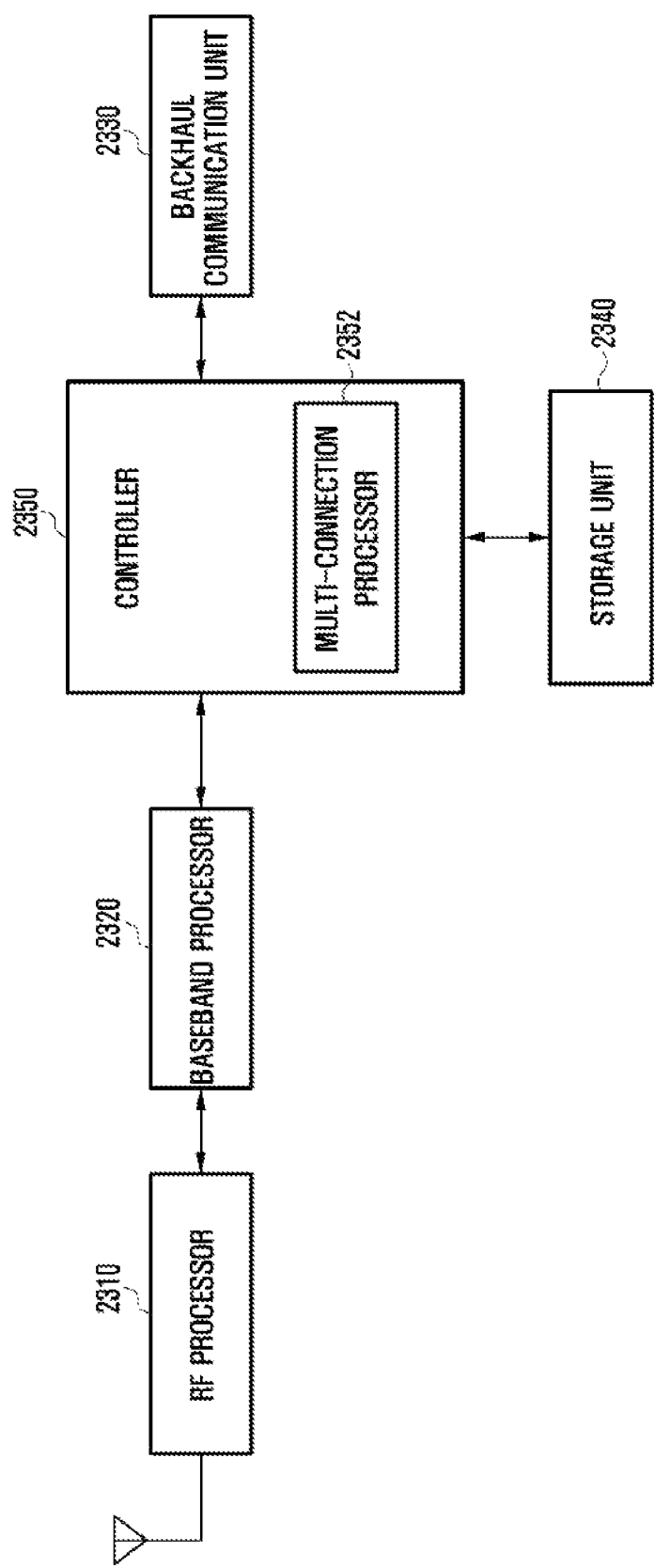
FIG. 23 is a block diagram illustrating the configuration of an NR base station capable of implementing the disclosure.

FIG. 23 is a block diagram illustrating the configuration of an MR base station capable of implementing the disclosure.

As shown in the drawing, the base station includes an RF processor 2310, a baseband processor 2320, a backhaul communication unit 2330, a storage unit 2340, and a controller 2350.

The RF processor 2310 performs a function of transmitting and receiving signals through a wireless channel, such as band conversion and amplification of a signal. That is, the RE processor 2310 up-converts a baseband signal provided from the baseband processor 2320 to an RE band signal, to thus transmit the same through an antenna, and down-converts an RF band signal received through the antenna to a baseband signal. For example, the RF processor 2310 may include a transmission filter, a reception filter, an amplifier, a mixer, an oscillator, a DAC, an ADC, and the like. Although only one antenna is shown in the drawing, the base station may have a plurality of antennas. In addition, the RF processor 2310 may include a plurality of RF chains. Further, the RF processor 2310 may perform beamforming. To perform beamforming, the RF processor 2310 may adjust the phases and magnitudes of signals transmitted and received through a plurality of antennas or antenna elements. The RF processor may perform a downlink MIMO operation by transmitting one or more layers.

The baseband processor 2320 performs a function of conversion between a baseband signal and a bit string according to a physical layer specification of a first radio access technique. For example, in the case of data transmission, the baseband processor 2320 encodes and modulates transmission bit strings, thereby generating complex symbols. In addition, upon receiving data, the baseband processor 2320 demodulates and decodes a baseband signal provided from the RF processor 2310 to thus recover reception bit strings. For example, in the case where an OFDM scheme is applied, when transmitting data, the baseband processor 2320 generates complex symbols by encoding and modulating transmission bit strings, maps the complex symbols with subcarriers, and then configures OFDM symbols through the IFFT operation and CP insertion. In addition, when receiving data, the baseband processor 2320 divides the baseband signal provided from the RF processor 2310 into OFDM symbol units, restores the signals mapped with the subcarriers through the FFT operation, and then restores reception bit strings through demodulation and decoding. The baseband processor 2320 and the RF processor 2310 transmit and receive signals as described above. Accordingly, the baseband processor 2320 and the RF processor 2310 may be referred to as a "transmitter", a "receiver", a "transceiver", a "communication unit", or a "wireless communication unit".

The backhaul communication unit 2330 provides an interface for performing communication with other nodes in the network. That is, the backhaul communication unit 2330 converts a bit string, transmitted from the primary base station to another node, such as a secondary base station, a core network, etc., into a physical signal, and converts physical signals received from other nodes into bit strings.

The storage unit 2340 stores data such as basic programs, application programs, and configuration information for the operation of the primary base station. In particular, the storage unit 2340 may store information about bearers allocated to a connected terminal, a measurement result reported from a connected terminal, and the like. In addition, the storage unit 2340 may store information that is a criterion for determining whether multiple connections are provided to the terminal or are released. In addition, the storage unit 2340 provides the stored data in response to a request from the controller 2350.

The controller 2350 controls the overall operation of the primary base station. For example, the controller 2350 transmits and receives signals through the baseband processor 2320 and the RF processor 2310 or the backhaul communication unit 2330. In addition, the controller 2350 records and reads data in and from the storage unit 2340. To this end, the controller 2350 may include at least one processor.

Fourth Embodiment

In general, a mobile communication system is developed for the purpose of providing communication while securing the mobility of a user. Thanks to the remarkable development of technology, mobile communication systems have advanced to the stage of providing high-speed data communication services, as well as voice communication. However, in such a wireless mobile communication system, the terminal may be served intermittently, instead of being served continuously for a long time. Therefore, if the terminal consistently receives and checks the signal of the base station, the terminal power will be consumed quickly. Therefore, it is very important to reduce this power consumption. Therefore, the terminal may switch from an RRC connected mode to an RRC idle mode, thereby remaining in a standby mode. However, the restoring of the terminal from the standby mode to the RRC connection mode requires complex signaling procedures. Therefore, next-generation mobile communication systems may define an RRC inactive mode, a lightly-connected mode, or a lighted-connected mode, which enables quick connection with a simple signaling procedure while reducing power consumption of the terminal, as in the standby mode. In addition, an efficient method is required for switching from the RRC connected mode to the RRC inactive mode (or the lighted-connected mode) or to the RRC inactive mode (or the lighted-connected mode).

In addition, in the RRC inactive mode, the battery consumption of the terminal may be reduced, and the terminal may establish a fast connection with a network with less signaling overhead. However, the terminal in the RRC inactive mode must perform the updating of a RAN notification area (or a RAN paging area) (which may be used interchangeably with "RPA") more frequently than the updating of a tracking area performed periodically by the terminal in the RRC idle mode. Therefore, if there are a large number of terminals in the RRC inactive mode in the network, signaling overhead may be caused due to the periodic updating procedure of the LAN notification area. Thus, the network must manage the terminals in the RRC inactive mode, and must switch the terminal to the RRC idle mode as necessary.

In addition, it may be necessary to define a method and a procedure for transmitting an RRC message when the terminal in the RRC inactive mode transmits and receives the RRC message in various cases. The "various cases" may correspond to a procedure in which the terminal in the RRC inactive mode updates the RAN paging area, a procedure in which the network switches the terminal to the RRC inactive mode, the RRC idle mode, or the RRC connected mode, and a procedure for the case where the network and/or the base station fails to identify the UE context with respect to an identifier of a corresponding terminal when the terminal in the RRC inactive mode attempts a connection using the terminal identifier.

Hereinafter, terms for identifying connection nodes, terms referring to network entities, terms referring to messages, terms referring to interfaces between network entities, terms referring to a variety of identification information, and the like will be used as examples for the convenience of explanation. Therefore, the disclosure is not limited to the terms used herein, and other terms referring to objects having equivalent technical meanings may be used.

For the convenience of explanation, in the disclosure, terms and names defined in the 3rd generation partnership project long-term evolution (3GPP LTE) standard, among existing communication standards, will be used. However, the disclosure is not limited to the above-mentioned terms and names, and the disclosure may be equally applied to systems conforming to other standards. In the disclosure, eNB may be used interchangeably with gNB for the convenience of explanation. That is, the base station described as the eNB may refer to the gNB.

Figure 24:
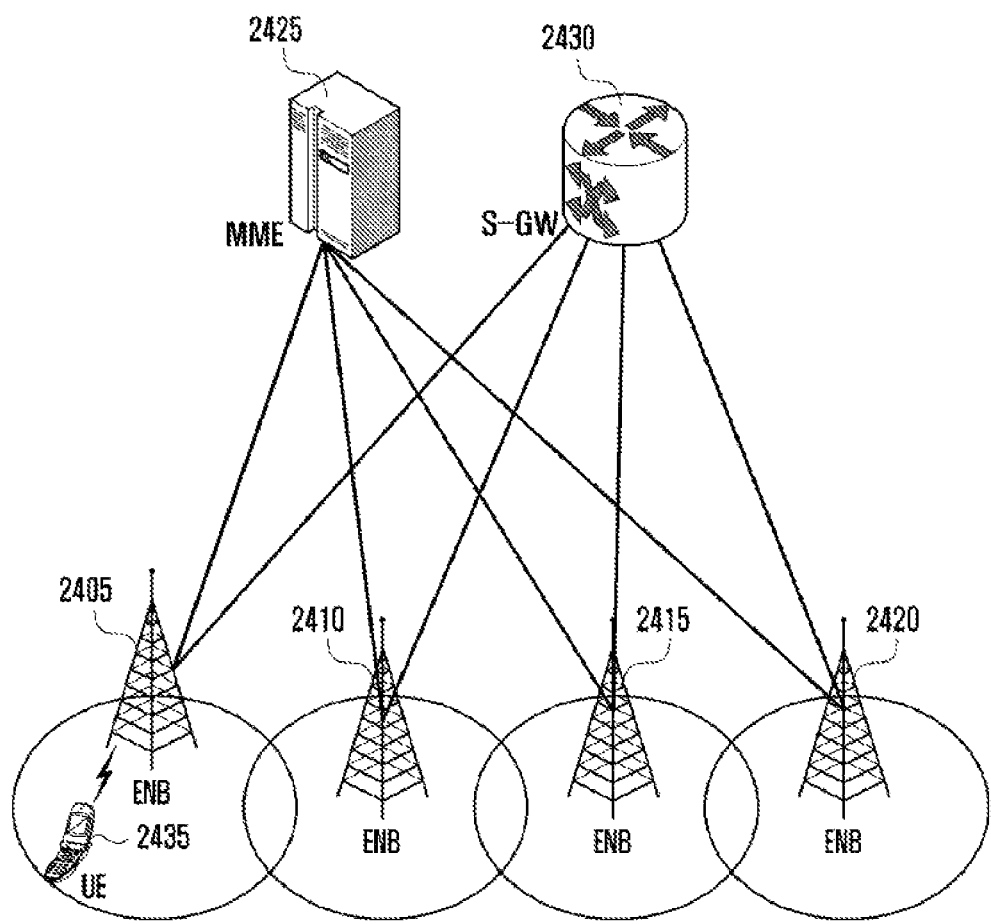
FIG. 24 is a diagram illustrating the structure of an LTE system.

FIG. 24 is a diagram illustrating the structure of an LTE system to which the disclosure may be applied.

Referring to FIG. 24, the wireless access network of an LTE system includes evolved node Bs (hereinafter, referred to as "ENBs", "node Bs", or "base stations") 2405, 2410, 2415, and 2420, a mobility management entity (MME) 2425, and a serving gateway (S-GW) 2430. User equipment (hereinafter, referred to as "UE" or a "terminal") 2435 accesses an external network through the ENBs 2405, 2410, 2415, and 2420 and the S-GW 2430.

In FIG. 24, the ENBs 2405, 2410, 2415, and 2420 correspond to existing node Bs of a UMTS system. The ENB is connected to the UE 2435 through a wireless channel and performs a more complex role than the existing node B. In the LTE system, since all user traffic including real-time services, such as VoIP (voice over IP) through Internet protocol, is served through a shared channel, a device for collecting status information, such as buffer status, available transmission power status, and channel status of UEs, and performing scheduling is required. The ENBs 2405, 2410, 2415, and 2420 serve as such a device. One FNB typically controls multiple cells. For example, in order to realize a data rate of 100 Mbps, the LTE system uses, as wireless access technology, orthogonal frequency division multiplexing (hereinafter, referred to as "OFDM") in a bandwidth of, for example, 20 MHz. Further, an adaptive modulation and coding (hereinafter, referred to as "AMC") scheme is applied to determine a modulation scheme and a channel coding rate in accordance with the channel status of a terminal. The S-GW 2430 is a device for providing data bearers and generates or removes data bearers under the control of the MME 2425. The MME is a device that performs various control functions, as well as a mobility management function for a terminal, and is connected to a plurality of base stations.

Figure 25:
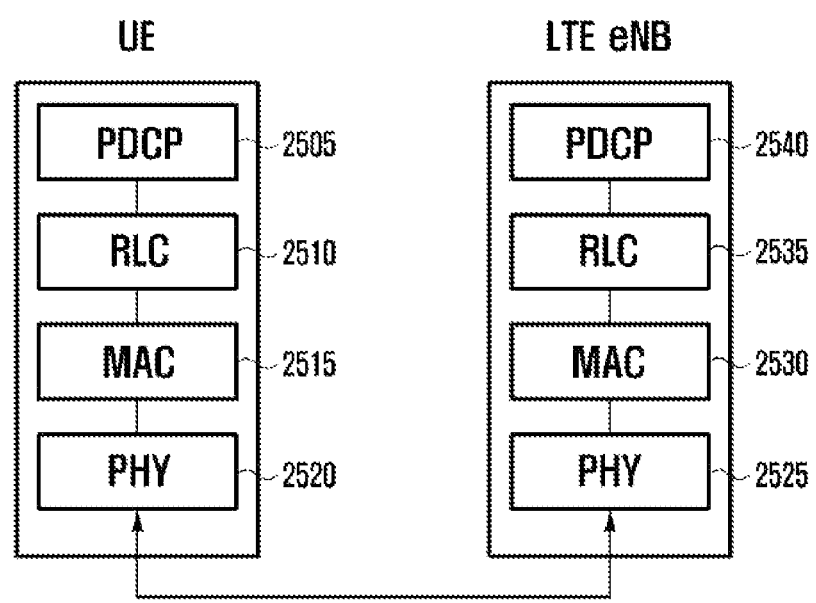
FIG. 25 is a diagram illustrating a wireless protocol structure in an LTE system.

FIG. 25 is a diagram illustrating a wireless protocol structure in an LTE system to which the disclosure may be applied.

Referring to FIG. 25, the wireless protocol of the LTE system includes a packet data convergence protocol (PDCP) 2505 or 2540, a radio link control (RLC) 2510 or 2535, and a medium access control (MAC) 2515 or 2530 in a terminal and an ENB, respectively. The PDCP performs operations such as IP header compression/decompression and the like. The primary functions of the PDCP are summarized as follows.

Header compression and decompression (ROHC
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDI discard in uplink.

The RLC 2510 or 2535 reconfigures a PDCP PDU (packet data unit) to an appropriate size and performs ARQ operation and the like. The primary functions of the RLC are summarized as follows.

Data transfer function (transfer of upper layer PDUs)
ARQ function (error correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 2515 or 2530 is connected to a plurality of RLC entities configured in a single terminal, multiplexes RLC PDUs into MAC PDUs, and demuitiplexes RLC PDUs from MAC PDUs. The primary functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
Padding The physical layer 2520 or 2525 channel-codes and modulates upper layer data, and converts the same into OFDM symbols to then be transmitted through a wireless channel, or demodulates OFDM symbols received through a wireless channel and channel-decodes the same to then be transmitted to upper layers.

Figure 26:
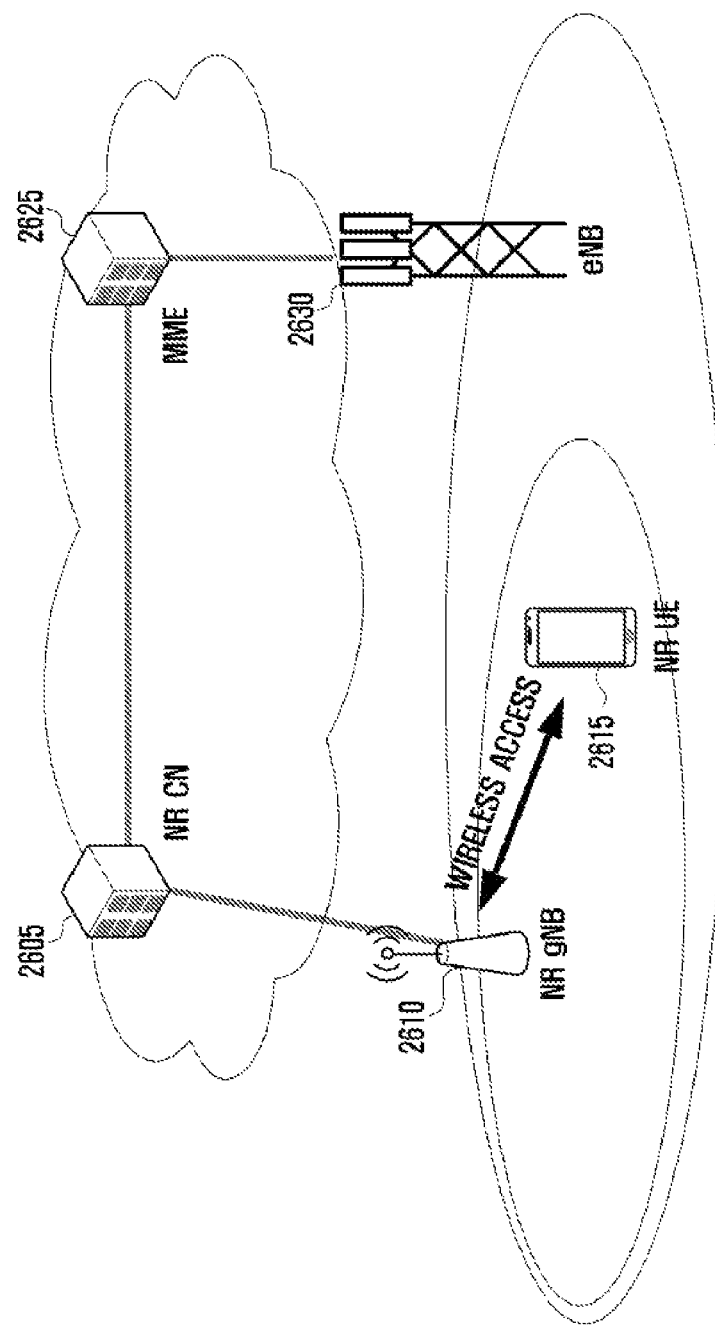
FIG. 26 is a diagram illustrating the structure of a next-generation mobile communication system.

FIG. 26 is a diagram illustrating the structure of a next-generation mobile communication system to which the disclosure may be applied.

Referring to FIG. 26, a wireless access network of a next-generation mobile communication system (hereinafter, referred to as "NR" or a "5G system") includes a new radio node B (hereinafter, referred to as "NR gNB" or an "NR base station") 2610 and a new radio core network (NR CN) 2605 as shown in the drawing. New radio user equipment (hereinafter, referred to as "NR UE" or a "terminal") 2615 accesses an external network through the NR gNB 2610 and the NR CN 2605.

In FIG. 26, the NR gNB 2610 corresponds to an evolved node B (eNB) of an existing LTE system. The NR gNB is connected to the NR UE 2615 through a wireless channel, and may provide services superior to those of an existing node B. In the next-generation mobile communication system, since all user traffic is served through a shared channel, a device for collecting status information, such as buffer status, available transmission power status, and channel status of UEs, and performing scheduling is required. The NR NB 2610 serves as such a device. One NR gNB typically controls multiple cells. In order to realize super-high data rates compared to the existing LTE system, NR gNB may have a bandwidth equal to or greater than the maximum bandwidth of the existing system, may employ, as wireless access technology, orthogonal frequency division multiplexing (hereinafter, referred to as "OFDM"), and may further employ a beamforming technique in addition thereto. In addition, an adaptive modulation and coding (hereinafter, referred to as "AMC") scheme is applied to determine a modulation scheme and a channel coding rate in accordance with the channel status of a terminal.

The NR CN 2605 performs functions such as mobility support, bearer configuration, and QoS configuration. The NR CN is a device that performs various control functions, as well as a mobility management function for a terminal, and is connected to a plurality of base stations. In addition, the next-generation mobile communication system may interwork with the existing LTE system, and the NR CN is connected to an MME 2625 through a network interface. The MME is connected to the eNB 2630, which is an existing base station.

Figure 27:
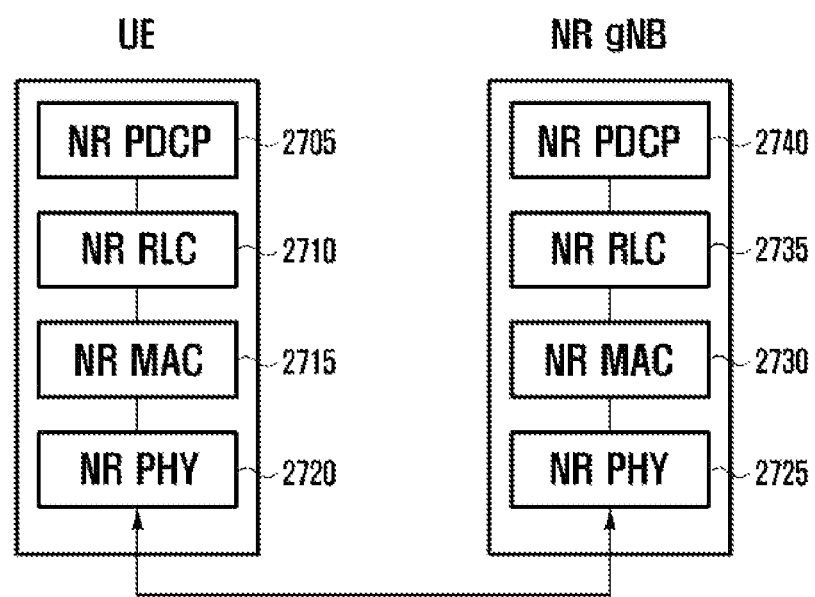
FIG. 27 is a diagram illustrating a wireless protocol structure of a next-generation mobile communication system.

FIG. 27 is a diagram illustrating a wireless protocol structure of a next-generation mobile communication system to which the disclosure may be applied.

Referring to FIG. 27, the wireless protocol of the next-generation mobile communication system includes NR PDCP 2705 or 2740, NR RLC 2710 or 2735, and NR MAC 2715 or 2730 in the terminal and the NR base station, respectively. The primary functions of the NR PDCP 2705 or 2740 may include some of the following functions, Header compression and decompression (ROHC only)
Transfer of user data
In-sequence delivery of upper layer PDUs
Sequence reordering (PDCP PDU reordering for reception)
Duplicate detection of lower layer SDUs
Retransmission of PDCP SDUs
Ciphering and deciphering
Timer-based SDU discard in uplink The above reordering function of the NR PDCP entity refers to a function of reordering PDCP PDUs received in a lower layer, based on a PDCP sequence number (SN), may include a function of transmitting data to an upper layer in the reordered order, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 2710 or 2735 may include some of the following functions.

Data transfer function (transfer of upper layer PDUs)
In-sequence delivery of upper layer PDUs
Out-of-sequence delivery of upper layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The above in-sequence delivery function of the NR RLC entity refers to a function of transferring RLC SDUs received from a lower layer to an upper layer in sequence, may include a function of, if one original RLC SDU is divided into a plurality of RLC SDUs and received, reassembling and transmitting the same, may include a function of reordering the received RLC PDUs on the basis of an RLC sequence number (SN) or a PDCP sequence number (SN), may include a function of reordering the sequence and recording lost RLC PDUs, may include a function of sending a status report of the lost RLC PDUs to the transmitting end, may include a function of making a request for retransmission of the lost RLC PDUs, may include a function of, if there is a lost RLC SDU, transmitting only the RLC SDUs prior to the lost RLC SDU to an upper layer in sequence, may include a function of, if a predetermined timer expires even though there is a lost RLC SDU, transmitting all RLC SDUs received before the timer starts to an upper layer in sequence, or may include a function of, if a predetermined timer expires even though there is a lost RLC SDU, transmitting all RLC SDUs received until the present to an upper layer in sequence. In addition, the RLC PDUs may be processed in the order of reception (in the order of arrival, regardless of a serial number or a sequence number thereof), and may be transmitted to the PDCP entity in an out-of-sequence delivery manner. In the case of segments, the segments, which are stored in the buffer or will be received later, may be received and reconfigured into one complete RLC PDU, and the RLC PDU may be processed and transmitted to the PDCP entity. The NR RLC layer may not include a concatenation function, which may be performed in the NR MAC layer or may be replaced with a multiplexing function of the NR MAC layer.

The out-of-sequence delivery of the NR RLC entity refers to a function of directly delivering RLC SDUs received from a lower layer to an upper layer, regardless of sequence thereof, may include a function of, if one original RLC SDU is divided into a plurality of RLC SDUs and is received, reassembling and delivering the same, and may include a function of storing and ordering RLC SNs or PDCP SNs of the received RLC PDUs, thereby recording the lost RLC PDUs.

The NR MAC 2715 or 2730 may be connected to a plurality of NR RLC layer entities configured in a single terminal, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MIBMS service identification
Transport format selection
Padding The NR PHY layers 2720 and 2725 may perform operations of channel-coding and modulating the upper layer data into OFDM symbols and transmitting the same through a wireless channel, or operations of demodulating and channel-decoding the OFDM symbols received through the wireless channel and transmitting the same through the upper layer.

Figure 28:
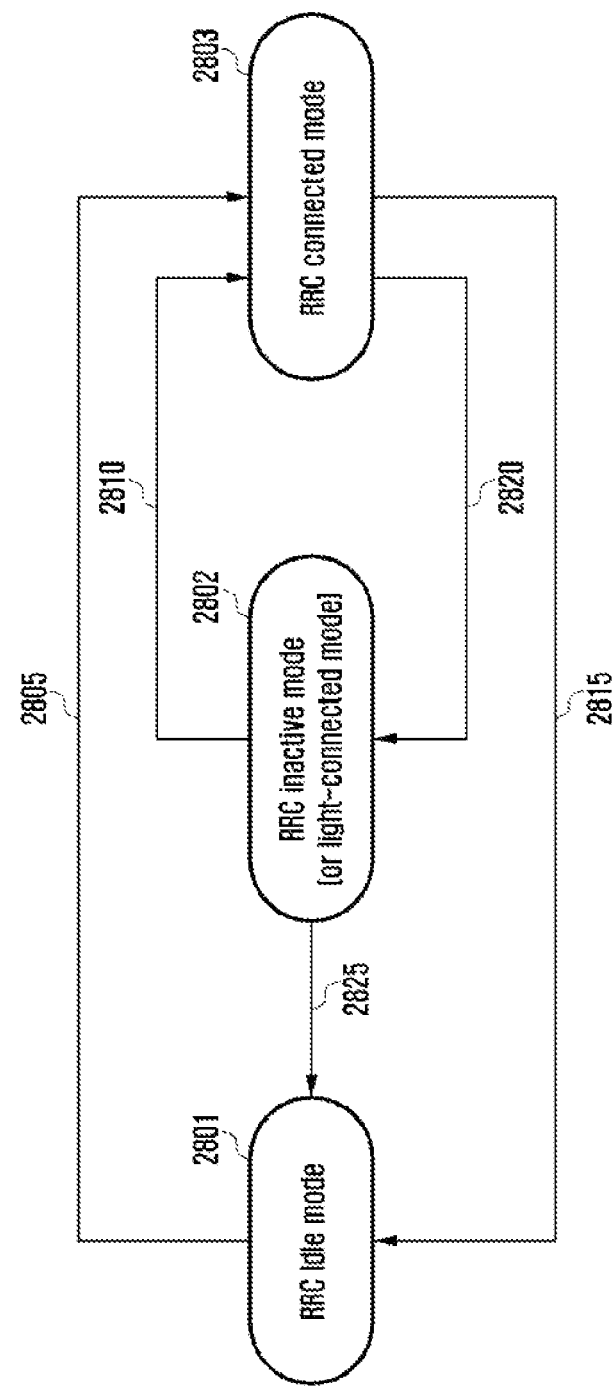
FIG. 28 is a diagram illustrating modes in which a terminal is able to remain in a next-generation mobile communication system.

FIG. 28 is a diagram illustrating modes in which a terminal is able to remain in a next-generation mobile communication system.

In FIG. 28, the terminal may remain in an RRC connected mode 2803, an RRC inactive mode 2802, or an RRC idle mode, and may perform procedures 2805, 2810, 2815, 2820, and 2825 of switching between the respective modes.

The terminal in the RRC idle mode 2801 may switch to the RRC connected mode 2803 in the case where data to be transmitted in the uplink occurs, in the case where downlink data arrives and thus a paging message is received, or in the case of establishing a connection with a network and transmitting/receiving data in order to update a tracking area (periodically or when the terminal is out of the tracking area) (2805). If data is no longer generated for a predetermined period of time after transmitting/receiving data, the terminal in the RRC connected mode may be switched to the RRC idle mode by the network (2815). In addition, if data is not generated for a predetermined period of time, the terminal in the RRC connected mode 2803 may be switched to the RRC inactive mode 2802 spontaneously or by the network for the purpose of supporting battery saving and a quick connection (2820).

The terminal in the RRC inactive mode 2803 may switch to the RRC connected mode 2803 in the case where data to be transmitted in the uplink occurs, in the case where downlink data arrives and thus a paging message is received, or in the case of establishing a connection with a network and transmitting/receiving data in order to update a tracking area (or a RAN notification area) (periodically or when the terminal is out of the tracking area (or the RAN notification area)) (2810). The terminal in RRC inactive mode 2803 may switch the mode to the RRC idle mode 2801 by the instruction of a network, by a predetermined configuration, or spontaneously (2825). This operation must be supported because a plurality of terminals in the RRC inactive mode in the network frequently update the RAN notification area, thereby increasing signaling overhead of the network.

A terminal having a specific purpose may also transmit data in the RRC inactive mode 2803 without switching to the RRC connected mode, and the terminal may switch to the RRC connected mode only if it is necessary while repeating switching between the RRC inactive mode and the RRC idle mode according to the instruction of the network. In this procedure, the terminal transmits data in the RRC inactive mode, thereby exhibiting a very short transmission delay and negligible signaling overhead. The "predetermined purpose" may correspond to the terminal that transmits data intermittently or periodically according to a very long period when the terminal tries to transmit only a small amount of data.

In addition, the terminal in the RRC idle mode 2801 may also switch directly to the RRC inactive mode 2803 by the network, or may switch to the RRC connected mode 2803 and then to the RRC inactive mode (2820).

An additional inactive timer may be configured and driven in the terminal in order to solve the problem of mismatch of the state between the terminal mode as a result of the switching of the terminal between the modes and the terminal mode recognized by the network. In addition, an additional timer may also be driven in the base station.

In the disclosure, the RRC inactive mode and the lightly-connected mode may be regarded as the same mode, and it may be assumed that the terminal performs the same operation in the RRC inactive mode and the lightly-connected mode. In addition, although the RRC inactive mode and the lightly-connected mode may be regarded as the same mode, it may be assumed that the terminal performs different operations in the respective modes. Further, the RRC inactive mode and the lightly-connected mode may be regarded as different modes, and it may be assumed that the terminal performs different operations in the respective modes.

As described above, although the RRC inactive mode and the lightly-connected mode have the same purpose of enabling a quick reconnection with a small amount of signaling and reducing power consumption, the RRC inactive mode and the lightly-connected mode may be the same mode or different modes according to the implementation of the terminal and the network and definition thereof. In addition, the operation of a terminal in the RRC inactive mode and lightly-connected mode may be the same as the operation in the RRC idle mode, may include additional functions in addition thereto, or may include only some of the operation in the RRC idle mode. As described above, in the RRC inactive mode, the power consumption of the terminal may be reduced, and the terminal may establish a quick connection with less signaling overhead when connecting to a network. However, the terminal in the RRC inactive mode must perform the updating of a RAN notification area more frequently than the updating of a tracking area performed periodically by the terminal in the RRC idle mode. Therefore, if there is a plurality of terminals in the RRC inactive mode in the network, signaling overhead may be caused due to the periodic updating procedure of the LAN notification area. Thus, the network must manage the terminals in the RRC inactive mode, and must switch the terminal to the RRC idle mode as necessary.

Figure 29:
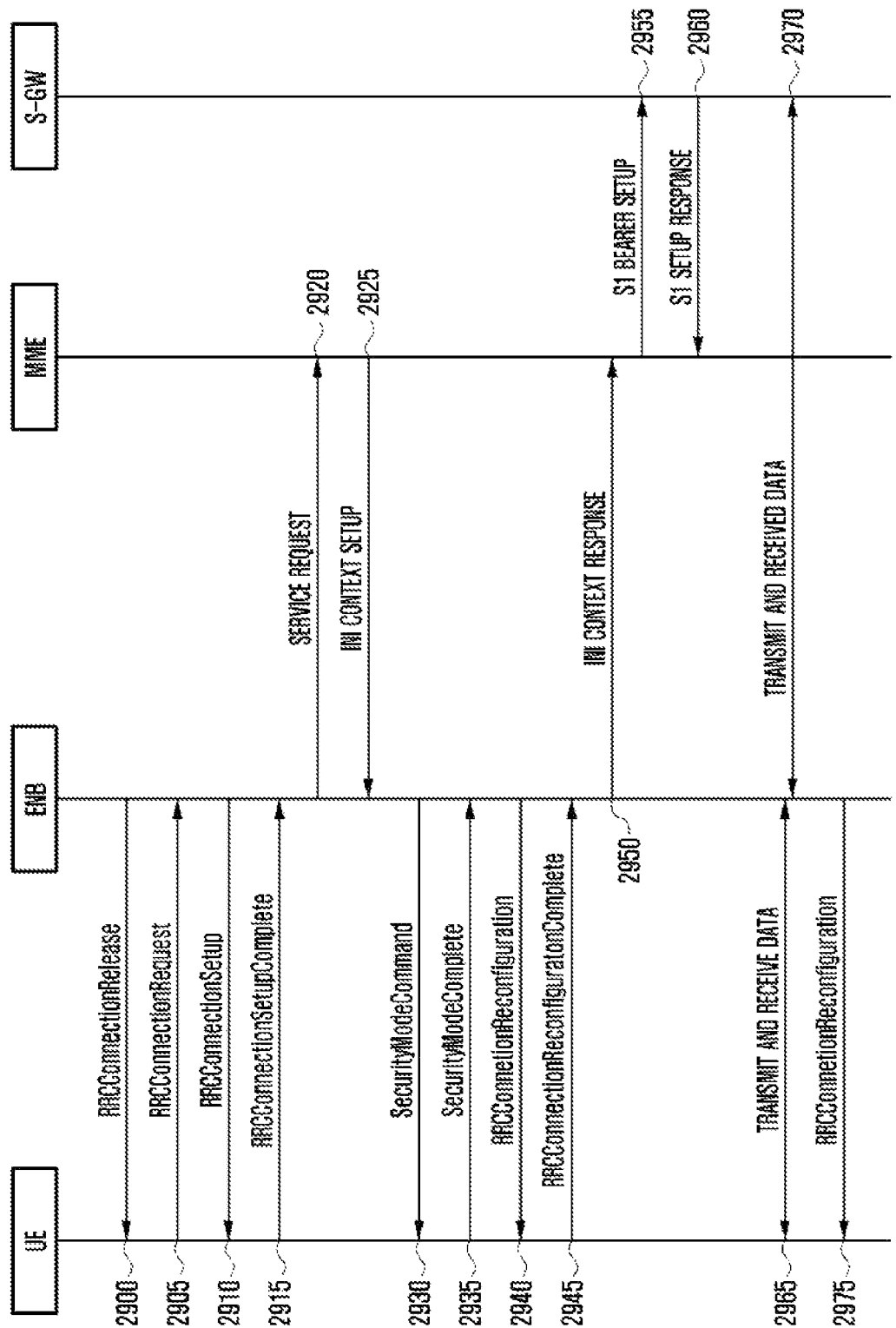
FIG. 29 is a diagram illustrating a procedure in which the terminal switches between an RRC connected mode and an RRC idle mode.

FIG. 29 is a diagram illustrating a procedure in which the terminal switches from an RRC connected mode to an RRC idle mode and a procedure in which the terminal switches from an RRC idle mode to an RRC connected mode.

In FIG. 29, if the terminal transmitting/receiving data in the RRC connected mode does not transmit/receive data for a predetermined reason or for a predetermined time, the base station may transmit, to the terminal, an "RRCConnection-Release" message, thereby switching the terminal to the RRC idle mode (2900). A terminal that is not currently connected to the base station (hereinafter, also referred to as an "idle mode UE") performs RRC connection establishment with the base station when data to be transmitted is generated. The terminal establishes uplink transmission synchronization with the base station through a random access procedure and transmits "RRCConnectionRequest" message to the base station (2905). The message includes an identifier of the terminal and a reason for establishing a connection ("establishmentCause"). The base station transmits an "RRCConnectionSetup" message such that the terminal establishes an RRC connection (2910). The message includes RRC connection configuration information and the like. The RRC connection is also called a "signaling radio bearer" (SRB), and is used to transmit and receive RRC messages, which are control messages, between the terminal and the base station. The terminal having established the RRC connection transmits an "RRCConnetionSetupComplete" message to the base station (2915). The message includes a control message "SERVICE REQUEST" for making a request to the MME for configuration of a bearer for a predetermined service.

The base station transmits a "SERVICE REQUEST" message contained in the "RRCConnetionSetupComplete" message to the MME (2920), and the MME determines whether or not to provide the service requested by the terminal. If it is determined to provide the service requested by the terminal as a result of the determination, the MIME transmits a message "INITIAL CONTEXT SETUP REQUEST" to the base station (2925). The message includes QoS (Quality of Service) information to be applied when configuring a data radio bearer (DRB), security-related information to be applied to the DRB (e.g, a security key, a security algorithm, etc.), and the like. The base station exchanges a "SecurityModeCommand" message (2930) and a "SecurityModeComplete" message (2935) with the terminal in order to set security.

If the security configuration is completed, the base station transmits, to the terminal, an "RRCConnectionReconfiguration" message (2940). The message includes configuration information of a DRB for processing the user data, and the terminal configures a DRB by applying the information and transmits an "RRCConnectionReconfigurationComplete" message to the base station (2945). The base station having completed the configuration of the DRB with the terminal transmits an "INITIAL CONTEXT SETUP COMPLETE" message to MME (2950), and the MIME receiving the message exchanges an "S1 BEARER SETUP" message and an "S1 BEARER SETUP RESPONSE" message with the S-GW in order to configure an S-GW and an S1 bearer (29055 and 2960). The S1 bearer is a connection for data transmission established between the S-GW and the base station and corresponds to DRB one on one. If the above procedure is completed, the terminal and the base station transmit and receive data through the S-GW (2965 and 2970).

As described above, a general data transmission process includes three stages: RRC connection establishment, security configuration, and DRB configuration. In addition, the base station may transmit an "RRCConnectionReconfiguration" message to the terminal in order to refresh, add, or change the configuration for some reasons (2975).

As described above, a complex signaling procedure is required for switching from the RRC idle mode to the RRC connected mode. Therefore, in the next-generation mobile communication system, the RRC inactive mode or the lightly-connected mode may be newly defined. In the new mode above, the terminal and the base station may store the context of the terminal, and the S1 bearer may be maintained as necessary, so that the terminal is able to access the network faster with simpler signaling procedure.

Figure 30:
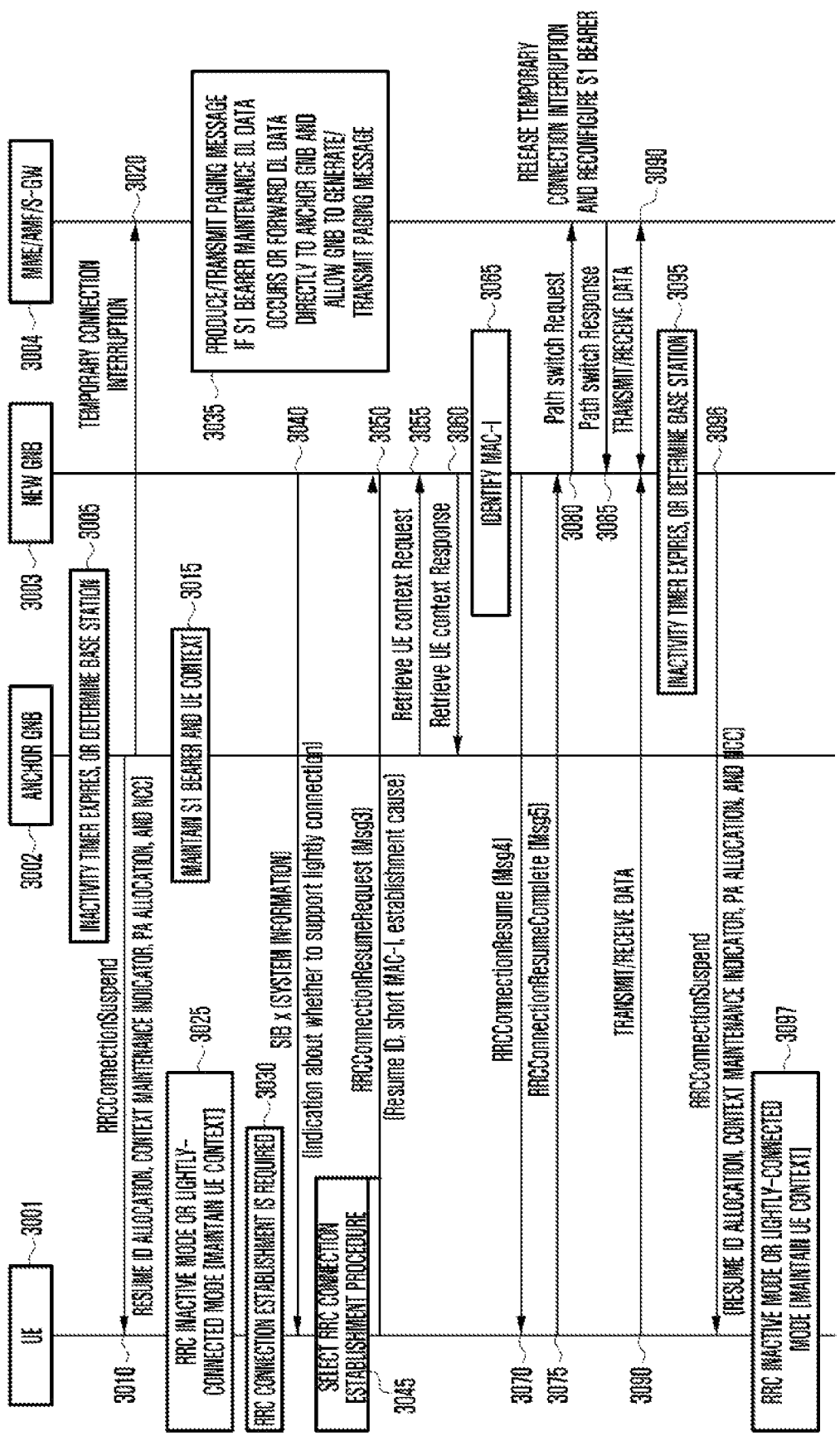
FIG. 30 is a diagram illustrating a procedure in which the terminal switches between an RRC connected mode and an RRC inactive mode.

FIG. 30 is a diagram illustrating a procedure in which the terminal switches from an RRC connected mode to an RRC inactive mode (or a lightly-connected mode) and a procedure in which the terminal switches from the RRC inactive mode to the RRC connected mode. Hereinafter, the RRC inactive mode may be understood as an RRC lightly-connected mode. FIG. 30 illustrates overall signal flow of a terminal 3001, an anchor gNB 3002, a new gNB 3003, and an MMF 3004 in order to perform a procedure in which the terminal and the base station reuse UE context and an S1 bearer.

The terminal 3001 in the RRC connected state transmits and receives data to and from the base station. If the data transmission/reception is interrupted, the base station drives a predetermined timer (an inactivity timer). If the data transmission/reception is not resumed until the timer expires (3005), the base station may consider releasing the RRC connection of the terminal, and the base station may determine whether to switch the terminal to the RRC idle mode or to the RRC inactive mode according to specific conditions. The "predetermined conditions" above may be the amount of network traffic, the amount of UE context that the network can maintain, the number of terminals to which the network can provide services, and the like.

In step 3010, in order to switch the terminal to the RRC inactive mode, the base station may transmit an "RRCConnectionRelease" or "RRCConnectionSuspend" message, a newly defined RRC message, or another existing RRC message (by reusing the same). In step 3010, the base station may release the RRC connection of the terminal according to a predetermined rule, may then store the UE context, may assign a resume ID to the terminal while transmitting a control message instructing the terminal to release the RRC connection, and may configure a paging area (PA) for the terminal to report mobility when the terminal is in the RRC inactive mode. In this case, the terminal may recognize that the UE context must be stored through the assignment of the resume ID, or the base station may include, in the message, a separate context-keeping indicator instructing the terminal to operate in the RRC inactive mode and to store the UE context, and may transmit the message (3010). In addition, the message may include security information for updating a security configuration required when the terminal performs the RRC connection re-establishment procedure later. For example, the terminal may be allocated NCC (NextHop-ChainingCount) in advance, and may calculate and configure a new security key (KeNB* or KgNB) using the same. In addition, the control message may include a list of cells to which the procedure using the stored context is applicable when the terminal attempts to re-establish the RRC connection within a period in which the base station maintains the context or within a valid period, and the like.

After releasing the RRC connection of the terminal, the base station maintains the UE context of the terminal and the S1 bearer (3015). The S1 bearer refers to an S1-control bearer used for transmitting/receiving control messages between the base station and the MME and an S1-user plane bearer used for exchanging user data between the base station and the S-GW. By maintaining the S1 bearer, it is possible to omit the procedure for establishing the S1 bearer when the terminal attempts to establish an RRC connection in the same cell or in the same base station. If a valid period expires, the base station may delete the UE context, and may release the S1 bearer. Upon receiving the RRC message in step 3010, the terminal switches to the RRC inactive mode.

The anchor gNB denotes a base station that maintains and manages the UE context (the resume ID) of the terminal in the RRC inactive mode and manages a RAN paging area in order to manage mobility of the terminal in the RRC inactive mode. The role of the anchor base station described above may be performed by an access and mobility management function (AMF) device.

The base station transmits, to the MME, a control message requesting temporary connection interruption (3020). If downlink data to the terminal occurs, the MME having received the control message may allow the S-GW to directly transmit the downlink data to the anchor base station, and may allow the anchor base station to generate a paging message and to transmit the paging message to the neighboring base stations (3035). That is, the anchor base station having received the downlink data stores the data in the buffer and proceeds with the paging procedure. The anchor base station refers to a base station that maintains the UE context of the terminal and the S1-U bearer. Alternatively, if the anchor base station transmits a paging message, but if there is no response from the terminal, that is, if the paging fails, the anchor base station may make a request to the MME for a paging procedure, the MME may instruct the S-GW to make a request to the MME for initiating the paging procedure, instead of transmitting, to the base station, the downlink data for the terminal, which occurs in the S-GW, and the S-GW may operate according thereto (3035).

The terminal having received the RRC message including the information, which instructs to maintain the context, and the resume ID (3010) may release the RRC connection, may drive a timer corresponding to a valid period, may record an effective cell list in a memory, may maintain the current VIE context in the memory, instead of deleting the same (3025), and may switch to the RRC inactive mode. The UE context denotes a variety of information related to the RRC configuration of the terminal and includes SRB configuration information, DRB configuration information, security key information, and the like.

Thereafter, establishment of an RRC connection is required for any reason (3030). The terminal that has not received the resume ID or has not received the indicator indicating that the context is to be maintained during the RRC connection release procedure may initiate a general RRC connection establishment described in connection with FIG. 29. However, the terminal in the RRC inactive mode, which has been assigned the resume ID during RRC connection release procedure, may attempt to re-establish an RRC connection using the stored UE context. The terminal in the RRC inactive mode may perform the general RRC connection establishment procedure shown in FIG. 29, or may perform an RRC connection re-establishment procedure using the stored UE context according to whether the network supports the RRC inactive mode or a light-connection. That is, in the case where the RRC inactive mode or the light connection mode is not supported, the terminal performs the general RRC connection establishment procedure according to FIG. 29, and if the RRC inactive mode or the light connected mode is supported, the ten al may perform the RRC connection re-establishment procedure as follows.

In the above case, the RRC inactive mode may be always supported in the network (therefore, the system information may not separately indicate whether or not to support the same in the disclosure, each base station or cell may include an indicator indicating whether or not each base station and cell supports a light connection in the system information, and may transmit the system information. The indicator may be included in a second block of system information ("Systeminformation 2"), or may be included in other system formation blocks ("Systeminformation 1 to 19"). The supporting of the light connection may mean that the corresponding base station or the corresponding cell may configure and support the following procedures 3050, 3055, 3060, 3065, 3070, 3075, 3080, 3085, and 3090.

If an RRC connection is required to be established, the terminal in the lightly-connected mode reads and obtains the system information of the cell on which the terminal is currently camping. If the system information does not include an indicator indicating that the base station or the cell supports a light-connection (or an RRC inactive mode), the terminal may perform the general RRC connection establishment procedure described in connection with FIG. 29 (3045). However, if the system information includes an indicator indicating that the base station or the cell supports a light-connection (or an RRC inactive mode), the terminal may perform an RRC connection re-establishment process using the stored UE context (3045). The RRC connection re-establishment process using the stored UE context is performed as follows.

First, the terminal transmits a preamble in message 1 in order to perform a random access procedure. If it is possible to allocate resources according to the preamble received in message 1, the base station allocates uplink resources to the terminal in message 2. Based on the received uplink resource information, the terminal transmits a resume-request message including the resume ID received in step 3010 (3050). The message may be a modified message of the "RRCConnectionRequest" message, or a newly defined message (e.g. "RRC ConnectionResumeRequest").

In the case where the terminal disconnected from the existing anchor base station 3002 and remaining in the lightly-connected mode moves and camps on the cell of another base station, the new base station 3003 may receive and identify the resume ID of the terminal, and may recognize the base station that has previously provided services to the corresponding terminal. If the new base station 3003 successfully receives and identifies the resume ID, the new base station performs a procedure of retrieving the UE context from the existing base station (context retrieve procedure) (3055 and 3060). If the base station fails to retrieve the UE context in the above step because, for example, an anchor (or source) base station cannot be found or there is no UE context, the base station may transmit, to the terminal, an "RRCConnectionSetup" message, instead of an "RRCConnectionResume" message, as described above in connection with FIG. 29, may fall back to the RRC connection establishment procedure described in connection with FIG. 29, for a subsequent bearer establishment procedure and security configuration procedure, may switch the terminal to the RRC connected mode after completing the security configuration, or may return the terminal to the RRC inactive mode while transmitting an "RRCConnectionSuspend" message along with a new resume ID of the terminal and a RAN paging area. The new base station 3003 may retrieve the UE context fr©m the existing base station 3002 through an S1 or X2 interface. (If the new base station receives the resume ID but fails to successfully identify the terminal for a predetermined reason, the base station may transmit an "RRCConnectionSetup" message to the terminal, and may return to the general RRC connection establishment procedure described in connection with FIG. 29. That is, the base station may transmit the "RRCConnectionSetup" message to the terminal, and upon receiving the message, the terminal may transmit an "RRCConnectionSetupComplete" message to the base station, thereby establishing a connection. Alternatively, if the new base station receives a resume ID but fails to successfully identify the terminal (for example, if the new base station fails to retrieve the UE context from the existing anchor base station), the new base station may transmit an "RRCConnectionRelease" message or an "RRCConnectionReject" message to the terminal to reject the terminal connection, and may attempt the general RRC connection establishment procedure described in connection with FIG. 29 from the beginning.

The new base station identifies the MAC-I (message authentication code-integrity), based on the retrieved UE context (3065). The MAC-I is a message authentication code calculated by the terminal on the control message by applying security information of the restored UE context, i.e., by applying a security key and a security counter. The base station verifies the integrity of the message using the MAC-I of the message, the security key and the security counter stored in the LTE context, and the like. In addition, the new base station 3003 determines the configuration to be applied to the RRC connection of the terminal and transmits an "RRCConnectionResume" (RRC connection resumption) message including the configuration information to the terminal (3070). The base station may identify an identifier (resume ID) of the terminal, and may encrypt the "RRCConnectionResume" message using a new security key (KeNB* or KgNB*), thereby transmitting the same. The terminal may decrypt the message using a new security key (KeNB* or KgNB*) calculated using the NCC previously allocated in step 3010, thereby normally receiving the "RRCConnectionResume" message. In addition, the terminal and the base station may encrypt the RRC message and data using a new security key, thereby transmitting/receiving the same, after the procedure of transmitting the "RRCConnectionResume" message.

The "RRCConnectionResume" message may be a control message obtained by including information (REUSE INDICATOR) indicating "reusing of RRC context" in the general RRC connection request message. Like the RRC connection establishment message, the "RRCConnectionResume" message includes a variety of information related to the RRC connection establishment of the terminal. If the terminal receives a general RRC connection establishment ("RRCConnectionSetup") message, the terminal establishes an RRC connection, based on the configuration information indicated in the RRC connection establishment message, but if the terminal receives the "RRCConnectionResume" message, the terminal establishes an RRC connection in consideration of both the stored configuration information and the configuration information indicated by the RRC control message (Delta configuration). That is, the terminal may determine the indicated configuration information to be the delta information on the stored configuration information, thereby determining the configuration information to be applied and updating the configuration information or the UE context. For example, if the "RRCConnectionResume" message includes SRB configuration information, the SRB is configured by applying the indicated SRB configuration information, and if the RRC connection resumption message does not include SRB configuration information, the SRB is configured by applying the SRB configuration information stored in the UE context.

The terminal configures an RRC connection by applying the updated LTE context and configuration information and transmits an "RRCConnectionResumeComplete" message to the base station (3075). In addition, the base station transmits a control message making a request to the MIME for releasing temporary connection interruption and makes a request for reconfiguring the S1 bearer as a new base station (3080 and 3085). Upon receiving the message, the MIME instructs the S-GW to reconfigure the S1 bearer as a new base station and to normally process the data for the terminal. This process is performed through a path switch request message and a path switch response message transmitted and received between the base station and the MME. If the above process is completed, the terminal resumes data transmission/reception in the cell (3090).

If the terminal, which is in the lightly-connected mode by releasing the connection with the existing anchor base station 3002 in the above procedure, camps on the cell 3002 of the existing anchor base station again without moving a lot, the existing anchor base station 3003 may not perform the procedures 3055 and 3060, may perform only the procedure of releasing the temporary connection interruption of the S1 bearer, instead of performing the procedures 3080 and 3085, may search for the UE context of the terminal with reference to the resume ID indicated in message 3 (Msg3), and, based on the same, may re-establish a connection in a manner similar to the above procedures.

If data transmission/reception is interrupted, the base station drives a predetermined timer, and if the data transmission/reception is not resumed until the timer expires (3095), the base station considers releasing of the RRC connection of the terminal. In step 3096, in order to switch the terminal to the RRC inactive mode, the base station may transmit an "RRCConnectionRelease" or "RRCConnectionSuspend" message, a newly defined RRC message, or another existing RRC message (by reusing the same). In step 3096, the base station may release the RRC connection of the terminal according to a predetermined rule, may then store the UE context, may assign a new terminal identifier (resume ID) to the terminal while transmitting a control message instructing the terminal to release the RRC connection, and may configure a RAN paging area in which the terminal in the RRC inactive mode (or in the light connected mode) must report mobility (3096). If the terminal in the RRC inactive mode (light connected mode) is out of the configured RAN paging area, the terminal performs a procedure of updating the RAN paging area (3097).

The base station in the next-generation mobile communication system may configure a terminal identifier (resume ID) to be used when attempting an RRC connection later and a RAN paging area for the terminal to report mobility while configuring the terminal as being in the RRC inactive mode. In addition, the base station may configure an NCC (NexthopChainingCount) value for the security configuration to be used in the connection establishment process in the future.

In the next-generation mobile communication system, if the terminal in the RRC inactive mode is out of the tracking area (TA or a TA list) configured by the network, the MIME, or the CN (core network), the terminal performs a tracking area update (TAU) procedure, and if the terminal is out of the RAN paging area configured by the AMF or the anchor base station, the terminal performs a RAN paging area update procedure. When the terminal in the RRC inactive mode performs the RAN paging area update procedure, the network may respond using any of various messages depending on the network situation, and the disclosure proposes a message transmission/reception procedure in consideration of various cases.

Figure 31:
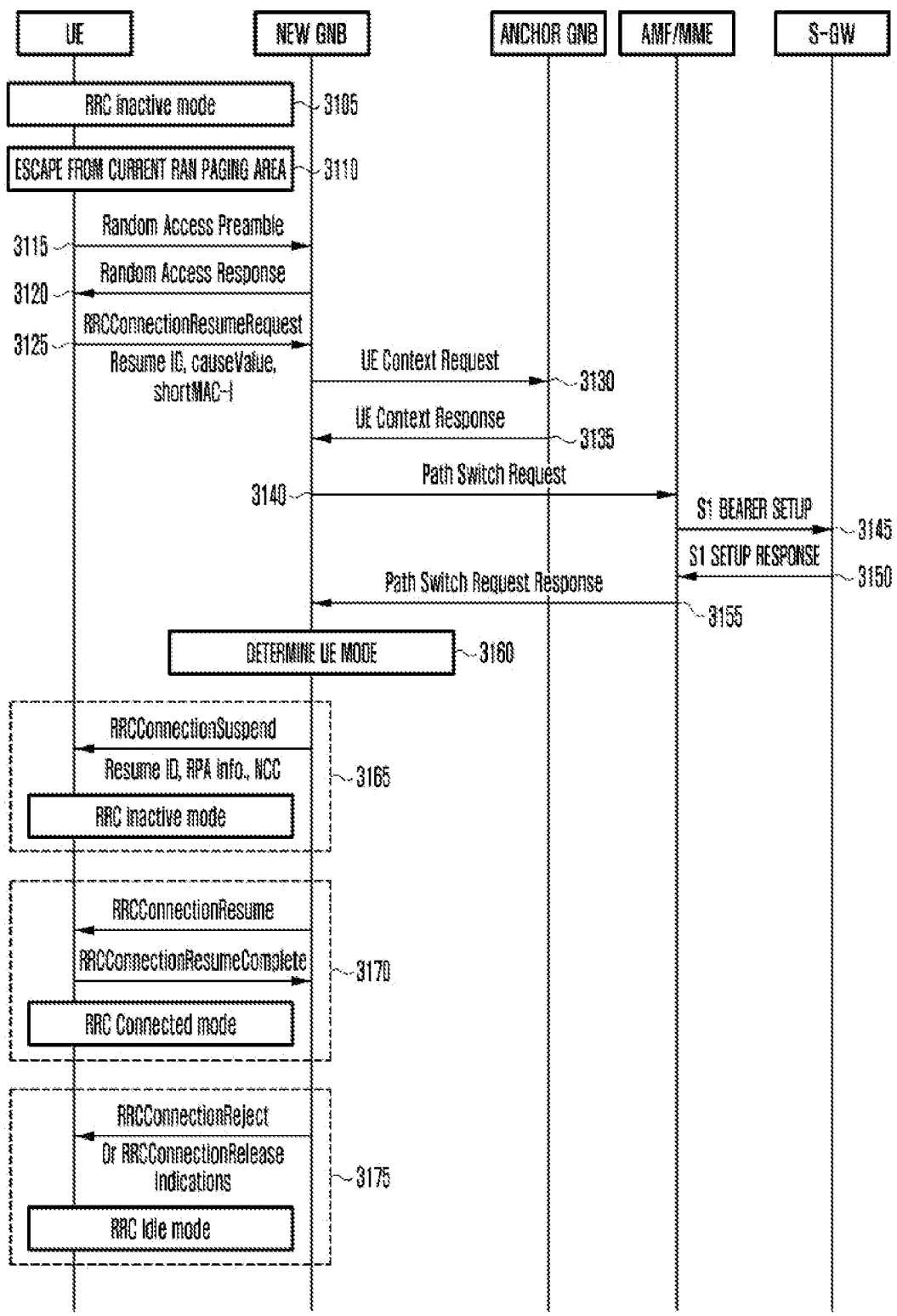
FIG. 31 is a diagram illustrating an example of a RAN paging area update procedure performed by a terminal in the case where the terminal in the RRC inactive mode moves out of a configured RAN paging area and a response of a base station thereto.

FIG. 31 is a diagram illustrating an example of a RAN paging area update procedure performed by a terminal in the case where the terminal in the RRC inactive mode (or lightly-connected mode) moves out of a currently configured RAN paging area and a response of a base station thereto.

In FIG. 31, if the terminal 3105 in the RRC inactive mode moves out of a currently configured RAN paging area, the terminal attempts access to a network in order to perform a RAN paging area update procedure. In this case, the terminal performs a random access procedure to a new base station first, transmits a random access preamble (3115), and receives a random access response (RAR) in response thereto in step 3120. Thereafter, the terminal may include a terminal identifier (resume ID), a connection cause indicator ("causeValue", for example, a new "causeValue" may be defined and used, and may be "ranNotificationAreaUpdateRequest"), short MAC-I (an indicator for verifying message integrity), and the like in the "RRCConnectionResumeRequest" message, and may transmit the same as message 3. The transmission of the "RRCConnectionResurneRequest" message is intended to enable the base station to switch the mode of the terminal in the case where downlink data from the base station to the terminal occurs at the time at which the terminal attempts access in order to update the RAN paging area or in the case where the terminal is required to be switched to the RRC connected mode for a predetermined reason.

The (new) base station having received the message of the terminal in step 3125, identifies the terminal identifier (resume ID), identifies an existing anchor base station having the terminal identifier, and transmits the terminal identifier to the existing base station, thereby performing a procedure of retrieving the UE context of the terminal (UE context request and UE context response) (3130 and 3135). In addition, in order to modify a bearer path to the new base station that the terminal accessed, the base station may perform a bearer path modification procedure (path switch request, S1 bearer setup, S1 bearer response, and path switch response) (3140, 3145, 3150, and 3155). In this case, the base station may omit the bearer path modification procedure (3140, 3145, 3150, and 3155) in order to quickly update only the RAN paging area of the terminal.

The base station determines the mode of the terminal in step 3160. Specifically, if it is determined that the terminal is to remain in the RRC inactive mode or if there is no downlink data to the terminal, the base station may transmit, to the terminal, an "RRCConnectionSuspend" message including a new terminal identifier (resume ID) and a new RAN paging area configuration information (RAN paging area information, RPA information), security configuration information (NCC), and the like in order to update the RAN paging area of the terminal, and may allow the terminal to remain in the RRC inactive mode (3165). The RAN paging area configuration information may include a list of cell identifiers, a RAN paging area ID, or information indicating the tracking area. In addition, the RAN paging area information may be delta signaling. That is, the RAN paging area information may indicate that the existing RAN paging area information is to be reused, or may include information instructing to add or delete some areas or cell identifiers to and from the existing RAN paging area. The security configuration information may be applied to generate a new security key, and may be used to decrypt the RRC message from the base station and to verify the integrity thereof in the RRC connection establishment process.

In step 3160, the base station may identify whether there is downlink data to the terminal, and if there is downlink data or if the terminal is required to be switched to the PAC connected mode for a predetermined reason (for example, if it is possible to manage the terminal in the RRC connected mode because the network has sufficient resources), the base station may transmit, to the terminal, the "RRCConnectionResume" message, thereby attempting to switch the terminal to the RRC connected mode. The "RRCConnectionResume" message may be encrypted with a new secret key, and may be processed with integrity verification to then be transmitted, and the terminal may receive the "RRCConnectionResume" message by calculating a new security key using the security configuration information (e.g., NCC) configured by the previous base station when switching the terminal to the RRC inactive mode by means of the "RRCConnectionSuspend" message, decrypting the "RRCConnectionResume" message, and performing integrity verification thereof. Upon receiving the "RRCConnectionResume" message, the terminal may transmit, to the base station, an "RRCConnectionResumeComplete" message indicating completion of connection establishment to switch to the RRC connected mode, and may switch to the RRC connected mode (3170).

In step 3160, the base station identifies whether or not there is downlink data to the terminal, and if there is no downlink data or if the terminal is required to be switched to the RRC idle mode for a predetermined reason, the base station may perform procedure 3175. The "predetermined reason" may be that the network is short of resources, the TIE context is no longer valid, or there are too many terminals remaining in the RRC inactive mode ire the current cell. The base station may transmit, to the terminal, an "RRCConnectionReject" or "RRCConnectionRelease" message, thereby switching the terminal to the RRC idle mode (3175). The "RRCConnectionReject" or "RRCConnectionRelease" message may include indications instructing the terminal to switch from the RRC inactive mode to the RRC idle mode.

Figure 32:
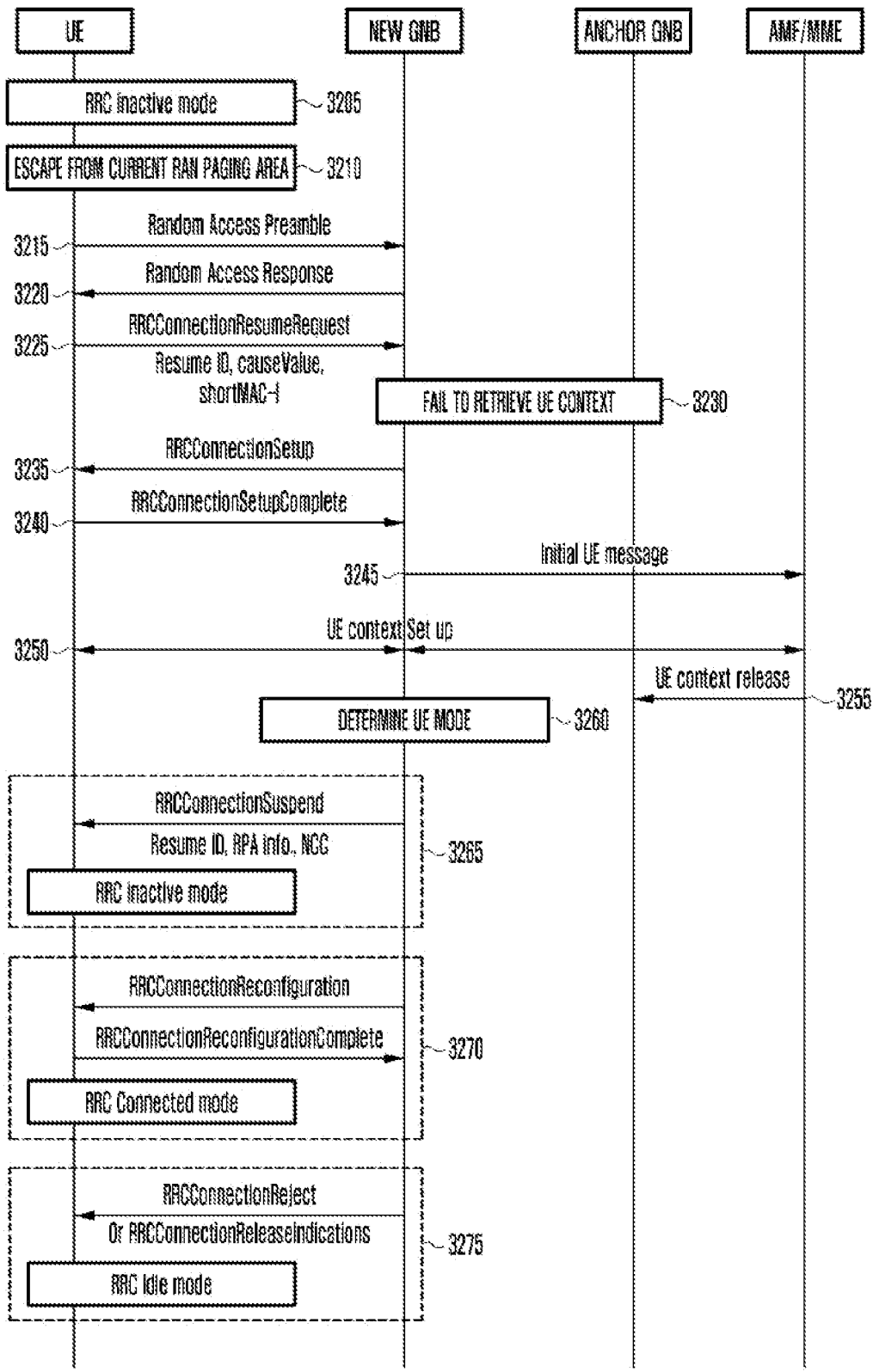
FIG. 32 is a diagram illustrating another example of a RAN paging area update procedure performed by a terminal in the case where the terminal in the RRC inactive mode moves out of a configured RAN paging area and a response of a base station thereto.

FIG. 32 is a diagram illustrating an example of a RAN paging area update procedure performed by a terminal in the case where the terminal in the RRC inactive mode (or in the lightly-connected mode) moves to be out of a currently configured RAN paging area and a response of a base station thereto.

In FIG. 32, if the terminal 3205 in the RRC inactive mode moves out of a currently configured RAN paging area, the terminal attempts access to a network in order to perform a RAN paging area update procedure. In this case, the terminal performs a random access procedure to a new base station, transmits a random access preamble (3215), and then receives a RAR in response thereto in step 3220. Thereafter, the terminal may include a terminal identifier (resume ID), a connection cause indicator ("causeValue", for example, a new "causeValue" may be defined and used, and may be "ranNotificationAreaUpdateRequest"), short MAC-I (an indicator for verifying message integrity), and the like in the "RRCConnectionResumeRequest" message, and may transmit the same as message 3. The transmission of the "RRCConnectionResumeRequest" message is intended to enable the base station to switch the mode of the terminal in the case where downlink data from the base station to the terminal occurs at the time at which the terminal attempts access in order to update the RAN paging area or in the case where the terminal is required to be switched the RRC connected mode for a predetermined reason.

The base station having received the message of the terminal in step 3225, identifies the terminal identifier (resume ID), identifies an existing anchor base station having the terminal identifier, and transmits the terminal identifier to the existing base station, thereby performing a procedure of retrieving the UE context of the terminal (3230). If the base station fails to retrieve the UE context, the base station needs to establish a new context with the terminal. Thus, the base station transmits, to the terminal, an "RRCConnectionSetup" message informing that the base station failed to retrieve the UE context and a new UE context is required to be established (3235). The terminal having received the message transmits, to the base station, an "RRCConnectionSetupComplete" message to establish a new UE context (3240). Upon receiving the message, the base station performs a procedure for establishing a new UE context with the MME or AMF, and informs the terminal of a new UE context (an initial UE message and UE context setup) (3245 and 3250). After establishing a new UE context as described above, the MME or AMF may instruct the existing base station or the anchor base station to delete the previous UE context of the terminal (3255).

After establishing a new UE context as described above, the base station determines the mode of the terminal in step 3260. Specifically, if it is determined that the terminal is to remain in the RRC inactive mode or if there is no downlink data to the terminal, the base station may transmit, to the terminal, an "RRCConnectionSuspend" message including a new terminal identifier (resume ID), a new RAN paging area configuration information, security configuration information (NCC), and the like in order to update the RAN paging area of the terminal, thereby allowing the terminal to remain in the RRC inactive mode (3265). The RAN paging area configuration information may include a list of cell identifiers, a RAN paging area ID, or information indicating the tracking area. In addition, the RAN paging area information may be delta signaling. That is, the RAN paging area information may indicate that the existing RAN paging area information is to be reused, or may include information instructing to add or delete some areas or cell identifiers to or from the existing RAN paging area. The security configuration information may be applied to generate a new security key, and may be used to decrypt the RRC message from the base station and to verify the integrity thereof in the RRC connection establishment process.

In step 3260, the base station may identify whether there is downlink data to the terminal, and if there is downlink data or if the terminal is required to be switched to the RRC connected mode for a predetermined reason (for example, if it is possible to manage the terminal in the RRC connected mode because the network has sufficient resources), the base station may transmit, to the terminal, the "RRCConnectionReconfiguration" message, thereby attempting to switch the terminal to the RRC connected mode. The "RRCConnectionReconfiguration" message may be encrypted with a new secret key, and may be processed with integrity verification to then be transmitted, and the terminal may receive the "RRCConnectionReconfiguration" message by calculating a new security key using the security configuration information (e.g., NCC) configured by the previous base station when switching the terminal to the RRC inactive mode by means of the "RRCConnectionSuspend" message, decrypting the "RRCConnectionReconfiguration" message, and performing integrity verification thereof. Upon receiving the "RRCConnectionReconfiguration" message, the terminal configures respective PDCP, RLC, MAC, and PHY entities and configures bearers. The terminal may transmit, to the base station, an "RRCConnectionReconfigurationComplete" message indicating completion of connection establishment to switch to the RRC connected mode, and may switch to the RRC connected mode (3270).

In step 3260, the base station identifies whether or not there is downlink data to the terminal, and if there is no downlink data or if the terminal is required to be switched to the RRC idle mode for a predetermined reason, the base station may perform procedure 3275. The "predetermined reason" may be that the network is short of resources, the UE context is no longer valid, or there are too many terminals remaining in the RRC inactive mode in the current cell. The base station may transmit, to the terminal, an "RRCConnectionReject" or "RRCConnectionRelease" message, thereby switching the terminal to the RRC idle mode (3275). The "RRCConnectionReject" or "RRCConnectionRelease" message may include indications instructing the terminal to switch from the RRC inactive mode to the RRC idle mode.

Figure 33:
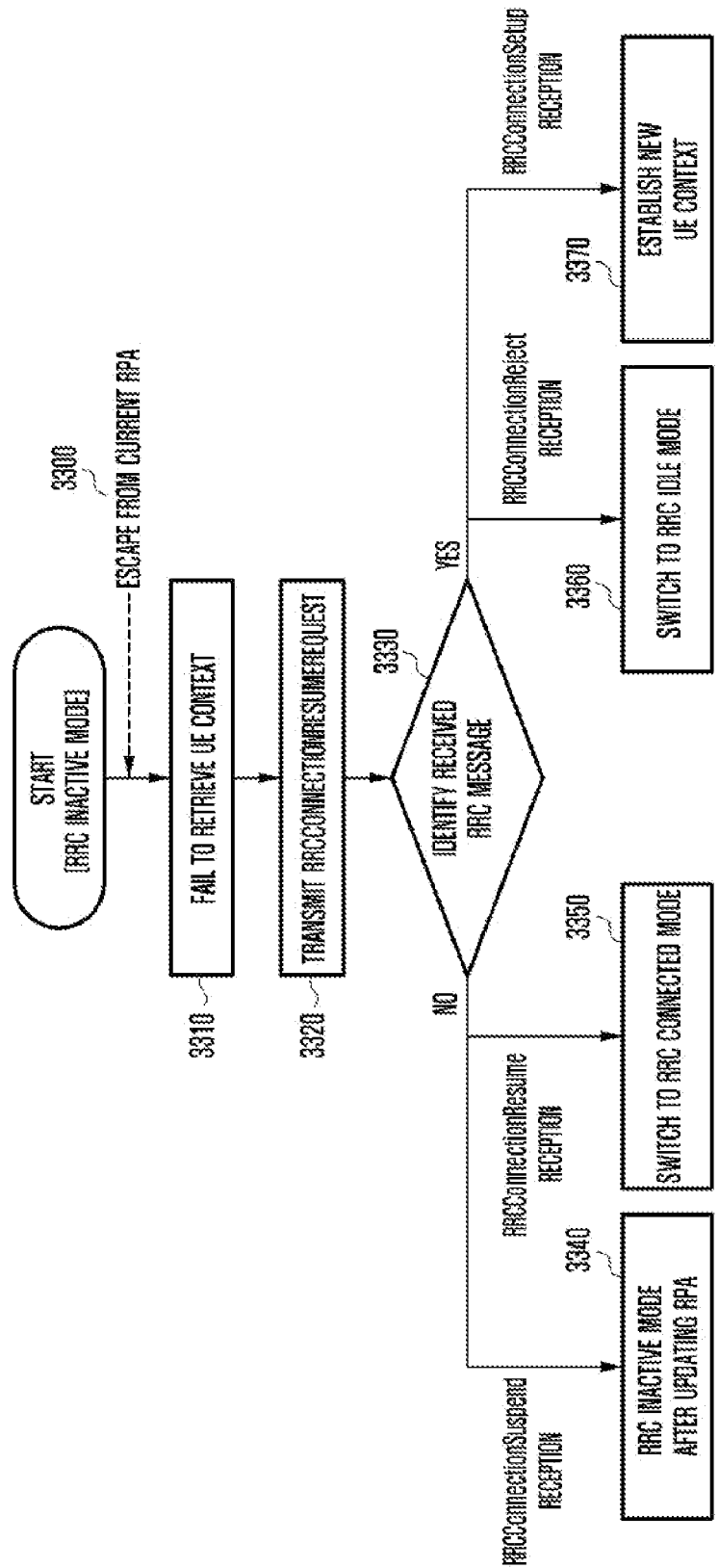
FIG. 33 is a diagram illustrating the operation of a terminal according to a response message of a base station, which is received after transmitting an "RRCConnectionResumeRequest" message in an RRC inactive mode.

FIG. 33 is a diagram illustrating an example of the operation of a terminal according to a response message of a base station, which is received by a terminal in an RRC inactive mode after transmitting an "RRCConnectionResumeRequest" message in order to perform a procedure of updating a RAN paging area.

In FIG. 33, if the terminal 3301 in the RRC inactive mode moves out of a currently configured RAN paging area (3300), the terminal perform a RAN paging area update procedure (3310). To perform the above procedure, the terminal transmits, to the base station, an "RRCConnectionResumeRequest" message requesting the RAN paging area update and including the "causeValue" and a terminal identifier (resume ID) (3320). Thereafter, the terminal identifies the RRC message received from the base station and performs different operations according to the type of the received RRC message (3330).

If the RRC message received from the base station is an "RRCConnectionSuspend" message, the terminal stores a new terminal identifier, a new RAN paging area, and new security configuration information included in the message and maintains the RRC inactive mode (3340). If the RRC message received from the base station is an "RRCConnectionResume" message, the terminal recognizes that the base station wishes to switch the terminal to the RRC connected mode for a predetermined reason and performs the RRC connection establishment procedure described in connection with FIG. 30, thereby switching to the RRC connected mode (3350). If the message received from the base station is an "RRCConnectionReject" message, the terminal identifies indicators included in the message and switches to the RRC idle mode (3360). If the indicator of the message indicates the RRC inactive mode, the terminal may maintain the RRC inactive mode. If the RRC message received from the base station is an "RRCConnectionSetup" message, the terminal recognizes that the base station has failed to retrieve the UE context, establishes a new UE context as described in connection with FIG. 32, and switches the RRC mode thereof according to the indication of the base station (3340).

Introduction of a new mode called RRC inactive mode to the next-generation mobile communication system has objectives to allow the terminal to operate as in the RRC idle mode so as to save the battery of the terminal and to allow the terminal to switch to the RRC connected mode with less signaling overhead when the terminal in the RRC inactive mode is required to switch to the RRC connected mode. A technique of directly transmitting data without switching of the terminal from the RRC inactive mode to the RRC connected mode may be very useful. This is due to the fact that it may bring additional benefits in addition to the advantages mentioned above.

The disclosure proposes a procedure for transmitting data in the RRC inactive mode as follows.

Figure 34:
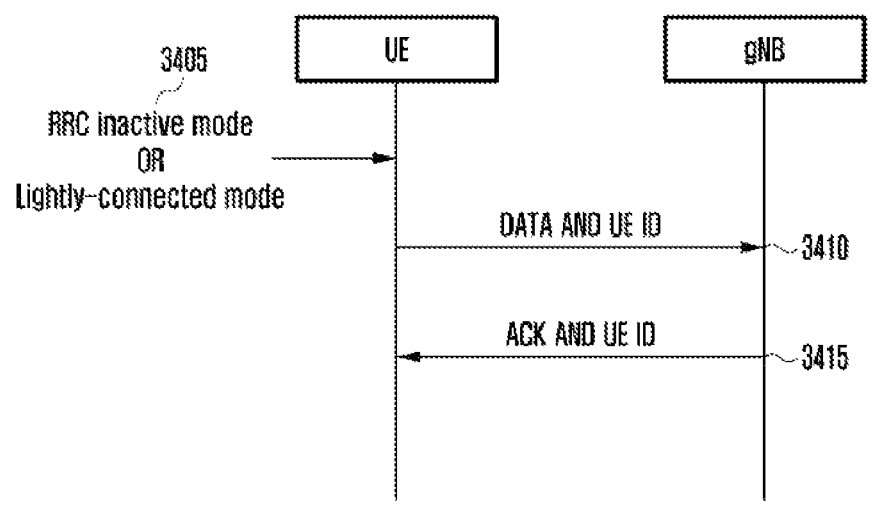
FIG. 34 is a diagram illustrating a first embodiment in which a terminal transmits uplink data in an RRC inactive mode.

FIG. 34 is a diagram illustrating a first embodiment in which a terminal in the RRC inactive mode transmits uplink data without switching to the RRC connected mode.

In FIG. 34, the terminal in the RRC inactive mode may have UE context, and data to be transmitted in the uplink may occur. The UE context may include bearer configuration information, such as an SRB and a DRB, and may include configuration information on a logical channel and security configuration information. In addition, the terminal may include the same PDCP device configuration information as that used in the RRC connected state (e.g. a PDCP COUNT value, PDCP sequence number, and the like). In addition, the terminal may include the same RLC device configuration information as that used in the RRC connected state. In this case, the terminal in the RRC inactive mode may directly transmit the uplink data through transmission resources predetermined with the network without a random access procedure or a connection establishment procedure (3410). When the terminal transmits data, a terminal identifier (e.g. a resume ID) may be included in the data in order for the network and/or the base station to identify the terminal (3410). If the terminal has a larger amount of data than the amount of predetermined transmission resource, the terminal may include a BSR (buffer status report) in the data, and may transmit the same in order to receive additional transmission resources from the base station. In addition, the terminal may include the security configuration information in the data, and may then transmit the same.

Upon receiving the data, the base station identifies the terminal identifier and transmits, to the terminal, the terminal identifier together with ACK (positive acknowledgment) indicating that the message was received (3415). The transmission resources predetermined between the terminal and the network/base station may be allocated to and shared by a plurality of terminals, instead of being allocated only to one terminal. That is, the transmission resource may be occupied based on contention. Therefore, the base station may transmit the terminal identifier along with ACK in the message, thereby informing that the contention was resolved. In addition, the base station may update the security configuration of the terminal by including security configuration information in the message. In this case, the ACK may be transmitted by an ARQ operation of the RLC entity, may be transmitted by an HARQ operation of the MAC entity, may be transmitted by means of the MAC CE, or may be transmitted by means of the RRC message. That is, the ACK and the terminal identifier may be transmitted by one of the four methods above according to the implementation and predefined rules.

Whether or not the terminal in the RRC inactive mode directly transmits data without switching to the RRC connected mode as described above may be determined by a predetermined threshold value, or the base station uses a predetermined indicator to allow the terminal to perform or to not perform the procedure of directly transmitting data without switching to the RRC connected mode. That is, if the amount of data to be transmitted is smaller than a predetermined threshold value, the terminal may directly transmit the data without switching to the RRC connected mode, and if the amount of data is larger than the predetermined threshold value, the terminal may perform the RRC connection resumption procedure described in connection with FIG. 30, and may switch to the RRC connected mode, thereby transmitting the data.

The predetermined threshold value or the indicator may be configured by means of an "RRCConnectionSetup" message or an "RRCConnectionReconfiguration" message when the terminal establishes an initial connection as described in connection with FIG. 29, or information about the threshold value or the indicator may be broadcast through the system information. The threshold value or the indicator broadcast by the system information may be used as a default value, and the threshold value configured by the base station using an RRC message {or a MAC control element (MAC CE)} may be applied in preference to the default value.

When the terminal establishes an initial connection as shown in FIG. 29, a bearer in which the terminal in the RRC inactive mode transmits data may be configured through an "RRCConnectionSetup" message or an "RRCConnectionReconfiguration" message. That is, it is possible to indicate that some bearers may be used to transmit data in the RRC inactive mode and some bearers cannot be used to transmit data in RRC inactive mode. In the case of a bearer that may be used to transmit data in the RRC inactive mode above, the terminal may spontaneously activate the bearer before the terminal transmits data in the RRC inactive mode (since all the bearers are suspended when the terminal switches to the RRC inactive mode, the bearers are required to be activated again). For example, if data occurs in the bearer, the terminal may spontaneously activate the bearer in the case where a resource for transmitting the data is allocated, in the case where a resource for transmitting the data is predetermined with the network, in the case where a random access procedure is successful, or in the case where a preamble is transmitted and a RAR is received in the random access procedure. In the case of bearers that cannot be used to transmit data in the RRC inactive mode, the terminal may activate the bearers when receiving an "RRCConnectionResume" message or an "RRCConnectionSetup" message.

As described above, if the terminal in the RRC inactive mode transmits data without a procedure of switching to the RRC connected mode, battery consumption of the terminal may be reduced, and signaling overhead of the network may be reduced.

Figure 35:
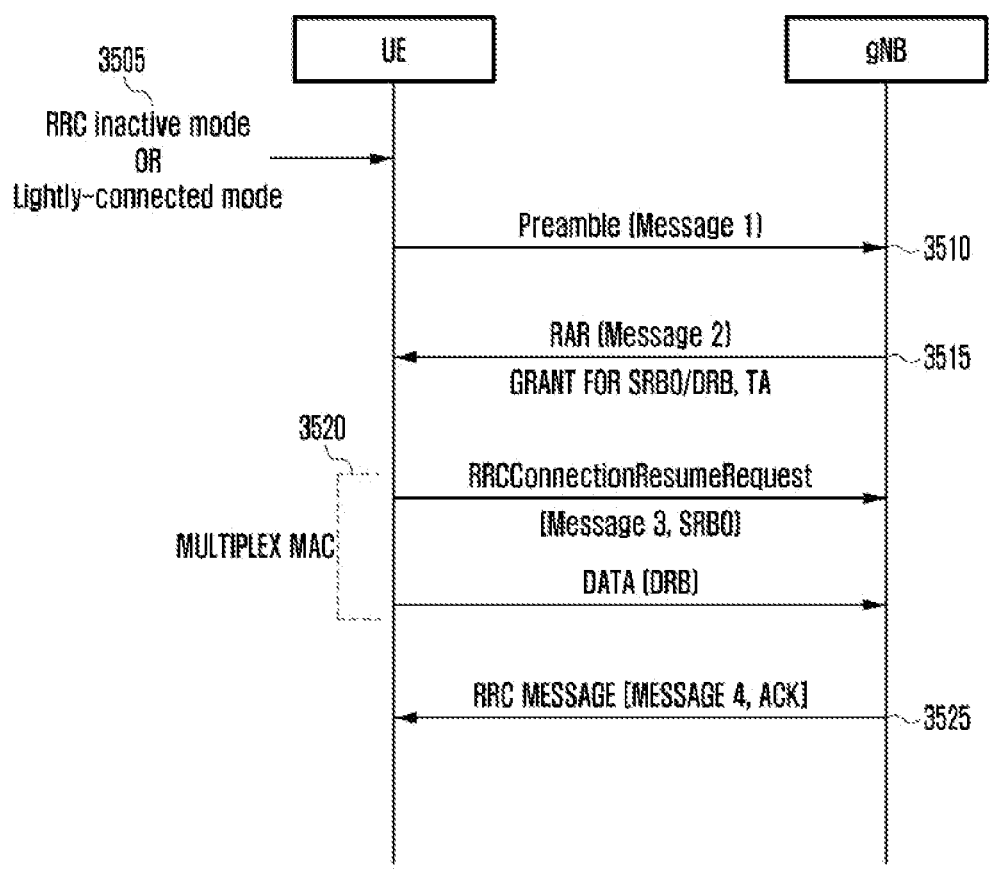
FIG. 35 is a diagram illustrating a second embodiment in which the terminal transmits uplink data in an RRC inactive mode.

FIG. 35 is a diagram illustrating a second embodiment in which a terminal in the RRC inactive mode transmits uplink data without switching to the RRC connected mode.

In FIG. 35, if uplink data occurs, the terminal 3505 in the RRC inactive mode may perform a random access procedure to establish a connection with a network. The terminal may transmit a preamble in the RRC inactive mode before transmitting the data (3510). A preamble belonging to one preamble of groups of preambles may be selected and transmitted as the preamble. The groups of the preambles may be divided into various partitions, and the partitions may be separated according to whether or not the terminal is to transmit a small amount of data in the RRC inactive mode, whether or not the terminal requests a large amount of transmission resource, the amount of the requested transmission resource, and the like. That is, in the case where the terminal transmits a preamble belonging to a specific partition, the base station may identify the intention of the terminal to transmit a small amount of data in the RRC inactive state and/or the amount of transmission resource requested. Upon receiving preamble, the base station identifies the partition to which the preamble belongs, transmits timing advance (TA) in order for the terminal to match the timing to transmit data in the RRC inactive mode through a RAR response, and allocates transmission resources (3515).

Upon receiving the RAR message, the terminal re-establishes the PDCP entities and the RLC entities for SRBs and/or DRBs. If there is an NCC received when the terminal switches from the RRC connected mode to the RRC inactive mode, the terminal may calculate new security keys (KeNB*, KgNB*, or the like) using the same, and may perform encryption and integrity protection on the PDCP entity by applying the same. In addition, the terminal configures the MAC entity and the PFIY entity according to the configuration stored in the UE context. After completing the above procedure, the terminal generates an "RRC Connection Resume Request" message (or MAC CE, corresponding to message 3), is prepared to transmit the same through an SRB (or DRB), processes the data, and is prepared to transmit the same through a DRB. In addition, the MAC entity multiplexes the RRC message to be transmitted through the SRB and the data to be transmitted through the DRB into a single MAC PDU and transmits the same within one TTI (3520).

After the message 3 is transmitted, HARQ ACK/NACK transmission may be supported. The message 3 may include a BSR indicating the amount of data left in the terminal and an indication indicating that the terminal will remain in the RRC inactive state. In addition, the message 3 may include a terminal identifier (resume ID) to identify the terminal, and short MAC-I for integrity protection.

The base station having successfully received the RRC message and the data may identify the terminal identifier (resume ID), may perform a procedure of retrieving the UE context from an anchor base station or a source base station (the base station having the UE context), may complete configuration of the PDCP, RLC, MAC, and PHY entities and security configuration, based on the LTE context, may transmit a newly defined RRC message or an existing RRC message ("RRCConnectionSuspend", "RRCConnectionResume", "RRCConnectionRelease", or "RRCConnectionReject" message) in response to the data and message of the terminal, thereby informing that the message 3 has been successfully received, and may inform the terminal that contention for the message 3 has been resolved. If the base station wishes to instruct the terminal to remain in the inactive mode, the base station may transmit an "RRCConnectionResume" message including an indicator for the same, and if the base station wishes to switch the terminal to the idle mode, the base station may transmit an "RRCConnectionResume" message. If the transmission is required to be interrupted, the base station may transmit an "RRCConnectionSuspend" message, and if the connection is required to be temporarily interrupted and to then be re-established, the base station may transmit an "RRCConnectionReject" message. In addition, if there is a predetermined procedure or configuration, this information may be transmitted through the MAC CE (3525). The transmission of ACK to the data may be performed by the ARQ function of the RLC entity.

When the terminal establishes an initial connection as shown in FIG. 29, a bearer in which the terminal in the RRC inactive mode is able to transmit data may be configured through an "RRCConnectionSetup" message or an "RRCConnectionRecontiguration" message. That is, it is possible to indicate that some bearers may be used to transmit data in the RRC inactive mode and some bearers cannot be used to transmit data in RRC inactive mode. In the case of a bearer that may be used to transmit data in the RRC inactive mode above, the terminal may spontaneously activate the bearer before the terminal transmits data in the RRC inactive mode (since all the bearers are suspended when the terminal switches to the RRC inactive mode, the bearers are required to be activated again). For example, if data occurs in the bearer, the terminal may spontaneously activate the bearer in the case where a resource for transmitting the data is allocated, in the case where a resource for transmitting the data is predetermined with the network, in the case where a random access procedure is successful, or in the case where a preamble is transmitted and then a RAR is received in the random access procedure. In the case of bearers that cannot be used to transmit data in the RRC inactive mode, the terminal may activate the bearers when receiving an "RRCConnectionResume" message or an "RRCConnectionSetup" message.

As described above, if the terminal in the RRC inactive mode transmits data without a procedure of switching to the RRC connected mode, battery consumption of the terminal may be reduced, and signaling overhead of the network may be reduced.

Figure 36:
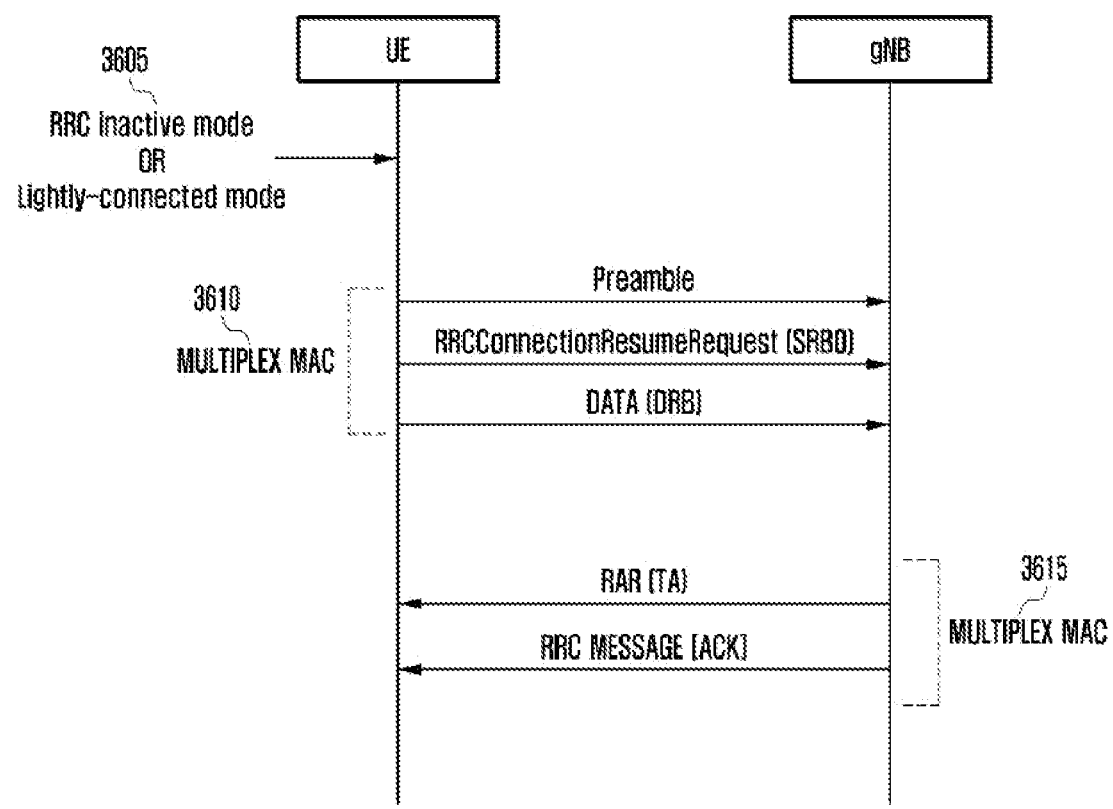
FIG. 36 is a diagram illustrating a third embodiment in which the terminal transmits uplink data in an RRC inactive mode.

FIG. 36 is a diagram illustrating a third embodiment in which a terminal in the RRC inactive mode transmits uplink data without switching to the RRC connected mode.

In FIG. 36, if uplink data occurs, the terminal 3605 in the RRC inactive mode may perform a random access procedure to establish a connection with a network. First, the terminal may re-establish the PDCP entities and the RIX entities for SRBs and/or DRBs using stored LE context. If there is an NCC received when the terminal switches from the RRC connected mode to the RRC inactive mode, the terminal may calculate new security keys (KeNB*, KgNB*, or the like) using the same, and may perform encryption and integrity protection on the PDCP entity by applying the same. In addition, the terminal configures the MAC entity and the PHY entity according to the configuration stored in the UE context. After the above procedure, the terminal may simultaneously transmit a preamble, an "RRCConnectionResumeRequest" message, and data in the RRC inactive mode using a contention-based resource predetermined with the network (3610). That is, the MAC entity of the terminal may multiplex the preamble, the "RRCConnectionResumeRequest" message to be transmitted through the SRB, and the data to be transmitted through the DRB into a single MAC PDU, and may simultaneously transmit the same within one TTI. In this case, if the amount of data to be transmitted by the terminal is larger than the amount of contention-based transmission resource, a BSR may be included in the MAC PDU in order to allocate additional transmission resources, and a terminal identifier (resume ID) may also be included in order to identify the terminal.

The base station may identify the terminal identifier (resume ID), may perform a procedure of retrieving the UE context from an anchor base station or a source base station (the base station having the UE context), may complete configuration of the PDCP, RLC, MAC, and PHY entities and security configuration, based on the UE context, may transmit a newly defined RRC message or an existing RRC message ("RRCConnectionSuspend", "RRCConnectionResume", "RRCConnectionRelease", or "RRCConnectionReject" message) along with a RAR in response to the data of the terminal, thereby informing of successful reception, and may inform that contention has been resolved. If the base station wishes to instruct the terminal to remain in the inactive mode, the base station may transmit an "RRCConnectionResume" message including an indicator for the same, and if the base station wishes to switch the terminal to the idle mode, the base station may transmit an "RRCConnectionResume" message. If the transmission is required to be interrupted, the base station may transmit an "RRCConnectionSuspend" message, and if the connection is required to be temporarily interrupted and to then be re-established, the base station may transmit an "RRCConnectionReject" message. In addition, if there is a predetermined procedure or configuration, such information may be transmitted through the MAC CE. The transmission of ACK to the data may be performed by the ARQ function of the RlX entity. The MAC entity of the base station may multiplex the RAR, the RRC message, and the RlX ACK into a single MAC PDU, and may transmit the same within one TTI (3615).

When the terminal establishes an initial connection as shown in FIG. 29, a bearer in which the terminal in the RRC inactive mode is able to transmit data may be configured through an "RRCConnectionSetup" message or an "RRCConnectionReconfiguration" message. That is, it is possible to indicate that some bearers may be used to transmit data in the RRC inactive mode and some bearers cannot be used to transmit data in RRC inactive mode. In the case of a bearer that may be used to transmit data in the RRC inactive mode above, the terminal may spontaneously activate the hearer before the terminal transmits data in the RRC inactive mode (since all the hearers are suspended when the terminal switches to the RRC inactive mode, the bearers are required to be activated again in order to transmit data). For example, if data occurs in the bearer, the terminal may spontaneously activate the bearer in the case where a resource for transmitting the data is allocated, in the case where a resource for transmitting the data is predetermined with the network, in the case where a random access procedure is successful, or in the case where a preamble is transmitted and then a RAR is received in the random access procedure. In the case of bearers that cannot be used to transmit data in the RRC inactive mode, the terminal may activate the bearers when receiving an "RRCConnectionResume" message or an "RRCConnectionSetup" message.

As described above, if the terminal in the RRC inactive mode transmits data without a procedure of switching to the RRC connected mode, battery consumption of the terminal may be reduced, and signaling overhead of the network may be reduced.

In the disclosure, the terminal in the RRC inactive mode may perform a connection establishment procedure using an "RRCConnectionResumeRequest" message, an "RRCConnectionResume" message, and an "RRCConnectionResumeComplete" message.

Figure 39:
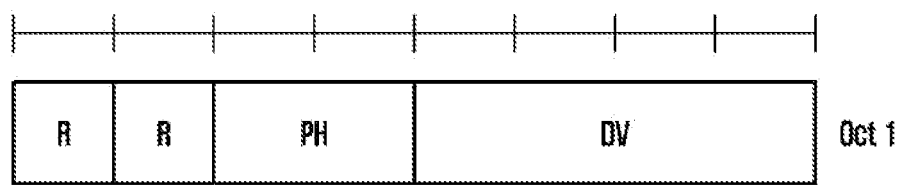
FIG. 39 is a diagram illustrating the DPR MAC CE format.

In Particular, the "RRCConnectionResumeRequest" message, among the RRC messages above, may be transmitted while including an approximate format, such as a data volume and power headroom report (DPR) MAC CE, in order to transmit a rough buffer status report (BSR) and power headroom report (PHR) of the terminal to the base station in advance. FIG. 39 is a diagram illustrating the DPR MAC CE format.

Referring to the drawing, the format is a DPR MAC CE of 1 byte, and there is a reserved field (R) of 2 bits. In addition, the PH field of 2 bits may denote a power headroom, and the DV field of 4 bits may denote the size of data. Therefore, in the above procedures of the disclosure, the "RRCConnectionResumeRequest" may be included in the DPR MAC CE to then be transmitted. Accordingly, the terminal may report the approximate buffer status (BSR) and power headroom (PHR) of the terminal to the base station in advance. Whether or not to include the DRP MAC CE in the "RRCConnectionResumeRequest" message (CCCH SDU) may be determined according to connection establishment cause ("establishmentCause") as shown in Table 1 below.

Upon receiving the "RRCConnectionResume" message (message 4), the terminal may configure the PDCP, RLC, MAC, and PHY entities and the bearers according to the UE context and the configuration information of the terminal, and may include the detailed buffer status (BSR) and power headroom (PHR) in the "RRCConnectionResumeComplete" message (message 5), thereby reporting the same to the base station. Whether or not to include the BSR and the PHR in the "RRCConnectionResumeComplete" message may be determined according to connection establishment cause ("establishmentCause") as shown in Table 1 below.

TABLE 1

| EstablishmentCause | Message 3 (RRCConnectionResumeRequest) | Message 5 (RRCConnectionResumeComplete) |
| --- | --- | --- |
| MO-data | If UL grant is sufficient, transmit DPR and CCCH SDU, and if UL grant is insufficient, transmit only CCCH SDU | Report BSR and PHR according to AS(access stratum) context configuration |
| MO-signaling | Transmit only CCCH SDU | Report BSR and PHR. according to AS context configuration |
| MT-access | Transmit only CCCH SDU | PHR may be reported |

Table 1 above shows a method of configuring RRC messages according to the connection causes of terminal.

In the case where the transmission cause is MO-data (in the case where uplink data occurs in the terminal) when transmitting message 3, if the uplink transmission resources (UL grant) are sufficient, the terminal transmits an "RRCConnectionResurneRequest" (CCCH SDU) including the DPR, and if the uplink transmission resources are insufficient, the terminal transmits only an "RRCConnectionResumeRequest" (CCCH SDU).

If the transmission cause is MO-signaling (if uplink control signal occurs in the terminal) or MT-access (if downlink data occurs in the network or if a paging message is received) when transmitting message 3, the terminal transmits only an "RRCConnectionResumeRequest" (CCCH SDU) message.

If the transmission cause is MO-data or MO-signaling when transmitting message 5, the terminal may report the BSR and the PM according to the UE context configuration, and may transmit the same along with an "RRCConnectionResumeComplete" message.

If the transmission cause is MT-access when transmitting message 5, the terminal may report the PHR, and may transmit the same along with an "RRCConnectionResumeComplete" message.

Figure 37:
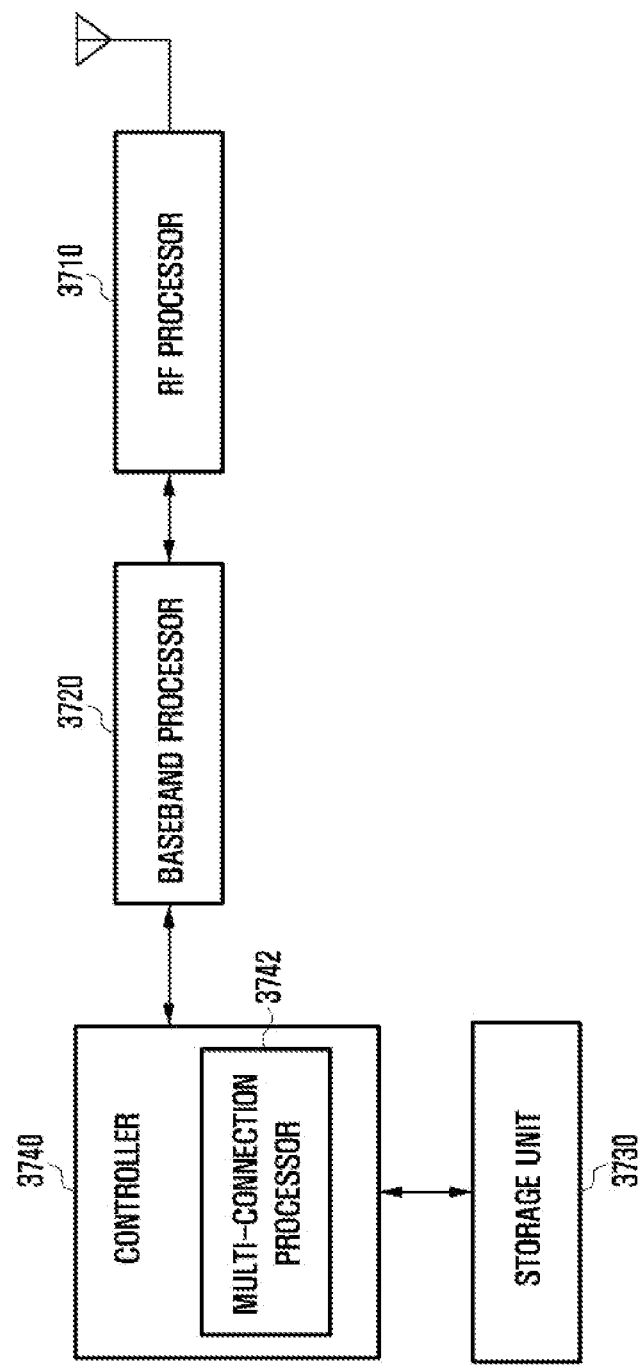
FIG. 37 is a diagram illustrating the structure of a terminal to which an embodiment of the disclosure may be applied.

FIG. 37 is a diagram illustrating the structure of a terminal capable of implementing embodiments of the disclosure.

Referring to the drawing, the terminal includes a radio frequency (RF) processor 3710, a baseband processor 3720, a storage unit 3730, and a controller 3740.

The RF processor 3710 performs a function of transmitting and receiving a signal through a wireless channel, such as band conversion and amplification of a signal. That is, the RF processor 3710 up-converts a baseband signal provided from the baseband processor 3720 to an RF band signal to thus transmit the same through an antenna and down-converts an RF band signal received through the antenna to a baseband signal. For example, the RF processor 3710 may include a transmission filter, a reception filter, an amplifier, a mixer, an oscillator, a digital-to-analog converter (DAC), an analog-to-digital converter (ADC), and the like. Although only one antenna is illustrated in the drawing, the terminal may have a plurality of antennas. In addition, the RF processor 3710 may include a plurality of RF chains. Further, the RF processor 3710 may perform beamforming. To perform beamforming, the RF processor 3710 may adjust the phases and magnitudes of signals transmitted and received through a plurality of antennas or antenna elements. In addition, the RF processor may perform MIMO, and may receive a plurality of layers when performing the MIMO operation. The RF processor 3710 may adequately configure a plurality of antennas or antenna elements, thereby performing reception beam sweeping, or may adjust the direction of a reception beam and the width of the beam such that the reception beam cooperates with the transmission beam under the control of the controller.

The baseband processor 3720 performs a function of conversion between a baseband signal and a bit string according to the physical layer specification of the system. For example, in the case of data transmission, the baseband processor 3720 encodes and modulates transmission bit strings, thereby generating complex symbols. In addition, upon receiving data, the baseband processor 3720 demodulates and decodes a baseband signal provided from the RF processor 3710 to thus recover reception bit strings. For example, in the case where an orthogonal frequency division multiplexing (OFDM) scheme is applied, when transmitting data, the baseband processor 3720 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 3720 divides the baseband signal provided from the RF processor 3710 into OFDM symbol units, restores the signals mapped to the subcarriers through a fast Fourier transform (FFT) operation, and then restores reception bit strings through demodulation and decoding.

The baseband processor 3720 and the RF processor 3710 transmit and receive signals as described above. Accordingly, the baseband processor 3720 and the RF processor 3710 may be referred to as a "transmitter", a "receiver", a "transceiver", or a "communication unit", In addition, at least one of the baseband processor 3720 and the RF processor 3710 may include a plurality of communication modules to support a plurality of different wireless access technologies. Further, at least one of the baseband processor 3720 and the RF processor 3710 may include different communication modules to process signals of different frequency bands. For example, the different radio access technologies may include an LTE network, an NR network, and the like. In addition, the different frequency bands may include super-high frequency (SHF) (e.g., 2.5 GHz or 5 Ghz) bands and millimeter wave (e.g., 60 GHz) bands.

The storage unit 3730 stores data such as basic programs, application programs, and configuration information for the operation of the terminal. The storage unit 3730 provides the stored data according to a request by the controller 3740.

The controller 3740 controls the overall operation of the terminal. For example, the controller 3740 transmits and receives signals through the baseband processor 3720 and the RF processor 3710. In addition, the controller 3740 records and reads data in and from the storage unit 3740. To this end, the controller 3740 may include at least one processor. For example, the controller 3740 may include a communication processor (CP) for controlling communication and an application processor (AP) for controlling upper layers such as application programs.

Figure 38:
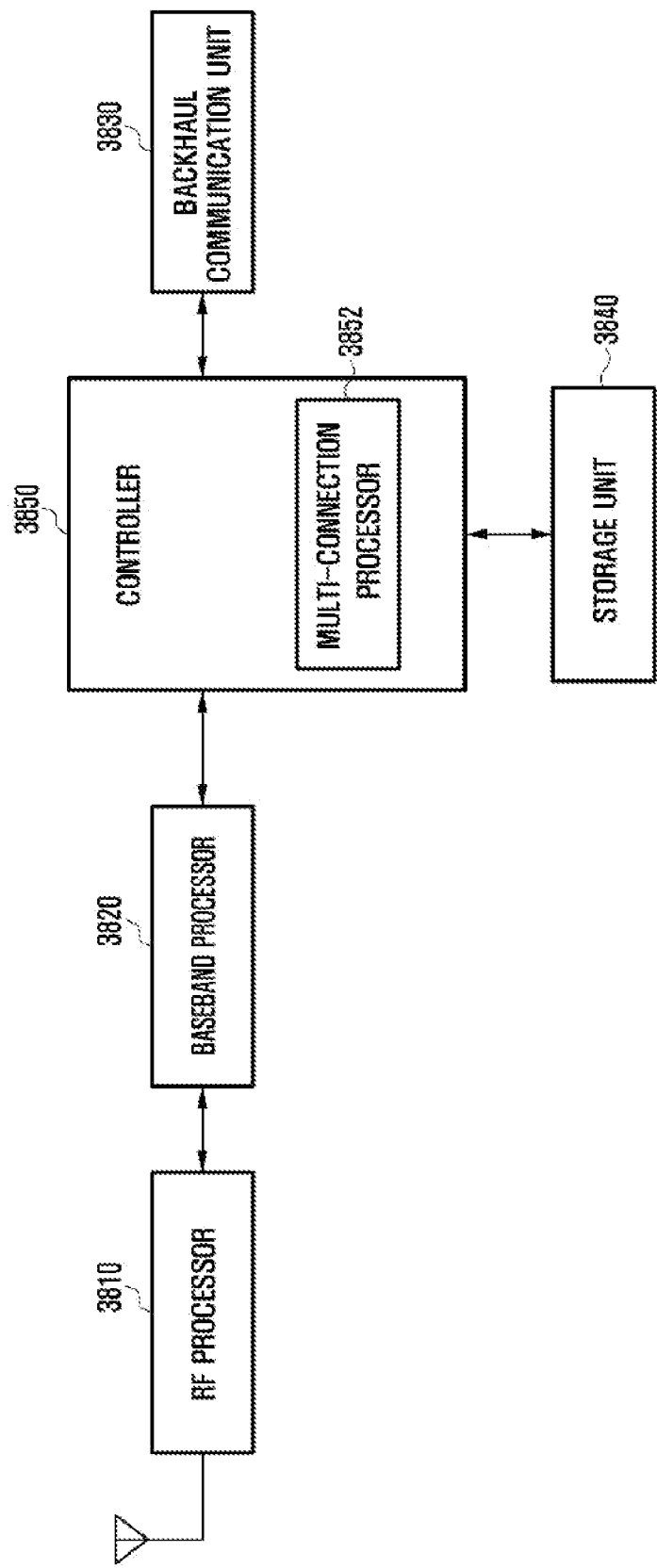
FIG. 38 is a diagram illustrating the structure of a TRP to which an embodiment of the disclosure may be applied.

FIG. 38 is a block diagram of a transmission and reception point (TRP) capable of implementing embodiments of the disclosure. This may be used interchangeably with the base station.

As shown in the drawing, the base station includes an RF processor 3810, a baseband processor 3820, a backhaul communication unit 3830, a storage unit 3840, and a controller 3850.

The RF processor 3810 performs a function of transmitting and receiving signals through a wireless channel, such as band conversion and amplification of a signal. That is, the RF processor 3810 up-converts a baseband signal provided from the baseband processor 3820 to an RF band signal, to thus transmit the same through an antenna, and down-converts an RF band signal received through the antenna to a baseband signal. For example, the RF processor 3810 may include a transmission filter, a reception filter, an amplifier, a mixer, an oscillator, a DAC, an ADC, and the like. Although only one antenna is shown in the drawing, the base station may have a plurality of antennas. In addition, the RF processor 3810 may include a plurality of RF chains. Further, the RE processor 3810 may perform beamforming. To perform beamforming, the RF processor 3810 may adjust the phases and magnitudes of signals transmitted and received through a plurality of antennas or antenna elements. The RF processor may perform a downlink MIMO operation by transmitting one or more layers.

The baseband processor 3820 performs a function of conversion between a baseband signal and a bit string according to a physical layer specification of a first radio access technique. For example, in the case of data transmission, the baseband processor 3820 encodes and modulates transmission bit strings, thereby generating complex symbols. In addition, upon receiving data, the baseband processor 3820 demodulates and decodes a baseband signal provided from the RF processor 3810 to thus recover reception bit strings. For example, in the case where an OFDM scheme is applied, when transmitting data, the baseband processor 3820 generates complex symbols by encoding and modulating transmission bit strings, maps the complex symbols with subcarriers, and then configures OFDM symbols through the IFFT operation and CP insertion. In addition, when receiving data, the baseband processor 3820 divides the baseband signal provided from the RF processor 3810 into OFDM symbol units, restores the signals mapped with the subcarriers through the FFT operation, and then restores reception bit strings through demodulation and decoding. The baseband processor 3820 and the RF processor 3810 transmit and receive signals as described above. Accordingly, the baseband processor 3820 and the RF processor 3810 may be referred to as a "transmitter", a "receiver", a "transceiver", a "communication unit", or a "wireless communication unit".

The communication unit 3830 provides an interface for performing communication with other nodes in the network. The storage unit 3840 stores data such as basic programs, application programs, and configuration information for the operation of the base station. In particular, the storage unit 3840 may store information about bearers allocated to a connected terminal, a measurement result reported from a connected terminal, and the like. In addition, the storage unit 3840 may store information that is a criterion for determining whether multiple connections are provided to the terminal or are released. In addition, the storage unit 3840 provides the stored data in response to a request from the controller 3850.

The controller 3850 controls the overall operation of the base station. For example, the controller 3850 transmits and receives signals through the baseband processor 3820 and the RF processor 3810 or the backhaul communication unit 3830. In addition, the controller 3850 records and reads data in and from the storage unit 3840. To this end, the controller 3850 may include at least one processor.

It should be noted that the embodiments of the disclosure provided in the specification and drawings are only illustrative of the disclosure in order to facilitate explanation and understanding of the disclosure and are not intended to limit the scope of the disclosure. That is, it will be obvious to those skilled in the art that other modifications can be provided based on the technical concept of the disclosure. In addition, the respective embodiments above may be executed in combination with each other as necessary. For example, portions of embodiments of the disclosure may be combined with one another to allow the base station and the terminal to operate the same. In addition, although the above embodiments are based on the NR system, other modifications based on the technical concept of the embodiments may be applicable to other systems such as an FDD or TDD LTE system.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

What is claimed is:

1. A method performed by a terminal in a communication system, the method comprising:
   receiving system information including a threshold value for a data transmission;
   transmitting, to a base station, a random access preamble for the data transmission in a random access procedure;
   receiving, from the base station, a random access response in response to the random access preamble;
   identifying that a size of uplink data to be transmitted is less than or equal to the threshold value;
   multiplexing a radio resource control (RRC) resume request message and the uplink data; and
   transmitting, to the base station, the RRC resume request message and the uplink data as a message 3,
   wherein the RRC resume request message includes a resume identifier of the terminal and a short message authentication code-integrity (MAC-I).

2. The method of claim 1, further comprising:
   receiving an RRC release message including next hop chaining count information,
   wherein the uplink data are ciphered based on a key derived from the next hop chaining count information.

3. The method of claim 1, wherein the random access preamble for the data transmission is one of random access preambles of random access preamble groups for the data transmission.

4. The method of claim 1, further comprising:
   receiving, from the base station, an RRC resume message in response to the message 3,
   wherein the RRC resume message includes information for entering an inactive state.

5. A method performed by a base station in a communication system, the method comprising:
   receiving, from a terminal, a random access preamble for a data transmission in a random access procedure;
   transmitting, to the terminal, a random access response in response to the random access preamble; and
   receiving, from the terminal, a radio resource control (RRC) resume request message and uplink data as a message 3,
   wherein the RRC resume request message and the uplink data for the data transmission are multiplexed, and wherein a size of the uplink data is less than or equal to a threshold value,
   wherein the RRC resume request message includes a resume identifier of the terminal and a short message authentication code-integrity (MAC-I), and
   wherein the threshold value is transmitted via system information.

6. The method of claim 5, wherein the uplink data are ciphered based on a key derived from next hop chaining count information, and
   wherein the next hop chaining count information is transmitted via an RRC release message that is transmitted before the reception of the random access preamble.

7. The method of claim 5, wherein the random access preamble for the data transmission is one of random access preambles of random access preamble groups for the data transmission.

8. The method of claim 5, further comprising:
   transmitting, to the terminal, an RRC resume message in response to the message 3,
   wherein the RRC resume message includes information for entering an inactive state.

9. A terminal in a communication system, the terminal comprising:
- a transceiver; and
- a controller coupled with the transceiver and configured to:
  - receive system information including a threshold value for a data transmission,
  - transmit, to a base station, a random access preamble for a data transmission in a random access procedure,
  - receive, from the base station, a random access response in response to the random access preamble,
  - identify that a size of uplink data to be transmitted is less than or equal to the threshold value,
  - multiplex a radio resource control (RRC) resume request message and the uplink data, and
  - transmit, to the base station, the RRC resume request message and the uplink data as a message 3,
  - wherein the RRC resume request message includes a resume identifier of the terminal and a short message authentication code-integrity (MAC-I).

10. The terminal of claim 9, wherein the controller is further configured to receive an RRC release message including next hop chaining count information, and
- wherein the uplink data are ciphered based on a key derived from the next hop chaining count information.

11. The terminal of claim 9, wherein the random access preamble for the data transmission is one of random access preambles of random access preamble groups for the data transmission.

12. The terminal of claim 9, wherein the controller is further configured to receive, from the base station, an RRC resume message in response to the message 3, and
- wherein the RRC resume message includes information for entering an inactive state.

13. A base station in a communication system, the base station comprising:
- a transceiver; and
- a controller coupled with the transceiver and configured to:
  - receive, from a terminal, a random access preamble for a data transmission in a random access procedure,
  - transmit, to the terminal, a random access response in response to the random access preamble, and
  - receive, from the terminal, a radio resource control (RRC) resume request message and uplink data as a message 3,
  - wherein the RRC resume request message and the uplink data for the data transmission are multiplexed, and
  - wherein a size of the uplink data is less than or equal to a threshold value,
  - wherein the RRC resume request message includes a resume identifier of the terminal and a short message authentication code-integrity (MAC-I), and
  - wherein the threshold value is transmitted via system information.

14. The base station of claim 13, wherein the uplink data are ciphered based on a key derived from next hop chaining count information, and
- wherein the next hop chaining count information is transmitted via an RRC release message that is transmitted before the reception of the random access preamble.

15. The base station of claim 13, wherein the random access preamble for the data transmission is one of random access preambles of random access preamble groups for the data transmission.

16. The base station of claim 13, wherein the controller is further configured to transmit, to the terminal, an RRC resume message in response to the message 3, and
- wherein the RRC resume message includes information for entering an inactive state.

\* \* \* \* \*